(12) United States Patent  
Kawano et al.

(10) Patent No.: US 11,521,102 B2  
(45) Date of Patent: Dec. 6, 2022

(54) TRANSFORMATION APPARATUS, DECISION APPARATUS, QUANTUM COMPUTATION APPARATUS, AND QUANTUM MACHINE LEARNING SYSTEM

(71) Applicant: NIPPON TELEGRAPH AND TELEPHONE CORPORATION, Chiyoda-ku (JP)

(72) Inventors: Yasuhito Kawano, Atsugi (JP); Hiroshi Sekigawa, Shinjuku-ku (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 1052 days.

(21) Appl. No.: 16/168,014

(22) Filed: Oct. 23, 2018

(65) Prior Publication Data

US 2019/0197426 A1 Jun. 27, 2019

(30) Foreign Application Priority Data

Oct. 24, 2017 (JP) .............................. JP2017-205011

(51) Int. Cl.

| G06N 10/00 | (2022.01) |
|---|---|
| G06F 17/16 | (2006.01) |
| G06F 17/14 | (2006.01) |
| G06F 15/16 | (2006.01) |

(Continued)

(52) U.S. Cl.
CPC ............. *G06N 10/00* (2019.01); *G06F 15/16* (2013.01); *G06F 17/14* (2013.01); *G06F 17/16* (2013.01);

(Continued)

(58) Field of Classification Search
CPC ........ G06N 10/00; G06N 3/0481; G06N 3/08; G06N 5/003; G06N 3/0445; G06N 3/0472; G06F 15/16; G06F 17/14; G06F 17/16

See application file for complete search history.

(56) References Cited

PUBLICATIONS

Cuevas et al., ("Quantum algorithms for classical lattice models" Published Sep. 9, 2011—36 pages (Year: 2011).*

(Continued)

*Primary Examiner* — Quoc A Tran

(74) *Attorney, Agent, or Firm* — Oblon, McClelland, Maier & Neustadt, L.L.P.

(57) ABSTRACT

First, a dual basis B⁻ of B of modulo N is obtained by classical computation. Next, quantum computation is performed using the periodicity of a point sequence included in a sum set of sets obtained by parallel translation of a lattice L(B) by integral multiples of t for a plurality of integers, and an n-dimensional $r_j=(r_{j1}, \ldots, r_{jn})$ and $r_{j0}$ are obtained for $j=1, \ldots, m$. Subsequently, by classical computation, the closest vector $r_j^{(c)}=(r_{j1}^{(c)}, \ldots, r_{jn}^{(c)}) \in L(B^-)$ of the n-dimensional vector $r_j$, and the difference vector $r_j^{(d)}=r_j-r_j^{(c)}=(r_{j1}^{(d)}, \ldots, r_{jn}^{(d)})$ corresponding to $r_j^{(c)}$ are obtained.

8 Claims, 32 Drawing Sheets

(51) Int. Cl.
  *G06N 3/04* (2006.01)
  *G06N 5/00* (2006.01)
  *G06N 3/08* (2006.01)
  *G06F 17/00* (2019.01)

(52) U.S. Cl.
  CPC ............ *G06N 3/0481* (2013.01); *G06N 3/08* (2013.01); *G06N 5/003* (2013.01); *G06N 3/0445* (2013.01); *G06N 3/0472* (2013.01)

(56) References Cited

PUBLICATIONS

Dave Bacon and Wim van Dam ("What quantum algorithms outperform classical computation and how do they do it?" Published 2010—vol. 53, No. 2 (2010), 13 pages (Year: 2010).*

Biamonte, J., et al., "Quantum machine learning", Nature, vol. 549, Sep. 2017, pp. 195-202.

Harrow, A.W., et al., "Quantum Algorithm for Linear Systems of Equations", Physical Review Letters, vol. 15 No. 103, Oct. 2009, pp. 150502-1-150502-4.

Regev, O., "Quantum Computation and Lattice Problems", SIAM Journal on Computing, 2004, vol. 33, No. 3, pp. 1-20.

Laarhoven, T., et al., "Finding shortest lattice vectors faster using quantum search", Designs, Codes and Cryptography, vol. 7. No. 2, 2015, pp. 375-400.

Kawano, Y., et al., "Quantum Algorithms for Lattice Problems", The Institute of Electronics, Information and Communication Engineers, QIT2017-02. May 2017, pp. 4-5 (with English abstract and English translation).

* cited by examiner

TRANSFORMATION APPARATUS, DECISION APPARATUS, QUANTUM COMPUTATION APPARATUS, AND QUANTUM MACHINE LEARNING SYSTEM

TECHNICAL FIELD

The present invention relates to a quantum computing technology that performs operations by a quantum computer.

BACKGROUND ART

Quantum computers have been expected to have a computation capability far superior to current computers in some application fields. One of famous quantum algorithms is a quantum algorithm disclosed by Shor in 1994 to solve efficiently factorization and discrete logarithm problems. Because of this disclosure, various quantum algorithms that bring out computation capabilities of quantum computers have been researched. In particular, quantum algorithms have been actively researched that solve, at high speed, combinatorial optimization problems, which cannot be efficiently solved by classical computers. With encouragement by a recent artificial intelligence boom, machine learning using a quantum computer (quantum machine learning) has been attracting attentions. Jacob Biamonte, Peter Wittek, Nicola Pancotti, Patrick Rebentrost, Nathan Wiebe, Seth Lloyd, Quantum Machine Learning, Nature 549, pp. 195-202. (2017). doi:10.1038/nature23474 (hereinafter referred to as Non-patent literature 1) is a paper that reviews recent research progresses pertaining to the quantum machine learning.

Box 1 Table in Non-patent literature 1 summarizes comparisons between quantum machine learning and classical machine learning. Among the comparisons, there are machine learning systems using a quantum computer exhibited to achieve learning efficiently; the systems encompass learning in linear support vector machines. What plays a main role in applications to these systems is a quantum algorithm that is called HHL (Harrow-Hassidim-Lloyd) algorithm.

[Non-patent literature 2] Aram W. Harrow, Avinatan Hassidim, Seth Lloyd, Quantum algorithm for solving linear systems of equations, Phys. Rev. Lett. vol. 15, no. 103, pp. 150502 (2009)

The HHL algorithm is based on a phase estimation algorithm also used in Shor's algorithm, and can achieve efficient learning of linear systems. However, systems, such as deep neural networks, which have a wide industrial application range and in which development of their high-speed algorithms heavily affect society, are typically non-linear. Consequently, the systems cannot be efficiently learned using the HHL algorithm.

Non-patent literature 1 introduces learning in classical Boltzmann machines and quantum Boltzmann machines as applications to learning in nonlinear systems of quantum computers. The learning of a classical Boltzmann machine quantum computer can be achieved only by limited operations. Consequently, experiments are performed using quantum annealers, which have already been commercialized. It has been theoretically proved that the amount of computation and the number of data samples required for learning are $\sqrt{N}$ though the learning in the quantum Boltzmann machine using hardware is in a preparatory stage. However, the Boltzmann machine is a type of a stochastic recurrent neural network, and is a special system as a neural network.

The quantum learning algorithm described above is inapplicable to the learning in a feed-forward neural network, which is typically used as a deep neural network.

The learning of the weights of each layer in the feed-forward neural network can be reduced to a problem of solving a linear equation having errors. This is a problem similar to a lattice problem called LWE (learning with errors) used for next-generation post-quantum public-key cryptography and the like. The lattice problem typified by the shortest vector problem is a fundamental problem used not only for artificial intelligence but also for next-generation cryptography. A method of dealing with this problem on a current computer (hereinafter also called "classical computer") and a quantum computer has been researched in detail. Hereinafter a method through a classical computer and a method through a quantum computer are separately described.

A most typical classical algorithm for solving a lattice problem is a lattice reduction algorithm. Given a basis of a vector space, a lattice reduction algorithm computes a new basis so that each pair of vectors in the basis is nearly orthogonal. Accordingly, for all pairs of basis vectors, the algorithm repeatedly performs operations, each of which is similar to the Gram-Schmidt orthogonalization. The length of the shortest vector obtained by the lattice reduction algorithm exponentially increases with the length of the shortest vector intended to be obtained, in the worst case.

As quantum algorithms for solving a lattice problem, for example, the methods of Oded Regev, Quantum Computation and Lattice Problems, SIAM Journal on Computing, Vol 33, No. 3, pp. 738-760, (2004) (hereinafter referred to as Non-patent literature 3) and T. Laarhoven and M. Mosca and J. van de Pol, Finding shortest lattice vectors faster using quantum search, Designs, Codes and Cryptography, Vol 7. No 2, pp. 375-400 (2015) (hereinafter referred to as Non-patent literature 4) have been proposed. Non-patent literature 3 creates a quantum state called dihedral coset state based on the closest vector problem, and obtains a solution using quantum Fourier transform. Non-patent literature 4 searches for a solution using probability amplitude amplification. Unfortunately, none of the methods is guaranteed to solve the lattice problem efficiently. That is, a quantum algorithm that efficiently solves the lattice problem has not been found.

SUMMARY OF THE INVENTION

Problems to be Solved by the Invention

The present invention has an object to provide a method of combining a classical computer and a quantum computer in a hybrid manner to solve a lattice problem at higher speed than conventional methods. That is, the object is to provide a method that can be achieved even by a quantum computer incapable of having a long execution time period owing to decoherence due to noise and can solve the lattice problem in a shorter time period than conventional methods, by causing the classical computer to deal with light tasks in the entire computation process and by causing the quantum computer to deal with heavy tasks therein. Another object is to provide a method of applying an algorithm of solving the lattice problem to learning in a feed-forward neural network.

Means to Solve the Problems

For inputs of a basis B and a target vector t, or an n-dimensional target vector $a_j=(a_{1j}, \ldots, a_{nj})^T$, $t=g=(g_1, \ldots, g_n)^T$ satisfying $$\begin{pmatrix} a_{11} & \cdots & a_{1m'} \\ a_{21} & \cdots & a_{2m'} \\ a_{31} & \cdots & a_{3m'} \\ \vdots & \ddots & \vdots \\ a_{n1} & \cdots & a_{nm'} \end{pmatrix} \begin{pmatrix} X_1 \\ \vdots \\ X_{m'} \end{pmatrix} + \begin{pmatrix} d_1 \\ d_2 \\ d_3 \\ \vdots \\ d_n \end{pmatrix} \mod N' \begin{pmatrix} g_1 \\ g_2 \\ g_3 \\ \vdots \\ g_n \end{pmatrix} \quad (1)$$

and an integer N', $\{r_{ji}^{(c)}, r_{ji}^{(d)}, r_{j0}\}$ and m, M, and N that satisfy $$\left( \begin{pmatrix} r_{11}^{(c)} & \cdots & r_{1n}^{(c)} \\ r_{21}^{(c)} & \cdots & r_{2n}^{(c)} \\ r_{31}^{(c)} & \cdots & r_{3n}^{(c)} \\ \vdots & \ddots & \vdots \\ r_{m1}^{(c)} & \cdots & r_{mn}^{(c)} \end{pmatrix} + \begin{pmatrix} r_{11}^{(d)} & \cdots & r_{1n}^{(d)} \\ r_{21}^{(d)} & \cdots & r_{2n}^{(d)} \\ r_{31}^{(d)} & \cdots & r_{3n}^{(d)} \\ \vdots & \ddots & \vdots \\ r_{m1}^{(d)} & \cdots & r_{mn}^{(d)} \end{pmatrix} \right) \begin{pmatrix} t_1^{(d)} \\ \vdots \\ t_n^{(d)} \end{pmatrix} + \begin{pmatrix} e_1 \\ e_2 \\ e_3 \\ \vdots \\ e_m \end{pmatrix} \mod N = \quad (2)$$

$$\begin{pmatrix} \mathrm{round}\left(\frac{r_{10}N}{M}\right) \\ \mathrm{round}\left(\frac{r_{20}N}{M}\right) \\ \mathrm{round}\left(\frac{r_{30}N}{M}\right) \\ \vdots \\ \mathrm{round}\left(\frac{r_{m0}N}{M}\right) \end{pmatrix}$$

are obtained and output. First, a dual basis B⁻ of basis B of modulo N is obtained by classical computation. Next, quantum computation is performed using the periodicity of a point sequence included in a sum set of sets obtained by parallel translation of a lattice L(B) by integral multiples for a plurality of integers, and an n-dimensional vector $r_j = (r_{j1}, \ldots, r_{jn})$ and $r_{j0}$ are obtained for $j=1, \ldots, m$. Subsequently, by classical computation, the closest vector $r_j^{(c)} = (r_{j1}^{(c)}, \ldots, r_{jn}^{(c)}) \in L(B^-)$ of the n-dimensional vector $r_j$, and the difference vector $r_j^{(d)} = r_j - r_j^{(c)} = (r_{j1}^{(d)}, \ldots, r_{jn}^{(d)})$ corresponding to $r_j^{(c)}$ are obtained.

Effects of the Invention

As described above, the closest vector problem (CVP) about the basis B and the target vector t, and the learning with errors (LWE) of Formula (1) can be efficiently transformed into the problem of Formula (2). The solution (difference vector $t^{(d)}$) of the problem of Formula (2) can be obtained by classical computation. Accordingly, the present invention can solve the lattice problem.

DETAILED DESCRIPTION OF THE EMBODIMENTS

Figure 1:
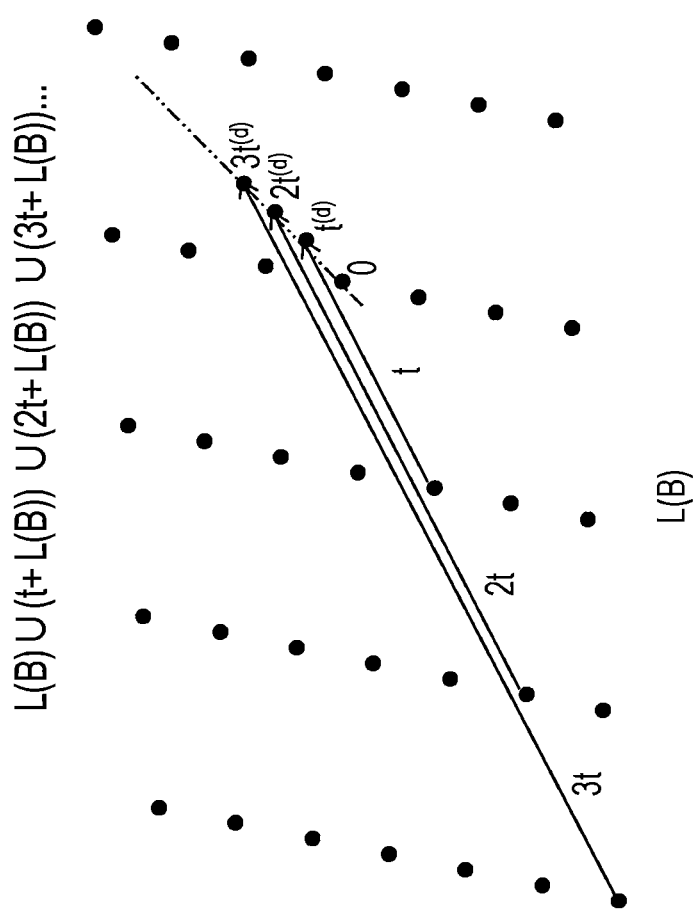
FIG. 1 is a conceptual diagram for illustrating the principle of an embodiment.

Embodiments of the present invention are hereinafter described with reference to the drawings.

The present invention provides a novel quantum computation method that speeds up the learning in a feed-forward neural network. The learning of the weight of each layer in the feed-forward neural network can be reduced to a problem of solving a linear equation having errors. This is a problem similar to a lattice problem called LWE (learning with errors) used for next-generation post-quantum public-key cryptography and the like. Accordingly, first, a quantum computation apparatus that solves a lattice problem at high speed is described (a first embodiment to a fourteenth embodiment), and a learning system that applies the quantum computation apparatus to perform learning in the feed-forward neural network (fifteenth embodiment). The back propagation, which are typically used for learning in the feed-forward neural network, cannot get out from a local optimal solution in a learning process. Meanwhile, a learning system proposed in a fifteenth embodiment achieves improvement in speed by globally searching for an optimal solution through taking advantage of the characteristics of quantum physics. Note that the lattice problem dealt with in the present invention is an NP-hard problem. Consequently, the proposed method is applicable not only to learning in the feed-forward neural network but also widely to a wide variety of the combinatorial optimization problem.

[Definition]

Terms used in the embodiments are defined.

n, m, m', M, N, N' are positive integers. i=1, . . . , n. j=1, . . . , m. u=1, . . . , n. s is an n-dimensional vector having integer elements. $r_{ji}^{(c)}$, $r_{ji}^{(d)}$, $r_{j0}$, $X_j$, $d_i$, $g_i$ and $e_j$ are integers. L and $\gamma$ are positive real numbers. $a_j$ is an n-dimensional vector $a_j=(a_{1j}, \ldots, a_{nj})^T$ having n integer elements $a_{1j}, \ldots, a_{nj}$. g is an n-dimensional vector $g=(g_1, \ldots, g_n)^T$ having n elements $g_1, \ldots, g_n$. $\varepsilon_u$ is an n-dimensional unit vector $\varepsilon_u=(0, \ldots, 1, 0, \ldots, 0)^T$ that has the u-th element of 1 and the other elements of 0.

$\eta^T$ represents the transpose of $\eta$. $\eta$ is a vector or a matrix. $|\Lambda|$ represents the number of elements of a set $\Lambda$. ABS($\mu$) represents the absolute value of $\mu$. $\|\eta\|$ represents the norm of $\eta$. For example, $\|\eta\|$ represents the Euclidean norm (length) of $\eta$. round($\mu$) is the integer closest to $\mu$. That is, round represents a round function. floor($\mu$) is the maximum integer that is equal to or less than $\mu$. That is, floor represents a floor function, ceil($\mu$) is the minimum integer that is equal to or more than $\mu$. That is, ceil represents a ceiling function. $\lambda \in \Lambda$ means that $\lambda$ is an element of a set $\Lambda$. $\langle \tau, \chi \rangle$ represents the inner product between a vector $\tau$ and a vector $\chi$. det($\eta$) represents the determinant of $\eta$. $|\delta\rangle$ represents a column vector that indicates the quantum state corresponding to $\delta$. $|\delta_1\rangle|\delta_2\rangle$ represents the tensor product between $|\delta_1\rangle$ and $|\delta_2\rangle$.

$B=\{b_1, \ldots, b_n\}$ is a basis having linearly independent n n-dimensional vectors $b_i$ (i.e., B is a set of linearly independent n-dimensional vectors $b_1, \ldots, b_n$). Each of the n-dimensional vector $b_i=(b_{i1}, \ldots, b_{in}) \in Z^n$ has n integer elements $b_{i1}, \ldots, b_{in} \in Z$. Z represents the set of integers. $\beta$ is a matrix that has n rows and n columns and has an n-dimensional vector $b_1, \ldots, b_n$ of the basis B, as elements. This $\beta$ is called the basis matrix of the basis B. For example, $\beta$ is the following matrix having an n-dimensional vector $b_i$ as the i-th component (row vector).

$$\beta = \begin{pmatrix} b_{11} & \cdots & b_{1n} \\ \vdots & \ddots & \vdots \\ b_{n1} & \cdots & b_{nn} \end{pmatrix}$$

$t=(t_1, \ldots, t_n)^T$ is a target vector having n integer elements $t_i \in Z$.

L(B) is a lattice $\{\Sigma_{i=1, \ldots, n} x_i b_i | x_i \in Z, b_i \in B\}$. Note that $x_i$ is an integer. That is, $$L(B)=\Sigma_{b_i \in B} Z b_i$$

For an n-dimensional vector t and a lattice L(B), $\tau+L(B)$ represents a set obtained by parallel-translating all the lattice points of the lattice L(B) by an n-dimensional vector $\tau$. That is, $\tau+L(B)=\{\tau+\chi | \chi \in L(B)\}$. $\tau+L(B)=L(B)+\tau$.

A hyperplane made of a subset B' of the basis B is represented as H(B'). The hyperplane H(B') means a vector space $\{\Sigma_{i=1, \ldots, n'} \zeta_i \in Re, b_i' \in B'\}$ spanned by vectors $b_i' \in B'$, which are the elements of the subset B'. Note that $\zeta_i$ is a real number. That is, $$H(B')=\Sigma_{b_i' \in B} Re b_i'$$

Re represents the set of real numbers.

t is an n-dimensional vector $t=(t_1, \ldots, t_n)^T$ having n integer elements $t_1, \ldots, t_n$. The origin of the n-dimensional vector t is any of the lattice points (the points on the lattice L(B)). Vectors from the origin to the respective lattice points are called lattice point vectors.

<Lattice Problem>

The lattice problem dealt with the embodiments is briefly described. See reference literatures 1 and 2 for the further details.

[Reference literature 1] Daniele Micciancio and Shafi Goldwasser, Complexity of Lattice Problems: a cryptographic perspective, Kluwer Academic Publishers, The Kluwer International Series in Engineering and Computer Science, vol. 671 (2002).

[Reference literature 2] Cohen, Henri, A Course in Computational Algebraic Number Theory, Springer-Verlag New York, Inc., ISBN 0-387-55640-0 (1993).

<<Shortest Vector Problem (SVP)>>

Given the basis B, the shortest vector problem is the problem of obtaining a lattice point closest to the origin in the lattice L(B) (the vector from the origin to the lattice point closest to the origin; that is, the shortest vector). When the ratio between the length of the shortest vector and the vector second-closest to the origin in the lattice L(B) is $\gamma$ or higher, the shortest vector problem is called $\gamma$-unique SVP. The shortest vector problem is NP-hard. The difficulty of the problem can be adjusted by changing $\gamma$. It is known that the shortest vector problem can be reduced to the closest vector problem. Consequently, the closest vector problem is at least as hard as the shortest vector problem.

<<Closest Vector Problem (CVP)>>

Given the pair (B, t) of the basis B and the target vector t, the closest vector problem is a problem of obtaining the closest vector $t^{(c)} \in L(B)$ on the lattice L(B) where the difference vector with the target vector t is the shortest. The closest vector problem for the pair (B, t) is represented as CVP(B, t). The closest vector $t^{(c)} \in L(B)$ is the lattice point vector closest to the target vector t. $t^{(d)}$ represents the difference vector $t^{(d)}=t-t^{(c)}=(t_1^{(d)}, \ldots, t_n^{(d)})^T$ between the target vector t and the closest vector $t^{(c)} \in L(B)$. Such a difference vector $t^{(d)}$ is called the shortest difference vector. When the ratio between the shortest difference vector $t^{(d)}=t-t^{(c)}$ and the difference vector between the target vector t and the lattice point vector second-closest to the target vector t is $\gamma$ or higher, the closest vector problem is called $\gamma$-gap CVP. The Rounding-Off algorithm and the Nearest Plane algorithm, which have been proposed by Babai, are known as classical algorithms of approximately solving the closest vector problem.

[Reference literature 3] L. Babai, On Lovasz Lattice Reduction and the Nearest Lattice Point Problem, Combinatorica, Vol. 6, No. 1, pp. 1-13, (1986).

However, the approximation ratios of solutions obtained by these algorithms are respectively $1+2n(9/2)^{n/2}$ and $2^{n/2}$. Both only guarantee the exponential approximation rates of the dimension.

As a problem more fundamental than the closest vector problem, the following $GapCVP_\gamma$ has been known. While the closest vector problem is a search problem, $GapCVP_\gamma$ is a decision problem (a problem for an answer of Yes/No).

<<$GapCVP_\gamma$>>

Given the pair (B, t) of the basis B and the target vector t and the length L, $GapCVP_\gamma$ is a decision problem that decides whether dist(B, t)≤L(Yes instance) or dist(B, t)>γL (No instance) provided that any one of dist(B, t)≤L and dist(B, t)>γL is necessarily true. Here, dist(B, t) is the length of the shortest difference vector $t^{(d)}$ (i.e., $\|t^{(d)}\|$). The smaller γ is, the more difficult $GapCVP_\gamma$ is.
When $$\gamma=n^{o(1/log2log2n)},$$

it has been known that $GapCVP_\gamma$ is NP-hard.

[Reference literature 4] Dinur, I. and Kindler, G. and Safra, S., Approximating-CVP to Within Almost-Polynomial Factors is NP-Hard, Proceedings of the 39th Annual Symposium on Foundations of Computer Science, FOCS '98, IEEE Computer Society, Washington, D.C., USA, pp. 99-111 (1998).

On the contrary, when $\gamma \geq \sqrt{n}$, it is expected that $GapCVP_\gamma$ is not NP-hard.

[Reference literature 5] Tatsuaki Okamoto, "Promenade of industrial and applied mathematics (79) Cryptography for the future" (in Japanese), Industrial and applied mathematics, Vol. 24, No. 3, pp. 36-39, December, (2014).

While SVP, CVP, and $GapCVP_\gamma$ are lattice problems having been researched since a long time ago, the following LWE is a problem having been relatively recently proposed. LWE is used for prospective next-generation cryptography. Accordingly, LWE has been researched in detail, as well as the problem described above.

[Reference literature 6] Oded Regev, On Lattices, Learning with Errors, Random Linear Codes, and Cryptography, J. ACM, Vol 56, No. 6, 34:1-34:40 (2009).

<<LWE (Learning with Errors)>>

LWE is a problem of obtaining X from (A, g, N) provided that $g=(g_1, \ldots, g_n)^T$ is defined from positive integers m, n and N, n×m random matrix $A=(a_{ij})$ (i=1, ..., n, j=1, ..., m) having integer elements, m-dimensional random vector $X=(X_1, \ldots, X_m)^T$, and a short vector $d=(d_1, \ldots, d_n)^T$ having elements each complying with the Gaussian distribution, by $$\begin{pmatrix} g_1 \\ g_2 \\ g_3 \\ \vdots \\ g_n \end{pmatrix} = \begin{pmatrix} a_{11} & \cdots & a_{1m} \\ a_{21} & \cdots & a_{2m} \\ a_{31} & \cdots & a_{3m} \\ \vdots & \ddots & \vdots \\ a_{n1} & \cdots & a_{nm} \end{pmatrix} \begin{pmatrix} X_1 \\ \vdots \\ X_{m'} \end{pmatrix} + \begin{pmatrix} d_1 \\ d_2 \\ d_3 \\ \vdots \\ d_n \end{pmatrix} \mod N \quad (3)$$

Note that $X_j$ is an integer. When d is given, X can be computed from (3). Accordingly, d may be obtained.

In general, $\{x \in Z^n | <x,b> \in Z$ for all $b \in L(B)\}$ is called "dual lattice" of the lattice L(B).

[Reference literature 7] Daniele Micciancio and Shafi Goldwasser, Complexity of Lattice Problems: a cryptographic perspective, Kluwer Academic Publishers, The Kluwer International Series in Engineering and Computer Science, vol. 671 (2002).

The "dual lattice of modulo N" introduced in each embodiment is different from the general "dual lattice". The dual lattice of modulo N is introduced because the result of execution of N-dimensional quantum Fourier transform to all coordinate axes in a state of superposition of lattices is a superposition of the dual lattice of modulo N. An LLL-reduced basis of the dual lattice of modulo N is called a "dual basis of modulo N". Here, see pp. 33-35 of reference literature 1 for the definition of LLL-reduced basis. It has been known that application of LLL algorithm to any basis obtains a basis satisfying the definition of the LLL-reduced basis (Chapter 2.2 of Reference literature 1). Consequently, the dual basis of modulo N is obtained by applying the LLL algorithm to a basis of the dual lattice of modulo N. The dual basis of modulo N can be efficiently computed using the Hermite normal form.

<<Dual Lattice of Modulo N>>

The lattice defined by $\{\tau \in Z^n | <\tau, \chi> = 0 \mod N$ for all $\chi \in L(B)\}$ for the basis B and the integer N is called "dual lattice of modulo N". An LLL-reduced basis of the dual lattice of the lattice L(B) of modulo N is written as $B^-$, and is called a dual basis of modulo N. Note that the upper right index "-" of "$B^-$" should be properly notated immediately above "B". However, due to the limitation of the descriptive notation, the index is sometimes notated at the upper right of "B".

In each embodiment, the concept of the dual basis of modulo N is used to introduce the concept of "modified LWE". As described later, the modified LWE can be efficiently obtained from CVP or LWE using a quantum computer, while it can be efficiently decided whether the length of the solution of the modified LWE is L or less or larger than γL using a classical computer.

<<Modified LWE>>

The modified LWE is modification of LWE, and is a problem of obtaining X from (A, g, N) provided that $g=(g_1, \ldots, g_m)^T$ is defined from positive integers m, n and N, and a m×n matrix $A=(a_{ji})$ (j=1, ..., m, i=1, ..., n) having integer elements that satisfies $$\begin{pmatrix} a_{11} & \cdots & a_{1n} \\ a_{21} & \cdots & a_{2n} \\ a_{31} & \cdots & a_{3n} \\ \vdots & \ddots & \vdots \\ a_{m1} & \cdots & a_{mn} \end{pmatrix} = \begin{pmatrix} a_{11}^{(c)} & \cdots & a_{1n}^{(c)} \\ a_{21}^{(c)} & \cdots & a_{2n}^{(c)} \\ a_{31}^{(c)} & \cdots & a_{3n}^{(c)} \\ \vdots & \ddots & \vdots \\ a_{m1}^{(c)} & \cdots & a_{mn}^{(c)} \end{pmatrix} + \begin{pmatrix} a_{11}^{(d)} & \cdots & a_{1n}^{(d)} \\ a_{21}^{(d)} & \cdots & a_{2n}^{(d)} \\ a_{31}^{(d)} & \cdots & a_{3n}^{(d)} \\ \vdots & \ddots & \vdots \\ a_{m1}^{(d)} & \cdots & a_{mn}^{(d)} \end{pmatrix}$$

where $(a_{j1}^{(c)}, \ldots a_{jn}^{(c)}) \in L(B^-)$ holds for all j=1, ..., m and $(a_{j1}^{(d)}, \ldots a_{jn}^{(d)})$ is a short vector, n-dimensional vector $X=(X_1, \ldots, X_n)^T$, and a short vector $d=(d_1, \ldots, d_m)^T$ having the elements each complying with the Gaussian distribution, by $$\begin{pmatrix} g_1 \\ g_2 \\ g_3 \\ \vdots \\ g_m \end{pmatrix} = \begin{pmatrix} a_{11} & \cdots & a_{1n} \\ a_{21} & \cdots & a_{2n} \\ a_{31} & \cdots & a_{3n} \\ \vdots & \ddots & \vdots \\ a_{m1} & \cdots & a_{mn} \end{pmatrix} \begin{pmatrix} X_1 \\ \vdots \\ X_n \end{pmatrix} + \begin{pmatrix} d_1 \\ d_2 \\ d_3 \\ \vdots \\ d_m \end{pmatrix} \mod N \quad (4)$$

When d is given, X can be computed from (4). Accordingly, d may be obtained.

The details of the extended Euclidean algorithm and the Smith normal form, and the Hermite normal form are described in the following Literatures, for example.

[Reference literature 8] Cohen, Henri, A Course in Computational Algebraic Number Theory, Springer-Verlag New York, inc., ISBN 0-387-55640-0 (1993).

[Reference literature 9] Ravindran Kantian and Achim Bachem, Polynomial Algorithms for Computing the Smith and Hermite Normal Farms of an Integer Matrix, SIAM Journal on Computing, vol. No. 4, pp. 499-507, (1979).

[Reference literature 10] Storjohann, Arne, Near Optimal Algorithms for Computing Smith Normal Forms of Integer Matrices. Proceedings of the 1996 International Symposium on Symbolic and Algebraic Computation, ISSAC '96, pp. 267-274 (1996).

[Reference literature 11] Galbraith, Steven D., Mathematics of Public Key Cryptography. Cambridge University Press, ISBN 978-1107013926 (2012).

The Hermite normal form and the Smith normal form are described.

It is known that the length of the shortest vector of the random n-dimensional lattice can be approximated by $$\sqrt{\frac{n}{2\pi e}} \det(B)^{1/n}$$

Here, det(B) is the determinant of the matrix made by Use basis of the lattice. The value $$\sqrt{\frac{n}{2\pi e}} \det(B)^{1/n}$$

is called Gaussian heuristic (for example, see p. 344 of Reference literature 11). Let m" and n" be positive integers satisfying m"≥n". m"×n" integer matrix A"= $(a''_{o\xi})_{1 \leq o \leq m'', 1 \leq \xi \leq n''}$ being in (row) Hermite normal form (abbreviated as HNF) means that there are an integer 1≤r"≤n" and a monotonically increasing function f: {1, . . . , n"−r"}→{1, . . . ,m"} (i.e., f(σ+1)>f(σ)), and the following holds.

1. The elements on the last r" row is 0.
2. $0 \leq a''_{\xi f(\sigma)} < a'_{\sigma f(\sigma)}$ for 1≤ξ<σ, and $a''_{\xi f(\sigma)}=0$ for σ<ξ≤n".

Accordingly, the Hermite normal form can be written in the following form.

$$\begin{pmatrix} * & * & \cdots & * \\ 0 & * & \cdots & * \\ \vdots & \ddots & \ddots & \vdots \\ 0 & \cdots & 0 & * \\ 0 & \cdots & 0 & 0 \\ \vdots & \vdots & \vdots & \vdots \\ 0 & \cdots & 0 & 0 \end{pmatrix}$$

The unique m"×n" integer matrix $A_H$ in Hermite normal form, and m×m unimodular matrix U (not necessarily unique) exist, for m"×n" integer matrix A"= $(a''_{o\xi})_{1 \leq o \leq m'', 1 \leq \xi \leq n''}$.

$$UA''=A_H$$

holds. Here, the unimodular matrix is a square matrix that has integer elements and the determinant of the matrix is +1 or −1 (invertible, accordingly). U is called a transforming matrix. It is known that the integer matrix $A_H$ in Hermite normal form and the transforming matrix U can be efficiently computed from the integer matrix A".

Provided that m" and n" are positive integers satisfying m"≥n", m"×n" integer matrix A"= $(a''_{o\xi})_{1 \leq o \leq m'', 1 \leq \xi \leq n''}$ being in the Smith normal form means that the integer matrix A" can be written in the following form $$\begin{pmatrix} a''_{11} & & & & & \\ & \ddots & & & & \\ & & a''_{k''k''} & & & \\ & & & 0 & & \\ & & & & \ddots & \\ & & & & & 0 \end{pmatrix}$$

Note that k" is an integer of n" or less, $a''_{11}, \ldots, a''_{k''k''}$ satisfy $a''_{oo} | a''_{o+1 o+1}$, for all 1≤σ"<k". All of the blank parts of this matrix are 0. "γ1/γ2" represents that γ2 can be evenly divided by γ1. For example, A" is in the Smith normal form when the diagonal elements of the integer matrix A" are 1, 1, 3, 6, 24, 168, 0, 0 and 0 since $a''_{oo} | a''_{o+1 o+1}$ is satisfied for all σ=1, 2, . . . , 8. Meanwhile, A" is not in the Smith normal form when the diagonal elements of the integer matrix A" are 1, 1, 3, 6, 24, 128, 0, 0 and 0 since $a''_{oo} | a''_{o+1 o+1}$ is satisfied for σ=5.

It is known that, for m"×n" integer matrix A"= $(a''_{o\xi})_{1 \leq o \leq m'', 1 \leq \xi \leq n''}$, the unique Smith normal form $A_S$ and the unimodular matrices U and V (not necessarily unique) exist, and $$UA''V=A_S$$

holds, U and V are called transforming matrices. As with the Hermite normal form, it is known that the Smith normal form and the transforming matrices U and V can. be efficiently composed from A".

FIRST EMBODIMENT

Figure 2:
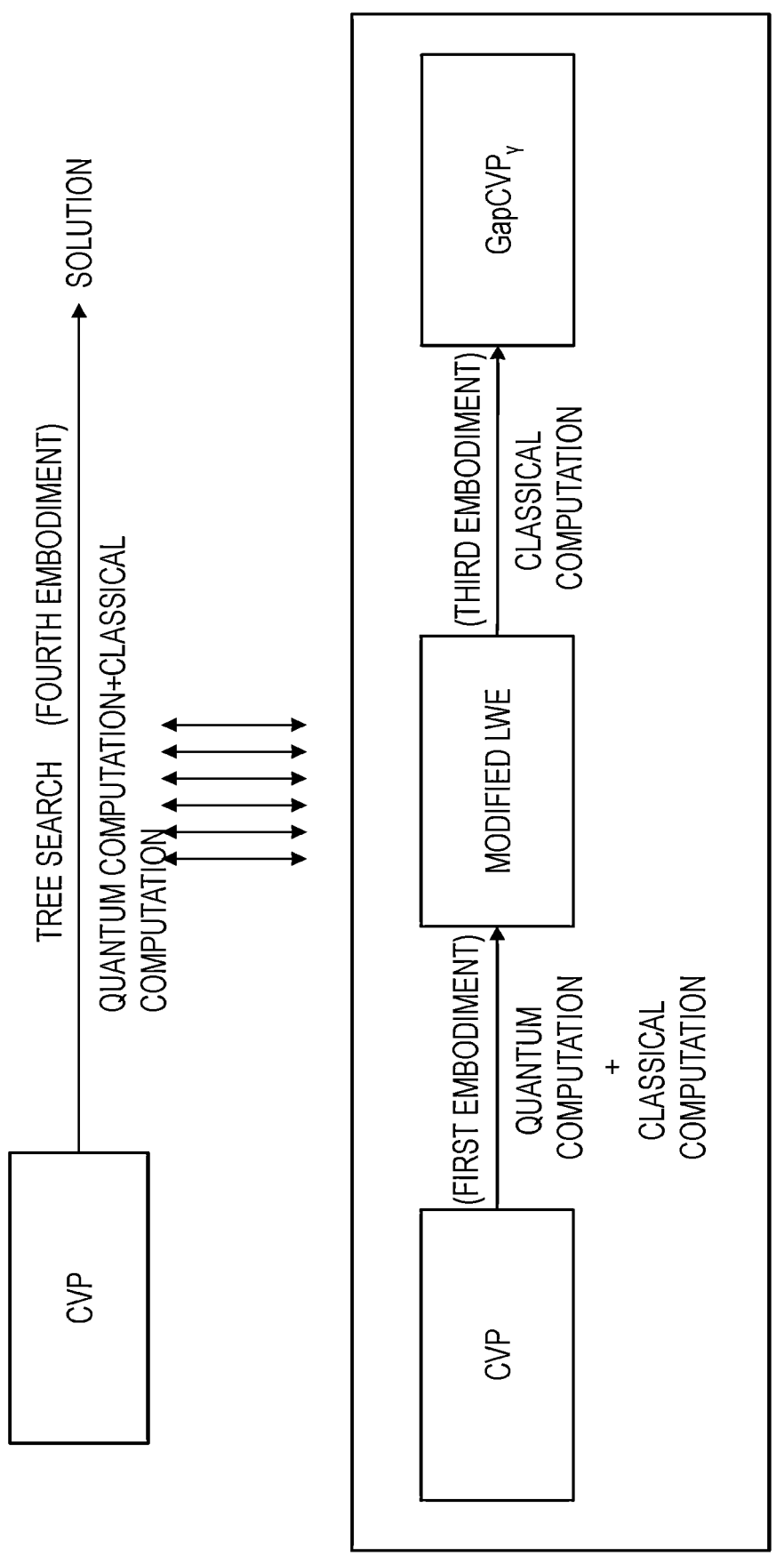
FIG. 2 is a conceptual diagram representing the correspondence relationship between the embodiments.

In a first embodiment, the CVP is transformed into the modified LWE by an operation (quantum computation) through a quantum computer and an operation (classical computation) through a classical computer (FIG. 2).

This embodiment has an object to transform the CVP into the modified LWE, which is a problem that can be computed at high speed on a quantum computer. Specifically, the parameters identifying the modified LWE problem corresponding to the input CVP are computed using the quantum computation and the classical computation.

A basic idea is described. In general, the lattice problem is believed to be difficult to be dealt with by the quantum computer, because the lattice problem has no periodicity with respect to the solution. However, the lattice has a structure symmetrical with respect to each lattice point. Accordingly, the periodicity with respect to the solution can be made. In this embodiment, quantum computation is performed using the periodicity of solution.

Specifically, the following method is adopted. The base is a method of solving the CVP. Let $t^{(d)}$ be the difference vector of solution of CVP for a pair (B, t). As exemplified in FIG. 1, the sum set $L(B) \cup (t+L(B)) \cup (2t+L(B)) \cup (3t+L(B)) \cup \ldots$ of $L(B)$, $t+L(B)$, $2t+L(B)$, $3t+L(B)$, ... is a set where the point sequences are arranged at intervals of $t^{(d)}$. In consideration of viewability of the diagram, FIG. 1 exemplifies only the point sequence based on one lattice point. In actuality, the point sequences based on all the lattice points are arranged at intervals of $t^{(d)}$. In the quantum computation of this embodiment, information on the point sequence arranged at equal intervals is taken by executing quantum Fourier transform on the quantum computer. Subsequently, the CVP with respect to the taken information is solved by classical computation to obtain the modified LWE.

<Configuration>

Figure 4:
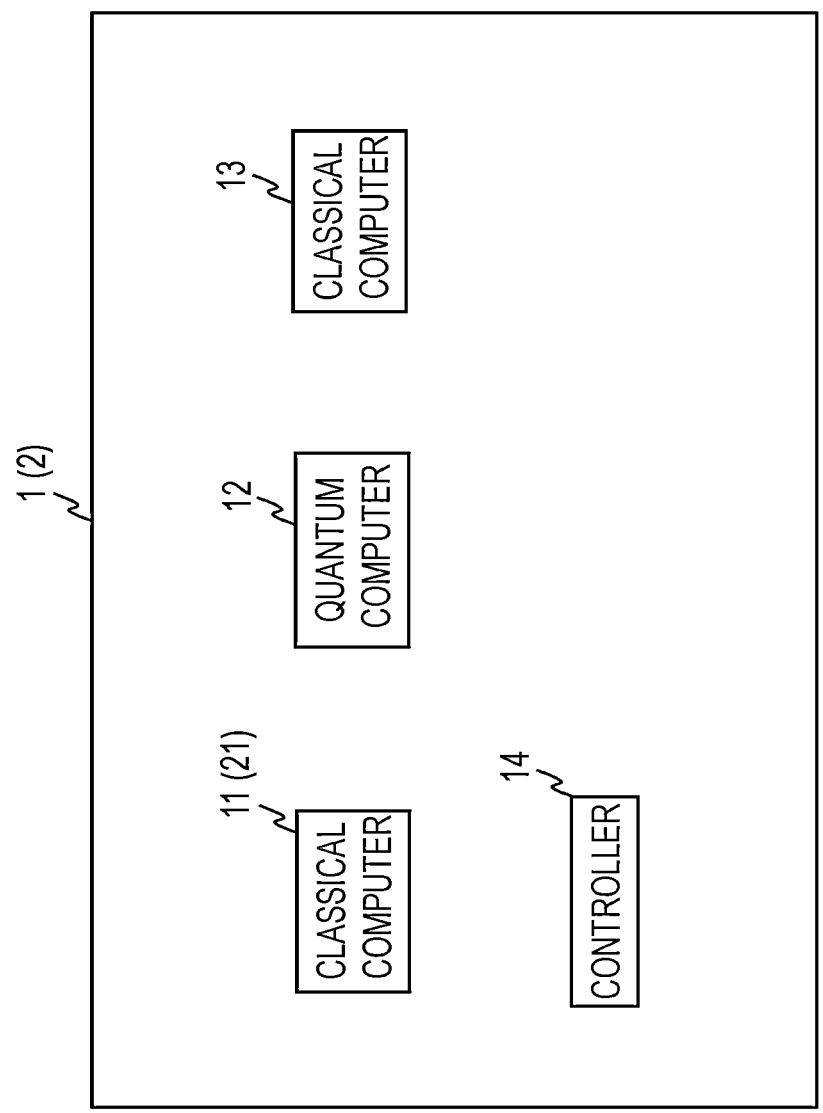
FIG. 4 is a block diagram exemplifying a functional configuration of a transformation apparatus of the embodiment.
Figure 5:
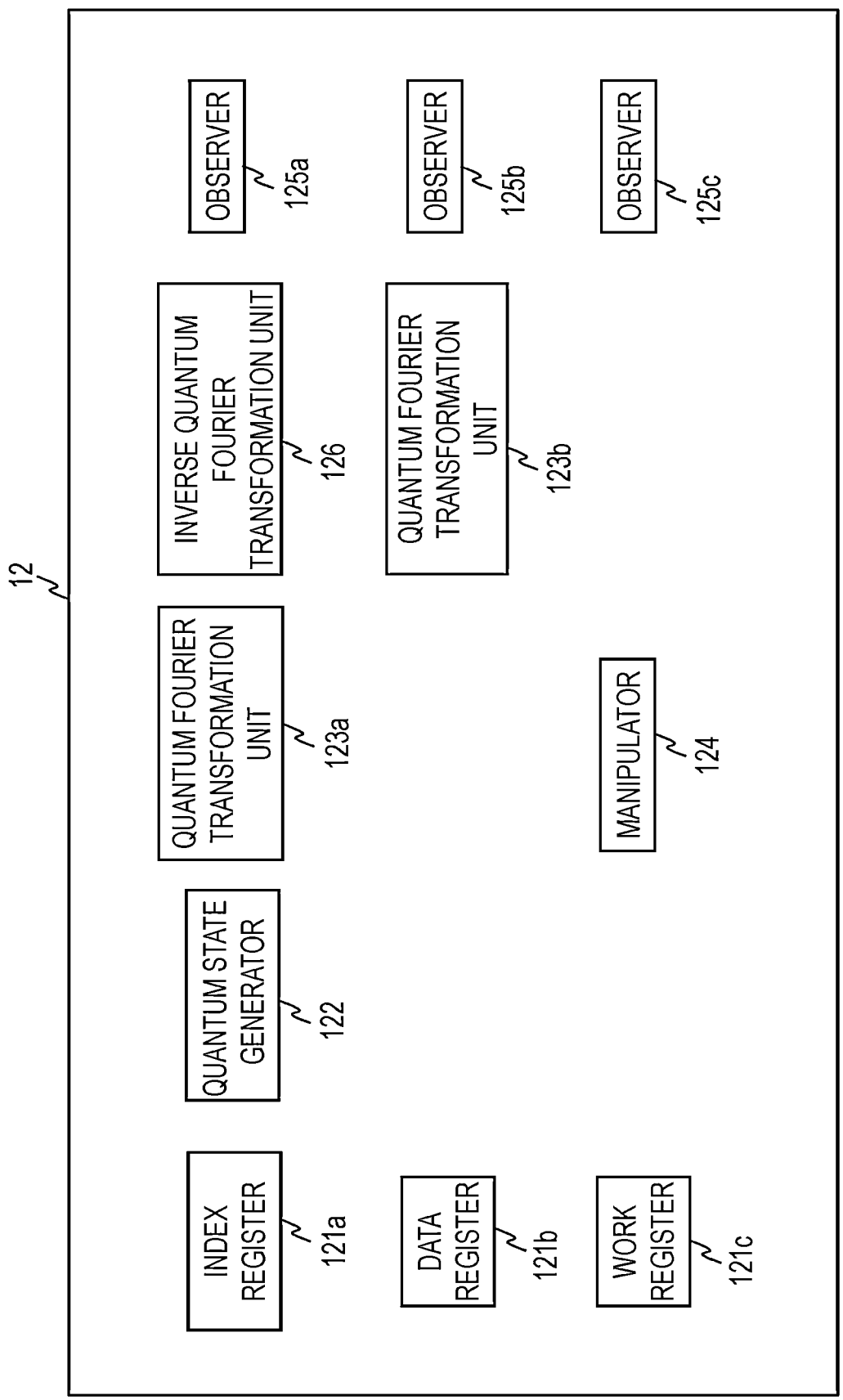
FIG. 5 is a block diagram exemplifying a functional configuration of a quantum computer in FIG. 4.
Figure 6:
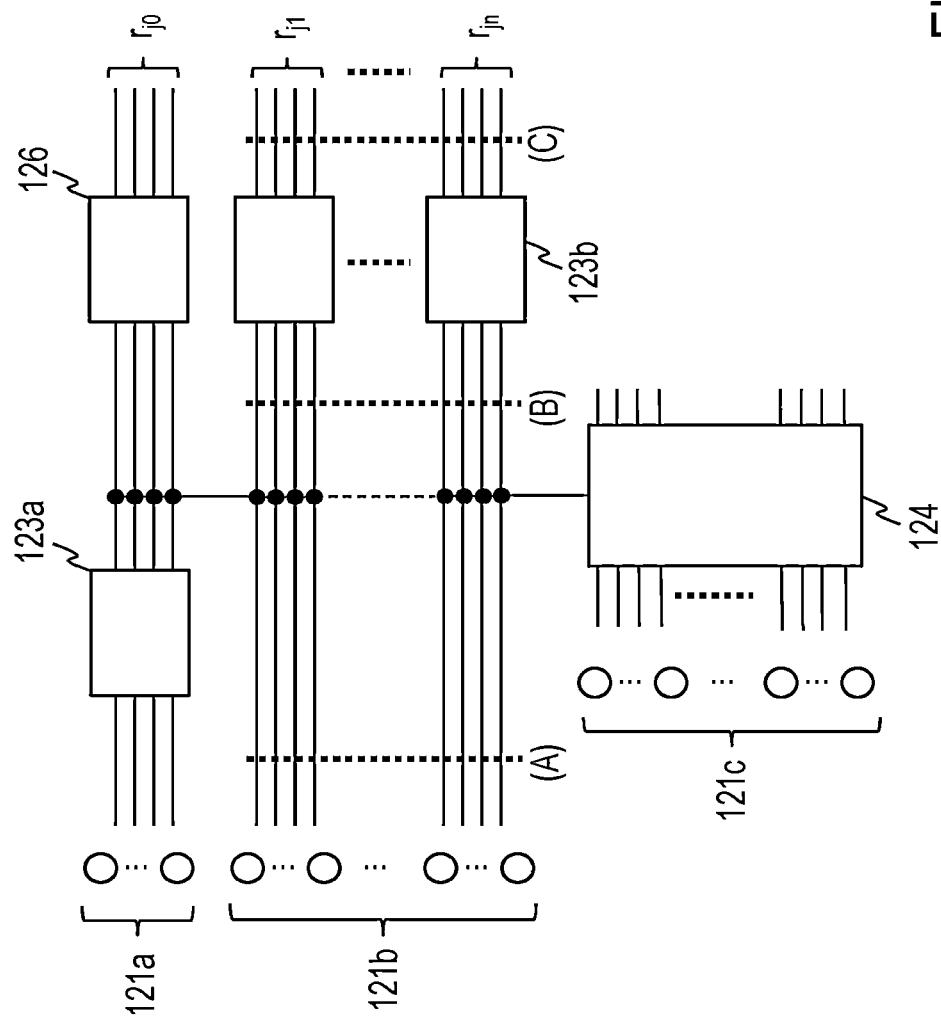
FIG. 6 exemplifies a quantum circuit of the quantum computer in FIG. 5.

As shown in FIG. 4, a transformation apparatus 1 of this embodiment includes classical computers 11 and 13 (first and second classical computers), a quantum computer 12, and a controller 14. The transformation apparatus 1 executes each process under control of the controller 14. The classical computers 11 and 13 include multiple arithmetic units (not shown). As exemplified in FIGS. 5 and 6, the quantum computer 12 includes an index register 121a, a data register 121b, a work register 121c, a quantum state generator 122, quantum Fourier transformation units 123a and 123b (first and second quantum Fourier transformation units), a manipulator 124, observers 125a to 125c, and an inverse quantum Fourier transformation unit 126. The transformation apparatus 1 includes processing circuitry configured to implement the classical computers 11 and 13 (first and second classical computers), the quantum computer 12, and the controller 14.

<Processes>

The processes of this embodiment are described. The transformation apparatus 1 of this embodiment receives the basis B and the target vector t for CVP(B, t) as inputs, and outputs $\{r_{ji}^{(c)}, r_{ji}^{(d)}, r_{j0}\}$ and m, M and N, which satisfy the modified LWE of Formula (5).

$$\left(\begin{pmatrix} r_{11}^{(c)} & \cdots & r_{1n}^{(c)} \\ r_{21}^{(c)} & \cdots & r_{2n}^{(c)} \\ r_{31}^{(c)} & \cdots & r_{3n}^{(c)} \\ \vdots & \ddots & \vdots \\ r_{m1}^{(c)} & \cdots & r_{mn}^{(c)} \end{pmatrix} + \begin{pmatrix} r_{11}^{(d)} & \cdots & r_{1n}^{(d)} \\ r_{21}^{(d)} & \cdots & r_{2n}^{(d)} \\ r_{31}^{(d)} & \cdots & r_{3n}^{(d)} \\ \vdots & \ddots & \vdots \\ r_{m1}^{(d)} & \cdots & r_{mn}^{(d)} \end{pmatrix}\right) \begin{pmatrix} t_1^{(d)} \\ t_2^{(d)} \\ \vdots \\ t_n^{(d)} \end{pmatrix} + \begin{pmatrix} e_1 \\ e_2 \\ e_3 \\ \vdots \\ e_m \end{pmatrix} \mod N = \begin{pmatrix} \text{round}\left(\frac{r_{10}N}{M}\right) \\ \text{round}\left(\frac{r_{20}N}{M}\right) \\ \text{round}\left(\frac{r_{30}N}{M}\right) \\ \vdots \\ \text{round}\left(\frac{r_{m0}N}{M}\right) \end{pmatrix} \quad (5)$$

The processes of this embodiment include classical computation (preprocess) by the classical computer 11, quantum computation by the quantum computer 12, and classical computation (postprocess) by the classical computer 13.

<<Classical Computation (Preprocess) by Classical Computer 11>>

The classical computer 11 (FIG. 4) receives the pair (B, t) as an input, and executes the following processes.

1. The arithmetic unit of the classical computer 11 computes and outputs the least common multiple N' of the denominators of the elements of the inverse matrix $\beta^{-1}$ of the basis matrix $\beta$ corresponding to the basis B (step S111).

2. The arithmetic unit of the classical computer 11 computes and outputs a dual basis $B^{-\prime} = \{b_1^{-\prime}, \ldots, b_n^{-\prime}\}$ of the basis B of modulo N' (step S112).

3. The arithmetic unit of the classical computer 11 selects and outputs the multiple N of N' (step S113).

4. The arithmetic unit of the classical computer 11 obtains and outputs the dual basis $B^- = (N/N')B^{-\prime} = \{(N/N')b_1^{-\prime}, \ldots, (N/N')b_n^{-\prime}\}$ of modulo N for the dual basis $B^{-\prime}$ (step S114). The dual basis $B^-$ is "dual basis of modulo N" of the basis B.

5. The arithmetic unit of the classical computer 11 selects and outputs a positive integer M (step S115). M<N. M is sufficiently smaller than N.

6. The arithmetic unit of the classical computer 11 selects and outputs a real number R satisfying $2R \leq N < 4R$ (step S116).

7. The arithmetic unit of the classical computer 11 selects and outputs a positive real number L (step S117). L is an estimate of the length $\|t^{(d)}\|$ of the shortest difference vector $t^{(d)}$. For example, $L \times M < N$ is satisfied.

8. The arithmetic unit of the classical computer 11 selects and outputs a positive integer m (step S118).

9. The classical computer 11 outputs (L, n, M, N, R, B, t) (step S119).

That is, the classical computer 11 uses the classical computer to generate (L, n, M, N, R, B, t), which are parameters required to start computation on the quantum computer from the input (B, t).

<<Quantum Computation by Quantum Computer 12>>

The quantum computer 12 (FIGS. 4 to 6) receives (L, n, M, N, R, B, t) as inputs, sets (prepares) a register string that includes the index register 121a having $\text{ceil}(\log_2(M+1))$ quantum bits, the data register 121b having $n \times \text{ceil}(\log_2(N+1))$ quantum bits, and the work register 121c having $n \times \text{ceil}(\log_2(\det(\beta)+1))$ quantum bits, and executes quantum computation m times on the string. The quantum computer 12 obtains the n-dimensional vector $r_j = (r_{j1}, \ldots, r_{jn}) \in [0,N)^n$ and $r_{j0} \in [0,M)$ at the j-th quantum computation, and outputs the vector. Note that i=n, j=m. The j-th quantum computation is hereinafter described. Here, m is a preset positive integer, and is required to have a larger value to increase the precision of the solution as the ratio between the closest vector and the second-closest vector becomes lower (the problem becomes more difficult). On the contrary, when the ratio between the closest vector and the second-closest vector is high, not so large value is required to be selected as m. For example, when the ratio between the closest vector and the second-closest vector is 4 or higher, m of 100 or larger can obtain a solution with a sufficiently high precision.

1. The quantum state generator 122 prepares a register string having the index register 121a, the data register 121b and the work register 121c in the following quantum states (step S122).

$$\frac{1}{\sqrt{|B_R|}} \sum_{x \in B_R} |0\rangle |x\rangle |0\rangle \quad (6)$$

Figure 7C:
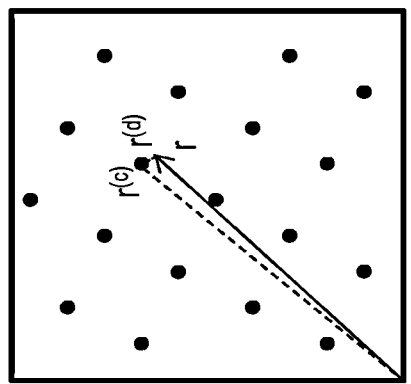
FIGS. 7A to 7C are conceptual diagrams for illustrating quantum computation.
Figure 7B:
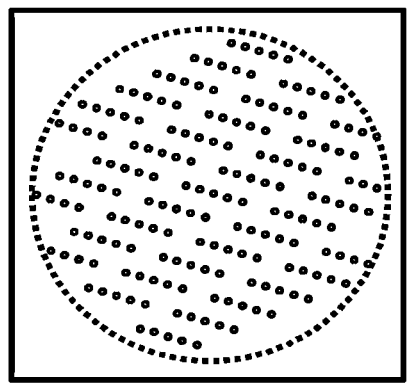
Figure 7A:
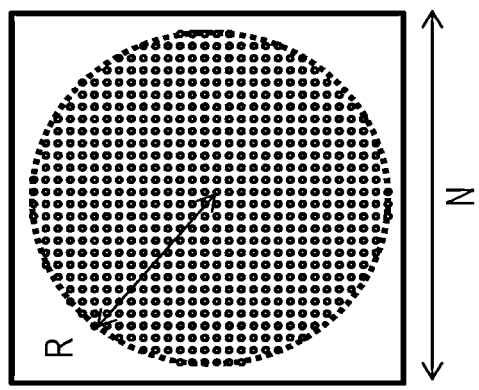

Note that $B_R$ represents a set of the point $x \in Z^n$ included in $[0,N)^n$. For example, $B_R$ is a partial region of $[0,N)^n$. $B_R$ is defined by the real number R, for example. Note that $[0,N)$ is a half-open interval that is 0 or more and less than N. For example, $B_R$ represents a set of the point $x \in Z^n$ having a distance from a predetermined n-dimensional reference point $N_{t'}/2 = (N/2, \ldots, N/2)$. In other words, for example, $B_R$ represents a set of vector from the origin to the point $x \in Z^n$. That is, $B_R = \{x \in Z^n | \|x - N_{t'}/2\| \le R\}$. FIG. 7A conceptually represents $B_R$ in a case of n=2. In the case of n=2, $B_R$ is a set of points belonging to a region encircled by a circle having a radius R centered on $(N/2, N/2)$. Note that among three column vectors in Formula (6), the left $|0\rangle$ represents the quantum state of the index register 121a, the middle $|x\rangle$ represents the quantum state of the data register 121b, and the right $|0\rangle$ represents the quantum state of the work register 121c.

2. The quantum Fourier transformation unit 123a executes M-dimensional quantum Fourier transform on the index register 121a (step S123a). Accordingly, the quantum state of the register string transitions (changes) to the following quantum state.

$$\frac{1}{\sqrt{M|B_R|}} \sum_{w=0}^{M-1} \sum_{x \in B_R} |w\rangle |x\rangle |0\rangle \qquad (7)$$

That is, the quantum state of the index register 121a changes to a superposed state of $|w\rangle$.

3. Given $w \in Z_M$ and $x \in Z_N^n$, $(y_{w,x,1}, \ldots, y_{w,x,n})$ is defined as an n-dimensional vector having elements of rational numbers $y_{w,x,1}, \ldots, y_{w,x,n}$ that satisfy $x - wt = y_{w,x,1} b_1 + \ldots + y_{w,x,n} b_n$. The manipulator 124 executes quantum manipulation that transforms the quantum state $|w\rangle |x\rangle |0\rangle$ into the quantum state in Formula (8), on the register string in the quantum state of Formula (7) obtained by the quantum Fourier transformation unit 123a (step S124).

$$|w\rangle |x\rangle |\det(\beta)(y_{w,x,1} - \text{floor}(y_{w,x,1})), \ldots, \det(\beta) (y_{w,x,n} - \text{floor}(y_{w,x,n}))\rangle \qquad (8)$$

4. The observer 125c observes the work register 121c in the quantum state of Formula (8) obtained by the manipulator 124 (step S125c). The quantum states of the index register 121a and the data register 121b then change to $$\frac{1}{\sqrt{M}} \sum_{w=0}^{M-1} \left( \frac{1}{\sqrt{|B_R \cap (L(B) + s + wt^{(d)})|}} \sum_{x \in B_R \cap (L(B) + s + wt^{(d)})} |w\rangle |x\rangle \right) \qquad (9)$$

Note that s is an indefinite n-dimensional vector. Among the two column vectors in Formula (9), the left $|w\rangle$ represents the quantum state of the index register 121a, and the right $|x\rangle$ represents the quantum state of the data register 121b. The quantum state of the data register 121b represents the state obtained by parallel-translating the aforementioned sum set $L(B) \cup (t+L(B)) \cup (2t+L(B)) \cup (3t+L(B)) \cup \ldots$ in $B_R$ by the n-dimensional vector s (FIG. 1). While s is indefinite, the quantum state represents the sequence of points arranged in $B_R$ at intervals of $t^{(d)}$. It is desirable that the norm $\|s\|$ of the n-dimensional vector s (e.g., the Euclidean norm $\|s\|$ of s) be sufficiently small. Preferably, the product of $\|s\|$ and M is less than ½ of the minimum value of the shortest vector in the lattice L(B). FIG. 7B conceptually shows the quantum state in a case of n=2.

5. The quantum Fourier transformation unit 123b executes n-dimensional quantum Fourier transform on the data register 121b in the quantum state of Formula (9) after observation by the observer 125c (step S123b).

As described above, the data register 121b includes n×ceil $(\log_2 (N+1))$ quantum bits. The n×ceil$(\log_2 (N+1))$ quantum bits are divided into in units of each ceil$(\log_2 (N+1))$ quantum bit. A subset of the data register 121b that includes in units of each ceil$(\log_2 (N+1))$ quantum bit is called a data sub-register 121b-i. The data register 121b has n data sub-register 121b-1, \ldots, 121b-n. The quantum Fourier transformation unit 123b executes the N-dimensional quantum Fourier transform on the data register 121b in the quantum state of Formula (9) in units of each data sub-register 121b-i. Accordingly, the quantum state of the data register 121b is the superposed state of the vector sum $t^{(c)} + t^{(d)}$ of the lattice point vector $t^{(c)}$ of the dual lattice $L(B^-) = \{\sum_{i=1,\ldots,n} x_i b^-_i | x_i \in Z, b^-_i \in B^-\}$ and the difference vector $t^{(d)}$. FIG. 7C conceptually shows the quantum state in a case of n=2.

6. The observer 125b observes the data register 121b in the quantum state obtained by the quantum Fourier transformation unit 123b, and obtains an observation result $(r_{j1}, \ldots, r_{jn})$ (step S125b). $r_{ji}$ is the observation result of the data sub-register 121b-i.i.

7. The inverse quantum Fourier transformation unit 126 executes M-dimensional inverse quantum Fourier transform on the index register 121a in the quantum state after observation by the observer 125b (step S126).

8. The observer 125a observes the index register 121a after the execution through the inverse quantum Fourier transformation unit 126, and obtains an observation result $r_{j0}$ (step S126).

The quantum computation described above is executed for $j=1, \ldots, m$, thereby obtaining $r_j = (r_{j1}, \ldots, r_{jn})$ and $r_{j0}$ for $j=1, \ldots, m$. The quantum computer 12 outputs $r_j$ and $r_{j0}$, which are the observation results described above.

<<Classical Computation (Postprocess) by Classical Computer 13>>

The classical computer 13 receives $r_j$ and dual basis $B^-$ of modulo N as inputs, obtains and outputs the closest vector $r_j^{(c)} = (r_{j1}^{(c)}, \ldots, r_{jn}^{(c)}) \in L(B^-)$ of the n-dimensional vector $r_j$ and the difference vector $r_j^{(d)} = r_j - r_j^{(c)} = )r_{j1}^{(d)}, \ldots, r_{jn}^{(d)})$, for the dual lattice $L(B^-) = \{\sum_{i=1,\ldots,n} x_i B^-_i | x_i \in Z, b^-_i \in B^-\}$ and the n-dimensional vector $r_j = (r_{j1}, \ldots, r_{jn})$ (step S13).

Here, $r_j^{(c)}$ and $r_j^{(d)}$ are each an n-dimensional vector. That is, the classical computer 13 computes the solution of $CVP(B^-, r_j)$ for the pair $(B^-, r_j)$ of the dual basis $B^-$ of modulo N and the n-dimensional vector $r_j = (r_{j1}, \ldots, r_{jn})$. When the value of N is larger than the dimension number n (for example, when the value of N is exponentially larger than the dimension number n), an exact solution of CVP $(B^-, r_j)$ of the n-dimensional vector $r_j$ obtained as described above can be obtained for the dual basis $B^-$ of modulo N using the classical computer (here, proof is omitted). For example, the classical computer 13 computes the closest vector $r_j^{(c)}$ that is the exact solution of this $CVP(B^-, r_j)$ and the difference vector $r_j^{(d)}$ using the nearest plane algorithm, and outputs the computed result. It can be proved that when N is large with reference to n, $\|r_j(d)\| < n$ at high probability. Consequently, the closest vector $r_j^{(c)}$ and the difference vector $r_j^{(d)}$ can be obtained by the nearest plane algorithm.

It can be theoretically proved that the integers N, M and m, the observation result $r_{j0}$, the closest vector $r_j^{(c)} =$ $(r_{j1}{}^{(c)}, \ldots, r_{jn}{}^{(c)})$ and the difference vector $r_j{}^{(d)} = (r_{j1}{}^{(d)}, \ldots, r_{jn}{}^{(d)})$ obtained as described above satisfy Formula (5) for the difference vector $t^{(d)} = t - t^{(c)} = (t_1{}^{(d)} \ldots, t_n{}^{(d)})^T$ that is the solution of CVP(B, t), and a vector $e = (e_1, \ldots, e_m)^T$ having small integer elements corresponding to errors (here, proof is omitted). The transformation apparatus 1 outputs the integers N, M and m, the observation result $r_{j0}$, the closest vector $r_j{}^{(c)} = (r_{j1}{}^{(c)}, \ldots, r_{jn}{}^{(c)})$ and the difference vector $r_j{}^{(d)} = (r_{j1}{}^{(d)}, \ldots, r_{jn}{}^{(d)})$, as information representing the modified LWE.

SECOND EMBODIMENT

Figure 3:
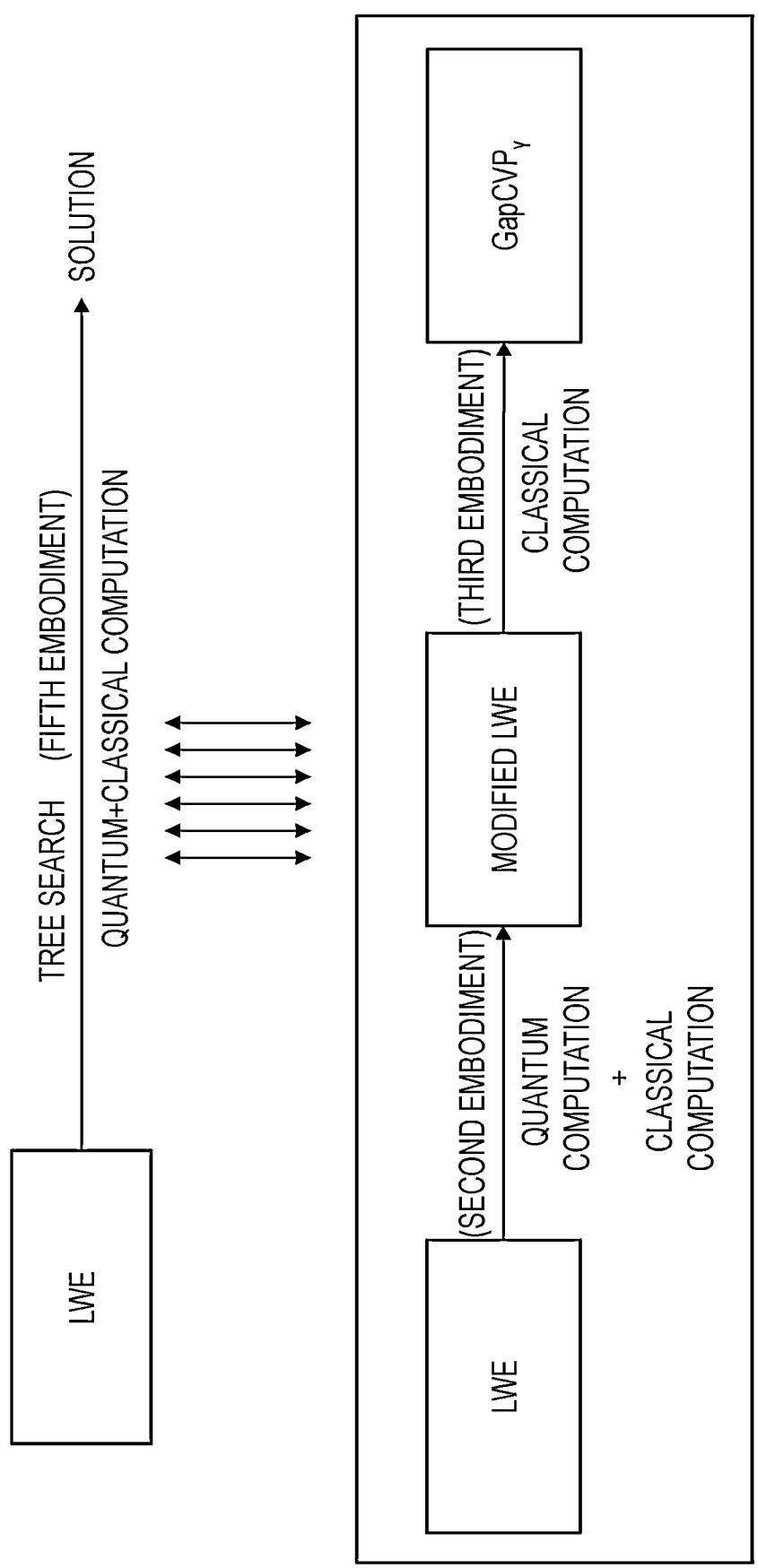
FIG. 3 is a conceptual diagram representing the correspondence relationship between the embodiments.

In a second embodiment, the LWE is transformed into the modified LWE by computation (quantum computation) through the quantum computer and computation (classical computation) through the classical computer (FIG. 3). Hereinafter, the difference from the first embodiment is mainly described. The same reference numerals are used for the items having already been described, and the description thereof is omitted.

As shown in FIG. 4, a transformation apparatus 2 of this embodiment includes classical computers 21 and 13 (first and second classical computers), a quantum computer 12, and a controller 14. The transformation apparatus 2 includes processing circuitry configured to implement the classical computers 21 and 13 (first and second classical computers), the quantum computer 12, and the controller 14.

<Processes>

The processes of this embodiment are described. The transformation apparatus 2 of this embodiment outputs $\{r_{ji}{}^{(c)}, r_{ji}{}^{(d)}, r_{j0}\}$ and m, M and N satisfying Formula (5) described above with t=g, for inputs that are the n-dimensional vectors $a_j = (a_{1j}, \ldots, a_{nj})^T$ and $g = (g_1, \ldots, g_n)^T$ satisfying $$\begin{pmatrix} a_{11} & \cdots & a_{1m'} \\ a_{21} & \cdots & a_{2m'} \\ a_{31} & \cdots & a_{3m'} \\ \vdots & \ddots & \vdots \\ a_{n1} & \cdots & a_{nm'} \end{pmatrix} \begin{pmatrix} x_1 \\ x_2 \\ \vdots \\ x_{m'} \end{pmatrix} + \begin{pmatrix} d_1 \\ d_2 \\ d_3 \\ \vdots \\ d_n \end{pmatrix} \bmod N' = \begin{pmatrix} g_1 \\ g_2 \\ g_3 \\ \vdots \\ g_n \end{pmatrix} \quad (10)$$

representing LWE and the integer N'. The processes of this embodiment include classical computation (preprocess) by the classical computer 21, quantum computation by the quantum computer 12, and classical computation (postprocess) by the classical computer 13. The difference from the first embodiment is only the classical computation (preprocess) by the classical computer 21. Only the preprocess is hereinafter described.

<<Classical Computation (Preprocess) by Classical Computer 21>>

The classical computer 21 (FIG. 4) receives $(a_1, \ldots, a_m, g, N')$ identifying LWE, as inputs, and executes the following processes.

1. The arithmetic unit of the classical computer 21 sets an LLL-reduced basis computed from $\{a_1, \ldots, a_m, N'\varepsilon_1, \ldots, N'\varepsilon_n\}$ as the basis B, and outputs $t = (t_1, \ldots, t_n)^T = g = (g_1, \ldots, g_n)$ (step S211). Note that $\varepsilon_u$ is an n-dimensional unit vector $\varepsilon_u = (0, \ldots, 1, 0, \ldots, 0)^T$ (u=1, ..., n) that has the u-th element of 1 and the other elements of 0.

2. The arithmetic unit of the classical computer 21 computes and outputs a dual basis $B^{-1} = \{b_1^{-1}, \ldots, b_n^{-1}\}$ of the basis B of modulo N' (step S112).

3. The arithmetic unit of the classical computer 21 selects and outputs a multiple N of N' (step S113).

4. The arithmetic unit of the classical computer 21 obtains and outputs the dual basis $B^= = (N/N')B^{-1} = \{(N/N')b_1^{-1}, \ldots, (N/N')b_n^{-1}\}$ of modulo N for the dual basis $B^{-1}$ (step S114).

5. The arithmetic unit of the classical computer 21 selects and outputs a positive integer M. M<N. M is sufficiently smaller than N (step S115).

6. The arithmetic unit of the classical computer 21 selects and outputs a real number R satisfying $2R \leq N < 4R$ (step S116).

7. The arithmetic unit of the classical computer 21 selects and outputs a positive real number L. For example, $L \times M < N$ is satisfied (step S117).

8. The arithmetic unit of the classical computer 21 selects (sets) and outputs a positive integer m (step S118).

9. The classical computer 21 outputs (L, n, M, N, R, B, t) (step S119).

Subsequently, the quantum computation by the quantum computer 12 and the classical computation (postprocess) by classical computer 13, which have been described in the first embodiment, are performed.

THIRD EMBODIMENT

In a third embodiment, $GapCVP_\gamma$ for the modified LWE transformed in the first embodiment or the second embodiment is solved by the classical computation (FIGS. 2 and 3). That is, it is decided whether the difference vector $t^{(d)}$ satisfying Formula (5) identified by $\{r_{ji}{}^{(c)}, r_{ji}{}^{(d)}, r_{j0}\}$ and m, M and N obtained in the first embodiment or the second embodiment satisfies $\|t^{(d)}\| \leq L$ or satisfies $\|t^{(d)}\| > \gamma L$.

<Configuration>

Figure 8:
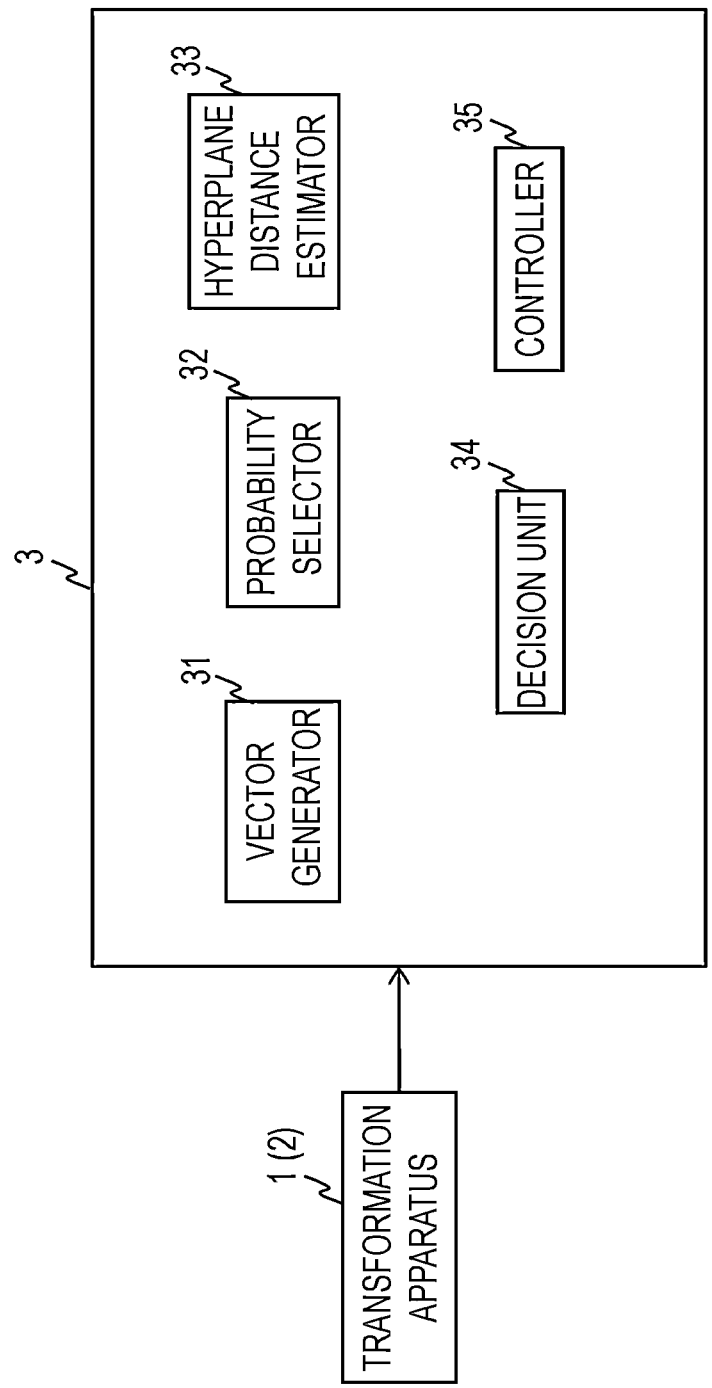
FIG. 8 is a block diagram exemplifying a functional configuration of a decision apparatus of the embodiment.
Figure 9:
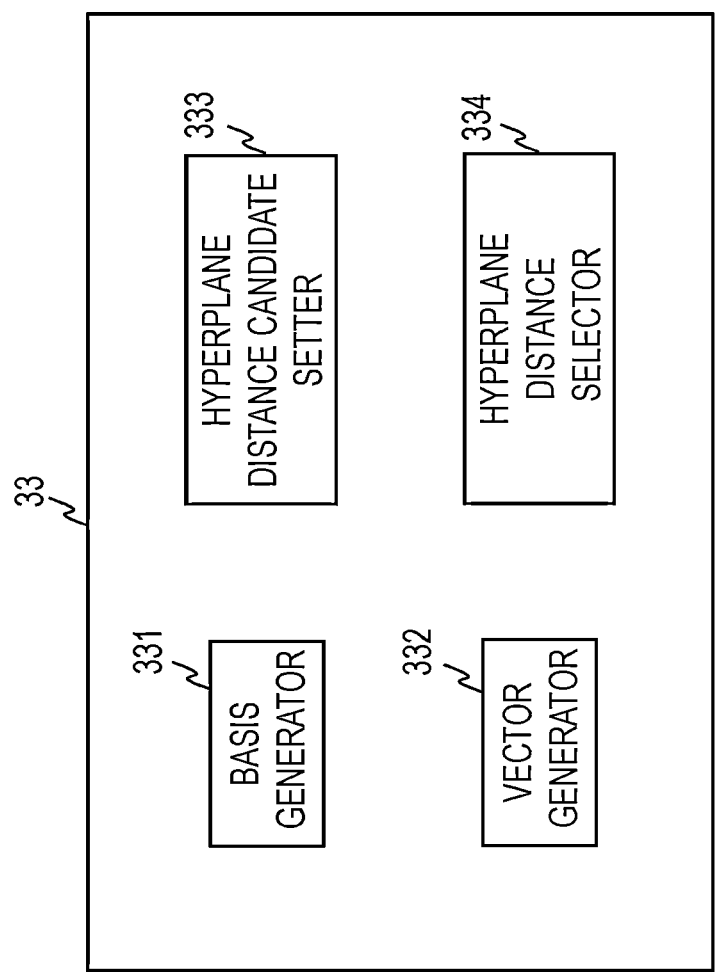
FIG. 9 is a block diagram exemplifying a functional configuration of a hyperplane distance estimator 33 in FIG. 8.

As exemplified in FIG. 8, a decision apparatus 3 of this embodiment includes a vector generator 31, a probability selector 32, a hyperplane distance estimator 33, a decision unit 34, and a controller 35. The decision apparatus 3 includes processing circuitry configured to implement the vector generator 31, the probability selector 32, the hyperplane distance estimator 33, the decision unit 34, and the controller 35. The decision apparatus 3 executes each process under control of the controller 35. As exemplified in FIG. 9, the hyperplane distance estimator 33 of this embodiment includes a basis generator 331, a vector generator 332, a hyperplane distance candidate setter 333, and a hyperplane distance selector 334.

<Processes>

The processes of this embodiment are described. The decision apparatus 3 of this embodiment receives $\{r_{ji}{}^{(c)}, r_{ji}{}^{(d)}, r_{j0}\}$ and m, M and N as inputs, and outputs a decision result of decision of whether the difference vector $t^{(d)}$ satisfying Formula (5) identified by these inputs satisfies $\|t^{(d)}\| \leq L$ or satisfies $\|t^{(d)}\| > \gamma L$. $\{r_{ji}{}^{(c)}, r_{ji}{}^{(d)}, r_{j0}\}$ and m, M and N are obtained by the processes described in the first embodiment or the second embodiment.

1. The vector generator 31 receives $r_j{}^{(c)} = (r_{j1}{}^{(c)}, \ldots, r_{jn}{}^{(c)})$ and $r_j{}^{(d)} = (r_{j1}{}^{(d)}, \ldots, r_{jn}{}^{(d)})$ as inputs, selects the n-dimensional vectors $s_j{}^{(c)} = (s_{j1}{}^{(c)}, \ldots, s_{jn}{}^{(c)})$ and $s_j{}^{(d)} = (s_{j1}{}^{(d)}, \ldots, s_{jn}{}^{(d)})$ that satisfy $r_j = r_j{}^{(c)} + r_j{}^{(d)} = s_j{}^{(c)} + s_j{}^{(d)}$ and $s_j{}^{(c)} \in L(B^=)$, and sets $s_j = s_j{}^{(c)} + s_j{}^{(d)}$ (step S31).

In this embodiment, $s_{jn}{}^{(d)}$ is selected so as to satisfy $\|r_j{}^{(d)}\| \leq \|s_{jn}{}^{(d)}\| \leq 2LN$. It is defined as $s_{j0} = r_{j0}$.

2. The probability selector 32 selects and outputs the positive real number $\alpha$ and the probability q (step S32). In this embodiment, the probability selector 32 selects and outputs the probability q satisfying $$0 < q \leq \frac{2\pi\alpha\mathrm{Sin}(2\pi\alpha) + \cos(2\pi\alpha) - 1}{\pi^2\alpha}$$

The algorithm operates for any positive number $\alpha$. A value recommended as $\alpha$ is a half-integer equal to or more than ½ and less than log n.

The hyperplane distance estimator 33 obtains an evaluation value $\mathrm{Eval}_q$ based on the distance $\mathrm{dist}_j$ between the origin O and the hyperplane $H_j$ that is the closest to the origin O among a finite number of hyperplanes whose normal vectors are the n-dimensional vectors $s_j^{(d)}$ (the details of the process are described later) (step S33).

Figure 10:
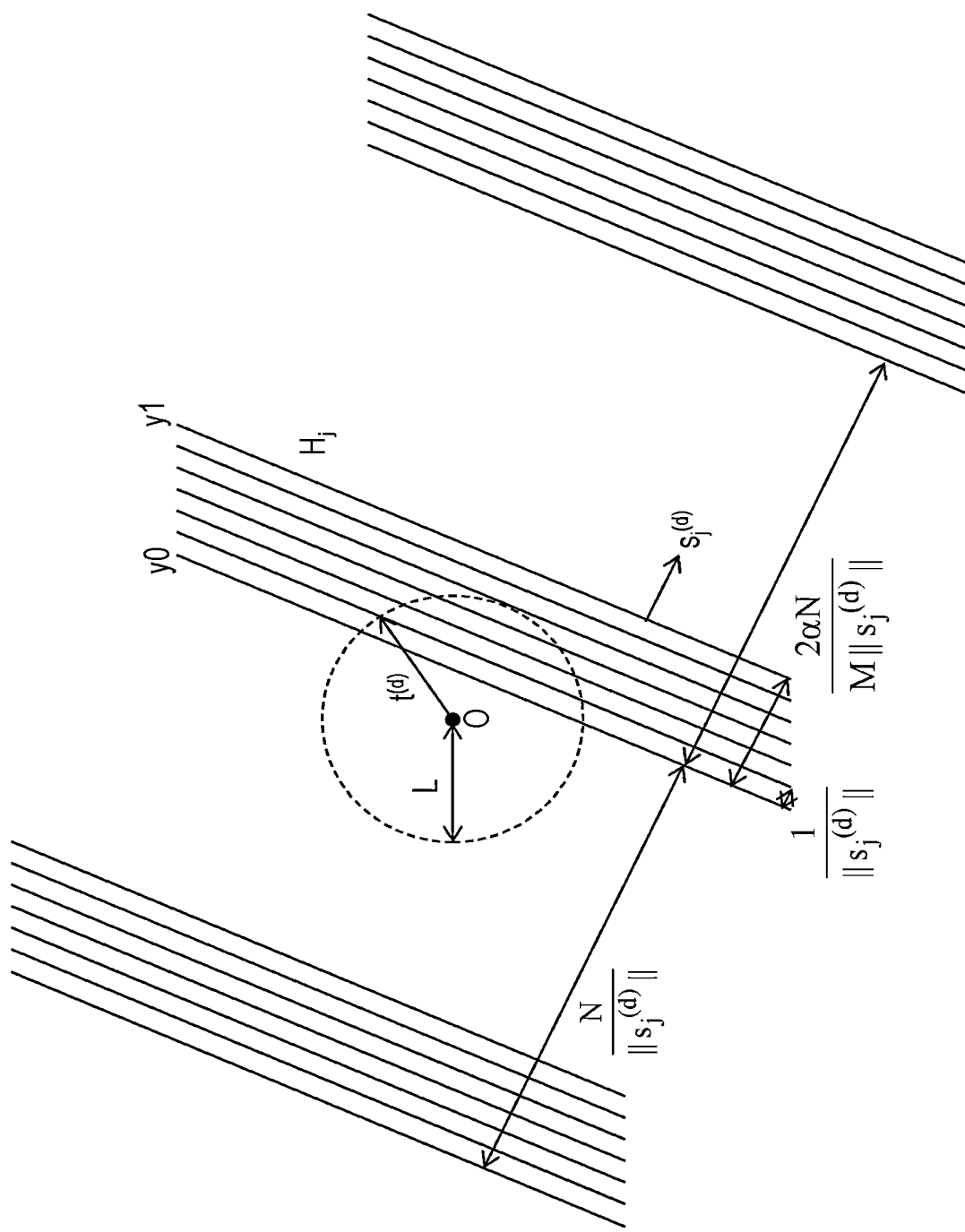
FIG. 10 is a conceptual diagram exemplifying the relationship between solutions and hyperplanes.

Here, it can be theoretically proved that any hyperplane $H_j$ among the finite number (plurality) of hyperplanes whose normal vectors are the n-dimensional vector $s_j^{(d)}$ corresponds to the difference vector $t^{(d)}$ (here, proof is omitted). A set of hyperplanes $H_j$ whose normal vectors are $s_j^{(d)}$ is obtained by parallel-translation of the vector space spanned by vectors that are elements of a subset of the lattice L(B), and includes a finite number of hyperplanes for each j. As exemplified as FIG. 10 (an example of n=2), such a set of a finite number of hyperplanes $H_j$ are arranged at intervals of $1/\|s_j^{(d)}\|$, and are arranged in a range of $2\alpha N/M\|s_j^{(d)}\|$ as a whole. Likewise, there are other hyperplanes that are arranged at intervals of $1/\|s_j^{(d)}\|$ and arranged in the range of $2\alpha N/M\|s_j^{(d)}\|$ as a whole. These hyperplanes are repetitively arranged at intervals of $N/\|s_j^{(d)}\|$.

Figure 11A:
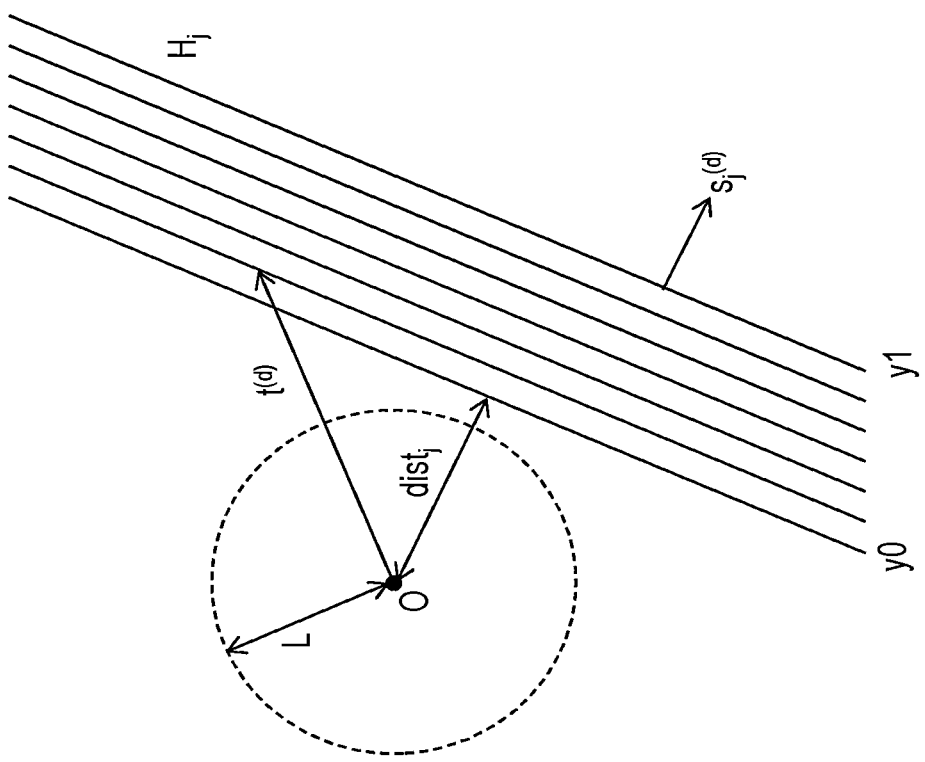
FIGS. 11A and 11B are conceptual diagrams exemplifying the relationship between solutions and hyperplanes.
Figure 11B:
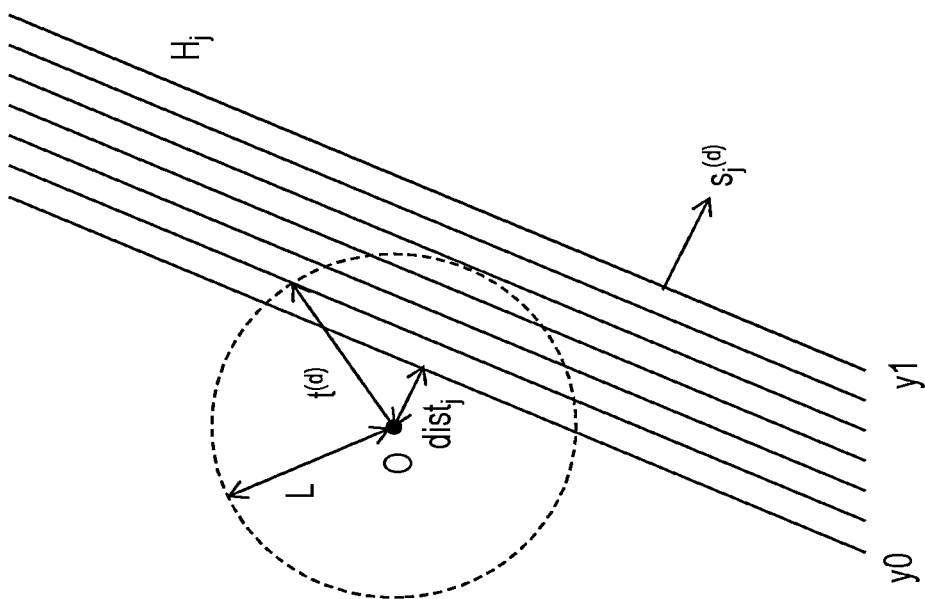

That is, as exemplified in FIGS. 11A and 11B (the example of n=2), the distal end of the difference vector $t^{(d)}$ is positioned on any of the hyperplane $H_j$ of the finite number of hyperplanes whose normal vectors are the normal vector $s_j^{(d)}$. As understood from these diagrams, the distance $\mathrm{dist}_j$ between the hyperplane $H_j$ closest to the origin and this origin, has correlation with the length (norm) of the difference vector $t^{(d)}$. Accordingly, even if the difference vector $t^{(d)}$ is unknown, the length of the difference vector $t^{(d)}$ can be evaluated on the basis of the distance $\mathrm{dist}_j$. To perform this evaluation, the hyperplane distance estimator 33 obtains the evaluation value $\mathrm{Eval}_q$ based on the distance $\mathrm{dist}_j$ for j=1, ..., m.

Figure 12:
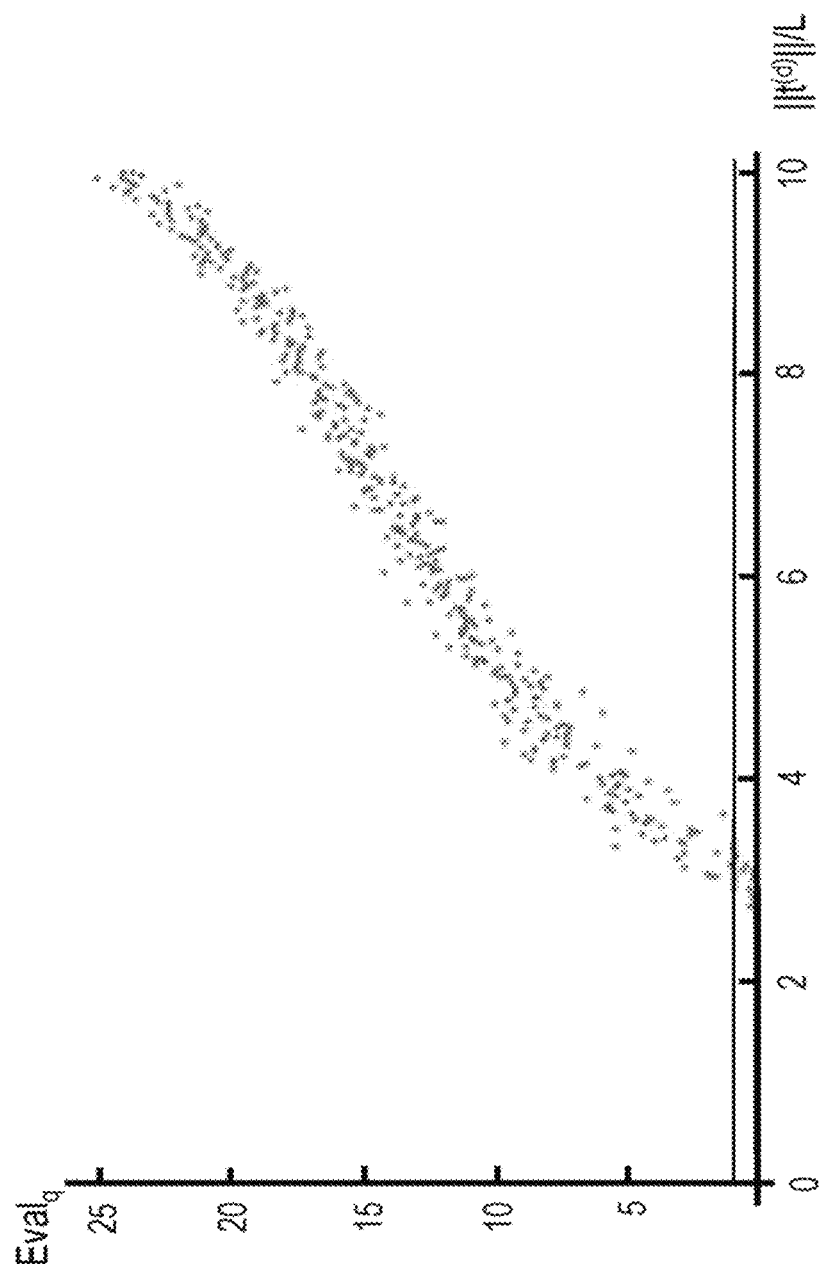
FIG. 12 are experimental results exemplifying the relationship between $\mathrm{Eval}_q$ and the solution.

The evaluation value $\mathrm{Eval}_q$ in this embodiment is any of distances $\mathrm{dist}_1, \ldots, \mathrm{dist}_m$. In this embodiment, too large distances $\mathrm{dist}_j$ are excluded as errors, and the largest distance $\mathrm{dist}_j$ among the remaining distances $\mathrm{dist}_j$ is set as the evaluation value $\mathrm{Eval}_q$. The probability q described above serves as a reference to select the distance $\mathrm{dist}_j$ for excluding as errors. FIG. 12 exemplifies the relationship between the evaluation value $\mathrm{Eval}_q$ and $\|t^{(d)}\|/L$. In FIG. 12, the ordinate axis represents the evaluation value $\mathrm{Eval}_q$, and the abscissa axis represents $\|t^{(d)}\|/L$. As understood from this diagram, evaluation of the magnitude of the evaluation value $\mathrm{Eval}_q$ can decide whether to satisfy $\|t^{(d)}\| \leq L$ or satisfy $\|t^{(d)}\| > \gamma L$.

4. The decision unit 34 receives the evaluation value $\mathrm{Eval}_q$ as an input, outputs information that $\|t^{(d)}\| \leq L$ is satisfied when $\mathrm{Eval}_q \leq L$ is satisfied, and outputs information that $\|t^{(d)}\| > \gamma L$ is satisfied when $\mathrm{Eval}_q > L$ is satisfied (step S34).

<<Details of Processes of Hyperplane Distance Estimator 33>>

Details of processes of hyperplane distance estimator 33 are exemplified.

First, the hyperplane distance estimator 33 performs the computations of the following (a) to (c) for each j=1, ..., m, and decides each distance $\mathrm{dist}_j$.

(a) The basis generator 331 (hyperplane basis generator) obtains the basis $B_{sj}$ of the lattice $\{v \in Z^n | <s_j, v> = 0 \bmod N\}$ for the n-dimensional vector $s_j$ (step S331). The Hermite normal form is used for the computation of the basis $B_{sj}$.

(b) The vector generator 332 obtains and outputs the n-dimensional vector $b_{sj(d),N}$ satisfying $<<s_j^{(d)}, b_{sj(d),N}>> = N$ (step S332). The extended Euclidean algorithm is used for this computation.

(c) The hyperplane distance candidate setter 333 performs the processes of the following (i) to (iv) for $y_0 = \mathrm{floor}((s_{j0} - \alpha)N/M) + 1$ and $y_1 = \mathrm{ceil}((s_{j0} + \alpha)N/M) - 1$ (step S333).

(i) The hyperplane distance candidate setter 333 obtains and outputs the n-dimensional vectors $t_{sj,y0}$ and $t_{sj,y1}$ that satisfy $<s_j, t_{sj,y0}> = y_0 \bmod N$ and $<s_j, t_{sj,y1}> = y_1 \bmod N$. The extended Euclidean algorithm is used for this computation.

(ii) The hyperplane distance candidate setter 333 obtains and outputs the n-dimensional vectors $t'_{sj,y0}$ and $t'_{sj,y1}$ that satisfy $t'_{sj,y0} \in (s_j + L(B)) \cap (t_{sj,y0} + L(B_{sj}))$ and $t'_{sj,y1} \in (s_j + L(B)) \cap (t_{sj,y1} + L(B_{sj}))$. The Smith normal form is used for the computation.

(iii) The hyperplane distance candidate setter 333 sets k minimizing $\mathrm{ABS}(<s_j^{(d)}, t'_{sj,y0} + k b_{sj(d),N}>)$ as $k_{y0}$, sets k minimizing $\mathrm{ABS}(<s_j^{(d)}, t'_{sj,y1} + k b_{sj(d),N}>)$ as $k_{y1}$, and obtains and outputs $t''_{sj,y0} = t'_{sj,y0} + k_{y0} b_{sj(d),N}$ and $t''_{sj,y1} = t'_{sj,y1} + k_{y1} b_{sj(d),N}$.

(iv) The hyperplane distance candidate setter 333 outputs a hyperplane distance candidate $\mathrm{dist}_j = 0$ when $<s_j^{(d)}, t''_{sj,y0}> \leq 0 \leq <s_j^{(d)}, t''_{sj,y1}>$ or $<s_j^{(d)}, t''_{sj,y1}> \leq 0 \leq <s_j^{(d)}, t''_{sj,y0}>$. In the other cases, that is, when both $<s_j^{(d)}, t''_{sj,y0}>$ and $<s_j^{(d)}, t''_{sj,y1}>$ are positive ($<s_j^{(d)}, t''_{sj,y0}>$ and $<s_j^{(d)}, t''_{sj,y1}>$ are larger than 0) or negative ($<s_j^{(d)}, t''_{sj,y0}>$ and $<s_j^{(d)}, t''_{sj,y1}>$ are smaller than 0), the hyperplane distance candidate setter 333 obtains and outputs $\mathrm{ABS}(<s_j^{(d)}, t''_{sj,y0}>)$ or $\mathrm{ABS}(<s_j^{(d)}, t''_{sj,y0}>)$, whichever is smaller, as the distance $\mathrm{dist}_j$. That is, distance $\mathrm{dist}_j = \min(\mathrm{ABS}(<s_j^{(d)}, t''_{sj,y0}>), \mathrm{ABS}(<s_j^{(d)}, t''_{sj,y1}>))$ is obtained and output.

The probability q set in step S32 and the distances $\mathrm{dist}_1, \ldots, \mathrm{dist}_m$ obtained in steps S331 to S333 are input into the hyperplane distance selector 334. The hyperplane distance selector 334 obtains and outputs the floor(qm)-th value among the distances $\mathrm{dist}_1, \ldots, \mathrm{dist}_m$ arranged in an ascending order with respect to the probability q, as the evaluation value $\mathrm{Eval}_q \in \{\mathrm{dist}_1, \ldots, \mathrm{dist}_m\}$. That is, the hyperplane distance selector 334 computes $$\mathrm{Eval}_q = \max(\{\mathrm{dist}_j | j=1, \ldots, m\}, q)$$

(step S334).

FOURTH EMBODIMENT

In fourth embodiment, computation (quantum computation) by the quantum computer and computation (classical computation) by the classical computer uses, as a subroutine, the processes (third embodiment) of computing the solution of $\mathrm{GapCVP}_\gamma$ for the modified LWE transformed in the first embodiment to compute the solution of CVP(B, t) (FIG. 2).

<Configuration>

Figure 13:
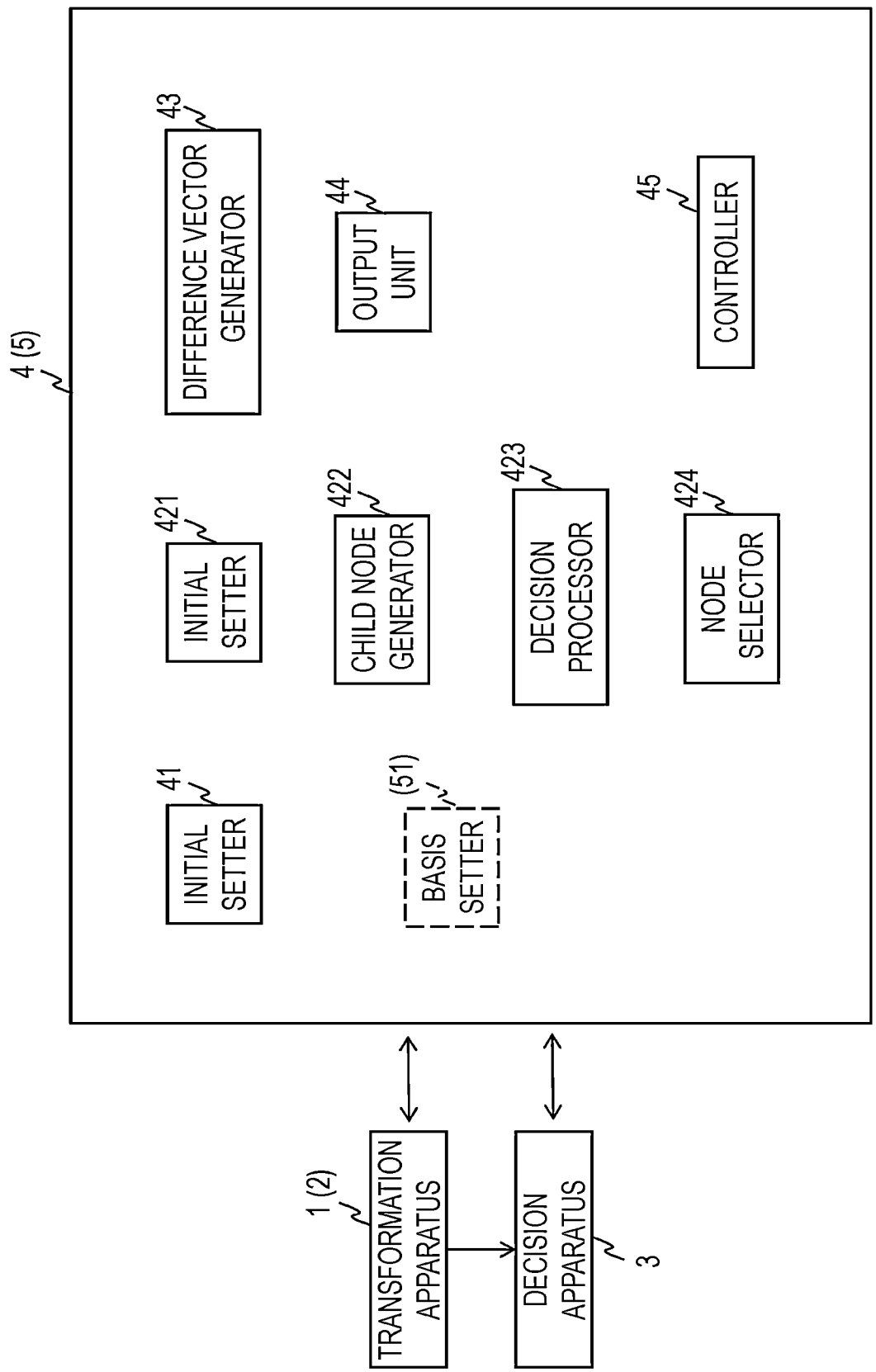
FIG. 13 is a block diagram exemplifying a functional configuration of a computation apparatus of the embodiment.

As exemplified in FIG. 13, a computation apparatus 4 in this embodiment includes initial setters 41 and 421, a child node generator 422, a decision processor 423, a node selector 424, a difference vector generator 43, an output unit 44, and a controller 45. The computation apparatus 4 executes each process under control of the controller 45. The computation apparatus 4 includes processing circuitry configured to implement the initial setters 41 and 421, the child node generator 422, the decision processor 423, the node selector 424, the difference vector generator 43, the output unit 44, and the controller 45.

<Processes>

The processes of this embodiment are described. The computation apparatus 4 in this embodiment receives, as an input, the pair (B, t) of the basis B and the target vector t with respect to CVP(B, t), and obtains and outputs the difference vector $t^{(d)}=t-t^{(c)}$ between the target vector t and the closest vector $t^{(c)} \in L(B)$ of this target vector t. The difference vector is the solution of the modified LWE represented in Formula (5).

The initial setter 41 sets the real number L as the initial value $L1=1, \sqrt{2}, \sqrt{3}, \sqrt{4}, \sqrt{5}, \ldots, (L1max)^{1/2}$ (step S41), and the controller 45 executes the processes of the following steps S421 to S424 and S43 for each L=L1. Note that $L1_{max}$ is a predefined positive integer.

1. The initial setter 421 receives the pair (B, t) as an input, and obtains and outputs a node $(B_0, t_0)=(B, t)$ of the pair including the basis $B_0$ and the target vector $t_0$. The initial setter 421 sets v=0 (step S421).

2. The controller 45 executes the following processes for v.

Figure 14B:
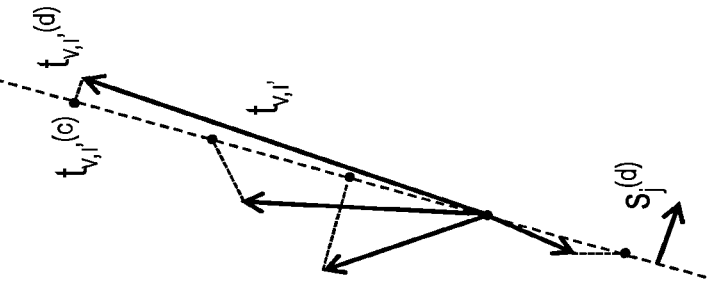
FIGS. 14A and 14B are conceptual diagrams for illustrating child node generation.
Figure 14A:
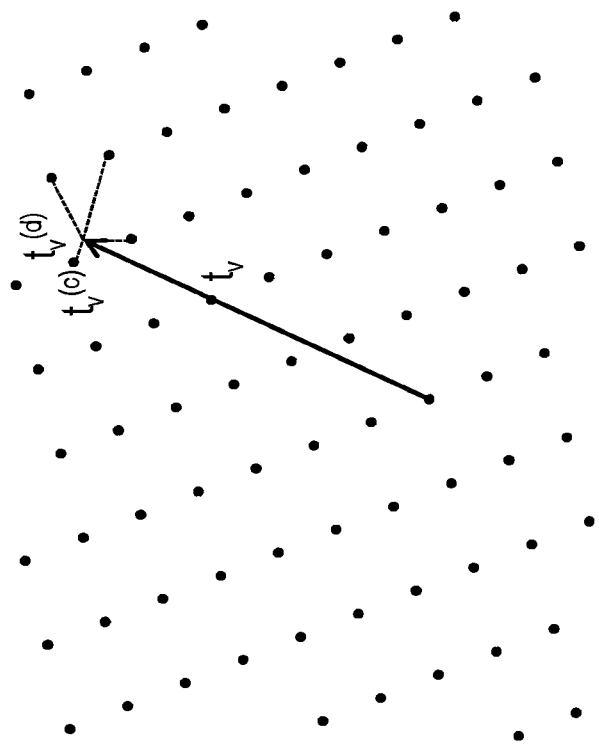

(a) The child node generator 422 uses the node $(B_\nu, t_\nu)$ to generate nodes $(B_{\nu+1}, t_{\nu,1}), \ldots, (B_{\nu+1}, t_{\nu,\rho(\nu)})$ (child nodes) each of which is a pair of the basis $B_{\nu+1}$ and the target vector $t_{\nu,\iota}$ for $\iota=1, \ldots, \rho(\nu)$ (step S422). Note that $\rho(\nu)$ is a positive integer. The lattice $L(B_{\nu+1})=\{\Sigma_{i=1, \ldots, n} x_i b_i | x_i \in Z, b_i \in B_{\nu+1}\}$ corresponding to the basis $B_{\nu+1}$ is a sub-lattice of the lattice $L(B_\nu)=\{\Sigma_{i=1, \ldots, n} x_i b_i | x_i \in Z, b_i \in B_\nu\}$ corresponding to the basis $B_\nu$. The difference vector $t_{\nu,\iota'}^{(d)}=t_{\nu,\iota'}-t_{\nu,\iota'}^{(c)}$ between the target vector $t_{\nu,\iota'}$ and the closest vector $t_{\nu,\iota'(c)} \in L(B_{\nu+1})$ of this target vector $t_{\nu,\iota'}$ for any $\iota' \in \{1, \ldots, \rho(\nu)\}$ (FIG. 14B) is equal to the difference vector $t_\nu^{(d)}=t_\nu-t_\nu^{(c)}$ between the target vector $t_\nu$ and the closest vector $t_\nu^{(c)} \in L(B_\nu)$ of this target vector $t_\nu$ (FIG. 14A). The details of this process are described later.

(b) The decision processor 423 receives the real number L and the nodes $(B_{\nu+1}, t_{\nu,1}), \ldots, (B_{\nu+1}, t_{\nu,\rho(\nu)})$ as inputs, and uses the transformation apparatus 1 described in the first embodiment and the decision apparatus 3 described in the third embodiment to execute the processes of the decision apparatus 3 with $B=B_{\nu+1}$ and $t=b_{\nu,\iota}$ for $i=1, \ldots, \rho(\nu)$. Accordingly, the decision processor 423 can obtain a decision result of whether to satisfy $\|t_{\nu,\iota}^{(d)}\| \leq L$ (i.e., $Eval_q \leq L$) or satisfy $\|t_{\nu,\iota}^{(d)}\| > \gamma L$ (i.e., $Eval_q > L$) for each node $(B_{\nu+1}, t_\nu, \iota)$ for $\iota=1, \ldots, \rho(\nu)$ (step S423).

Figure 15:
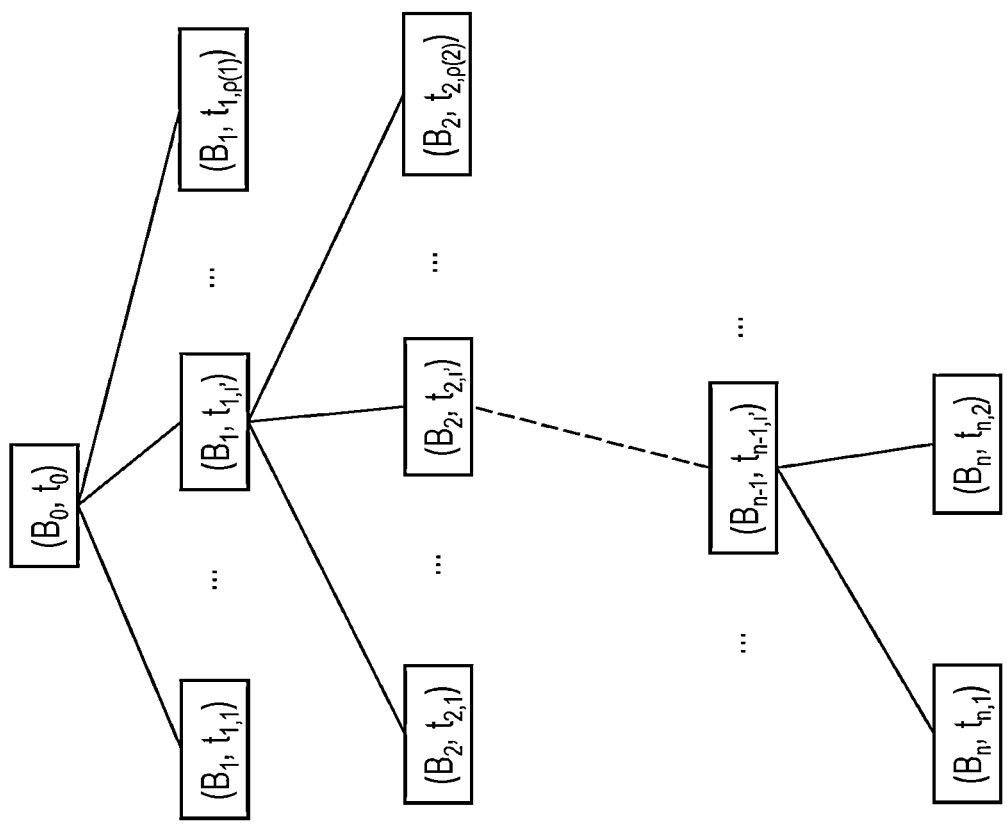
FIG. 15 is a conceptual diagram for illustrating a computation method of the embodiment.

Here, when it is decided to satisfy $Eval_q > L$ for all $\iota=1, \ldots, \rho(\nu)$ (i.e., decided that $\|t_{\nu,\iota}^{(d)}\| > \gamma L$ for all $\iota=1, \ldots, \rho(\nu)$), the decision means that the set real number L is too small. The node selector 424 increases the real number L, and re-executes the processes of the initial setter 421, the child node generator 422, and the decision processor 423. For example, when it is decided to satisfy $Eval_q > L$ for all $\iota=1, \ldots, \rho(\nu)$, the node selector 424 replaces L with $(L^2+1)^{1/2}$ (i.e., $(L^2+1)^{1/2}$ is adopted as new L), and the processing returns to step S421. On the contrary, when it is decided to satisfy $Eval_q \leq L$ for any of $\iota=1, \ldots, \rho(\nu)$ (i.e., decided that $\|t_{\nu,\iota}^{(d)}\| \leq L$), the node selector 424 selects the node $(B_{\nu+1}, t_{\nu,\iota'})$ (not that $\iota' \in \{1, \ldots, \rho(\nu)\}$) corresponding to the minimum $Eval_q$ as the node $(B_{\nu+1}, t_{\nu+1})$, and outputs the node (FIG. 15: step S424). Here, the difference vector $t_{\nu,\iota'}^{(d)}$ corresponding to the target vector $t_{\nu,\iota'}$ of the node $(B_{\nu+1}, t_{\nu,\iota'})$ is equal to the difference vector $t_\nu^{(d)}=t_\nu-t_\nu^{(c)}$ (FIGS. 14A and 14B). Consequently, the difference vector $t_{\nu,\iota'}^{(d)}$ corresponding to the target vector $t_{\nu,\iota'}$ of the node $(B_{\nu+1}, t_{\nu,\iota'})$ is equal to the difference vector $t^{(d)}$ in the initial lattice $L(B)=L(B_0)$.

The controller 45 decides whether v=n-1 holds or not. When v=n-1 does not hold, the controller 45 sets v+1 as a new v and returns the processing to step S422. On the contrary, when v=n-1 holds, the difference vector generator 43 obtains the target vector $t_n$ of the node $(B_{\nu+1}, t_{\nu+1})=(B_n, t_n)$ as the difference vector $t_{L1}^{(d)}$, and outputs the vector. That is, the difference vector generator 43 obtains the target vector $t_n$ of the node $(B_n, t_n)$ obtained by executing the processes (steps S422 to 424) of the child node generator 422, the decision processor 423 and the node selector 424 for each $v=0, \ldots, n-1$ from v=0 to v=n-1, as the difference vector $t_{L1}^{(d)}$, and outputs the vector (step S43).

For each $L=L1=1, \sqrt{2}, \sqrt{3}, \sqrt{4}, \sqrt{5}, \ldots, (L1_{max})^{1/2}$, the processes of steps S421 to S424 and S43 described above are executed, thereby obtaining a set $$\{t_1^{(d)}, t_{\sqrt{2}}^{(d)}, t_{\sqrt{3}}^{(d)}, \ldots, t_{\sqrt{L1max}}^{(d)}\}$$

of difference vectors corresponding to each L1. The output unit 44 outputs, as the difference vector $t^{(d)}$, the difference vector $t_{L1}^{(d)}$ corresponding to any initial value L1 among the difference vectors belonging to the sets (step S44). For example, the output unit 44 outputs, as the difference vector $t^{(d)}$, the shortest difference vector among the difference vectors belonging to the sets.

<<Details of Process (step S422) of Child Node Generator 422>>

The details of process (step S422) of the child node generator 422 is exemplified.

The child node generator 422 uses the node $(B_\nu, t_\nu)$ to generate, for example, the nodes $(B_{\nu+1}, t_{\nu,1}), \ldots, (B_{\nu+1}, t_{\nu,\rho(\nu)})$ as follows.

First, the child node generator 422 requests the classical computer 11 of the transformation apparatus 1 described in the first embodiment to perform the process, with $B=B_\nu$, $t=t_\nu$, m=1 and L=L1. Accordingly, the classical computer 11 executes the following processes.

1. The arithmetic unit of the classical computer 11 computes and outputs the least common multiple $N_\nu'$ of the denominators of the elements of the inverse matrix $\beta_\nu^{-1}$ of the basis matrix $\beta_\nu$ corresponding to the basis $B_\nu$ (step S111). Note that $\beta_\nu$ is a basis matrix that has n rows and n columns and includes, as elements, the n-dimensional vectors $b_{\nu 1}, \ldots, b_{\nu n}$ of the basis $B_\nu=\{b_{\nu 1}, \ldots, b_{\nu n}\}$. For example, $\beta_\nu$ is a matrix that includes the n-dimensional vector $b_{\nu i}$ as the vi-th component.

2. The arithmetic unit of the classical computer 11 computes and outputs a dual basis $B_\nu^{-'}$ of the basis $B_\nu$ of modulo $N_\nu'$ (step S112).

3. The arithmetic unit of the classical computer 11 selects and outputs the multiple $N_\nu$ of $N_\nu'$ (step S113).

4. The arithmetic unit of the classical computer 11 obtains and outputs the dual basis $B_\nu^-=(N_\nu/N_\nu')B_\nu^{-'}$ of modulo $N_\nu$ for the dual basis $B_\nu^{-'}$ (step S114).

5. The arithmetic unit of the classical computer 11 selects and outputs a positive integer $M_\nu$ (step S115).

6. The arithmetic unit of the classical computer 11 selects and outputs a real number $R_\nu$ satisfying $2R_\nu \leq N_\nu < 4RV$ (step S116).

The classical computer 11 outputs (L, n, $M_\nu$, $N_\nu$, $R_\nu$, $B_\nu$, $t_\nu$) (step S119).

Since it is defined that m=1 and L=L1, steps S117 and S118 are not executed.

7. The child node generator 422 requests the quantum computer 12 of the transformation apparatus 1 described in the first embodiment to perform the process, with $B=B_\nu$, $t=t_\nu$, $m=1$, $L=L1$ and $(L, n, M, N, R, B, t)=(L, n, M_\nu, N_\nu, R_\nu, B_\nu, t_\nu)$ (step S422aa). Accordingly, the quantum computer 12 executes once the quantum computation described in the first embodiment, with $B=B_\nu$, $t=t_\nu$, $m=1$, $L=L1$ and $(L, n, M, N, R, B, t)=(L, n, M_\nu, N_\nu, R_\nu, B_\nu, t_\nu)$. Consequently, the quantum computer 12 obtains the n-dimensional vectors $r_1=(r_{11}, \ldots, r_{1n}) \in [0,N)_n$ and $r_{10} \in [0,M)$ for $j=m=1$, and outputs the vectors (step S422ab). Hereinafter, in this embodiment, the vector $r_1=(r_{11}, \ldots, r_{1n})$ is represented as $r(v)=(r_{v1}, \ldots, r_{v,n})$, and $r_{10}$ is represented as $r_{v,0}$.

8. The child node generator 422 requests the classical computer 13 of the transformation apparatus 1 described in the first embodiment to perform the process, with $r_j=r(v)$, $N=N_\nu$, $B^-=B_\nu^-$ (step S422ba). The classical computer 13 uses the nearest plane algorithm or the like to compute the solution of $CVP(B_\nu^-, r(v))$. Accordingly, the classical computer 13 obtains and outputs the closest vector $r(v)^{(c)} \in L(B_\nu^-)$ of $r(v)$ and the difference vector $r(v)^{(d)}=r(v)-r(v)^{(c)}$ (step S422bb).

9. The arithmetic unit of the child node generator 422 obtains and outputs a basis $B_{r(v)}$ of the lattice $\{v \in Z^n | <r(v), v> = 0 \mod N_\nu\}$ for the n-dimensional vector $r(v)$ (step S422c). The Hermite normal form is used for the computation of the basis $B_{r(v)}$.

10. The arithmetic unit of the child node generator 422 obtains and outputs a basis $B'_{r(v)}$ of $L(B_\nu) \cap L(B_{r(v)}) (=\{x \in L(B_\nu) | <r(v)^{(d)}, v> = 0 \mod N_\nu\})$ (step S422d).

11. The arithmetic unit of the child node generator 422 obtains and outputs an n-dimensional vector $b_{r(v)(d),N\nu}$ satisfying $<r(v)^{(d)}, b_{r(v)(d),N\nu}> = N^\nu$ (step S422e). The extended Euclidean algorithm is used for this computation.

12. The arithmetic unit of the child node generator 422 obtains and outputs an n-dimensional vector $t_{r(v),z(v)}$ satisfying $<r(v), t_{r(v),z(v)}> = z(v) \mod N_\nu$, for $z(v)=\text{round } (r_{v,0}N_\nu/M_\nu)$ (step S422f). The extended Euclidean algorithm is used for this computation.

13. The arithmetic unit of the child node generator 422 obtains and outputs an n-dimensional vector $t'_{r(v),z(v)}$ satisfying $t'_{r(v),z(v)} \in (t_\nu + L(B_\nu)) \cap (t_{r(v),z(v)} + L(B_{r(v)}))$ (step S422g). The Smith normal form is used for the computation.

14. The arithmetic unit of the child node generator 422 sets k minimizing $ABS(<r(v)^{(d)}, t'_{r(v),z(v)} + kb_{r(v)(d),N\nu}>)$ as $k_{z(v)}$, and obtains and outputs $t''_{r(v),z(v)} = t'_{r(v),z(v)} + k_{z(v)} b_{r(v)(d),N\nu}$ (step S422h).

15. The arithmetic unit of the child node generator 422 sets the set $C_\nu$ as follows (step S422i).

$$C_v = \left\{ y \in Z \,\middle|\, ABS\left\{ \left\langle t''_{r(v), round\left(\frac{r_{v,0}}{M_v} \cdot N_v\right)}, r(v)^{(d)} \right\rangle \pm y \cdot \|r(v)^{(d)}\| \right\} \leq L \right\}$$

16. The arithmetic unit of the child node generator 422 executes the operations S422ja to S422jd for all $y \in C_\nu$.
(a) The arithmetic unit of the child node generator 422 obtains and outputs a vector $t_{r(v),y}$ satisfying $<r(v), t_{r(v),y}> = y \mod N_\nu$ (step S422ja). The extended Euclidean algorithm is used for this computation.
(b) The arithmetic unit of the child node generator 422 obtains and outputs a vector $t'_{r(v),y}$ satisfying $t'_{r(v),y} \in (t_\nu + (B_\nu)) \cap (t_{r(v),y} + L(B_{r(v)}))$ (step S422jb). The Smith normal form is used for this computation.
(c) $(v+1)$-th dimensional hyperplane $H(v)$ is defined as $\text{span}(r(0)^{(d)}, \ldots, r(v)^{(d)}) \subseteq \text{Re}^n$. That is, the n-dimensional vector space that has real coefficients and is spanned by $r(0)^{(d)}, \ldots, r(v)^{(d)}$ is $H(v)$. $P_{H(v)}(B'_{r(v)})$ and $P_{H(v)}(t'_{r(v),y})$ are respectively projections of $B'_{r(v)}$ and $t'_{r(v),y}$ to $H(v)$. The arithmetic unit of the child node generator 422 computes the solution of $CVP(P_{H(v)}(B'_{r(v)}), P_{H(v)}(t'_{r(v),y}))$ using the nearest plane algorithm or the like. Accordingly, the arithmetic unit of the child node generator 422 obtains and outputs the closest vector $P_{H(v)}(t'_{r(v),y})^{(c)} \in L^{(c)} P_{H(v)}(B_{r(v)}))$ of $P_{H(v)}(t'_{r(v),y})$ (step S422jc).
(d) $P_{H(v)}(t'_{r(v),y})^{(c)}$ can be represented as a linear combination of $P_{H(v)}(B'_{r(v),y}))$. The arithmetic unit of the child node generator 422 computes $c_{v,y,x}$ satisfying $$P_{H(v)}(t'_{r(v),y})^{(c)} = \sum_{x \in B'_{r(v)}} c_{v,y,x} P_{H(v)}(x)$$

and obtains and outputs $$t'''_{r(v),y} = t'_{r(v),y} - \sum_{x \in B'_{r(v)}} c_{v,y,x} x$$

(step S422jd).

17. The arithmetic unit of the child node generator 422 sets the set $C_\nu'$ as follows (step S422ka).

$$C_v' = \{ y \in C_v | \|P_{H(v)}(t'''_{r(v),y})\| \leq L \}$$

The arithmetic unit of the child node generator 422 outputs $$\{(B'_{r(v)} t'''_{r(v),y}) | y \in C_v'\}$$

as $\{(B_{\nu+1}, t_{\nu,1}), \ldots, (B_{\nu+1}, t_{\nu,\rho(\nu)})\}$ (step S422kb).

FIFTH EMBODIMENT

In fifth embodiment, computation (quantum computation) by the quantum computer and computation (classical computation) by the classical computer use, as a subroutine, the processes (third embodiment) of computing the solution of $GapCVP_\gamma$ for the modified LWE transformed in the second embodiment to compute the solution of LWE (FIG. 3).

<Configuration>

As exemplified in FIG. 13, a computation apparatus 5 in this embodiment includes initial setters 41 and 421, a basis setter 51, a child node generator 422, a decision processor 423, a node selector 424, a difference vector generator 43, an output unit 44, and a controller 45. The computation apparatus 4 executes each process under control of the controller 45. The computation apparatus 5 includes processing circuitry configured to implement the initial setters 41 and 421, the basis setter 51, the child node generator 422, the decision processor 423, the node selector 424, the difference vector generator 43, the output unit 44, and the controller 45.

<Processes>

The processes of this embodiment are described. The computation apparatus 5 of this embodiment receives n-dimensional vectors $a_j=(a_{1j}, \ldots, a_{nj})^T$, $g=(g_1, \ldots, g_n)^T$ and an integer N' as inputs, and obtains and outputs, as the difference vector $t^{(d)}$, $(d_1, \ldots, d_n)^T$ satisfying the aforementioned Formula (10) representing LWE. The difference vector $t^{(d)}$ is the solution of the modified LWE represented in Formula (5).

The initial setter 41 sets the real number L as the initial value $L1=1, \sqrt{2}, \sqrt{3}, \sqrt{4}, \sqrt{5}, \ldots, (L1_{max})^{1/2}$ (step S41), and the controller 45 executes the processes of the following steps S51, S421 to S424 and S43. Note that $L1_{max}$ is a predefined positive integer.

The basis setter 51 sets the LLL-reduced basis computed from $\{a_1, \ldots, a_m, N'\varepsilon_1, \ldots, N'\varepsilon_n\}$ as the basis B, and further outputs $t=g=(g_1, \ldots, g_n)^T$ (step S51).

Hereinafter, the operations identical to those in the fourth embodiment are performed, thereby obtaining and outputting the difference vector $t^{(d)}$.

SIXTH EMBODIMENT

The computation apparatus 6 of this embodiment computes the solution of SVP using the processes in the fourth embodiment as a subroutine.

<Configuration>

Figure 16:
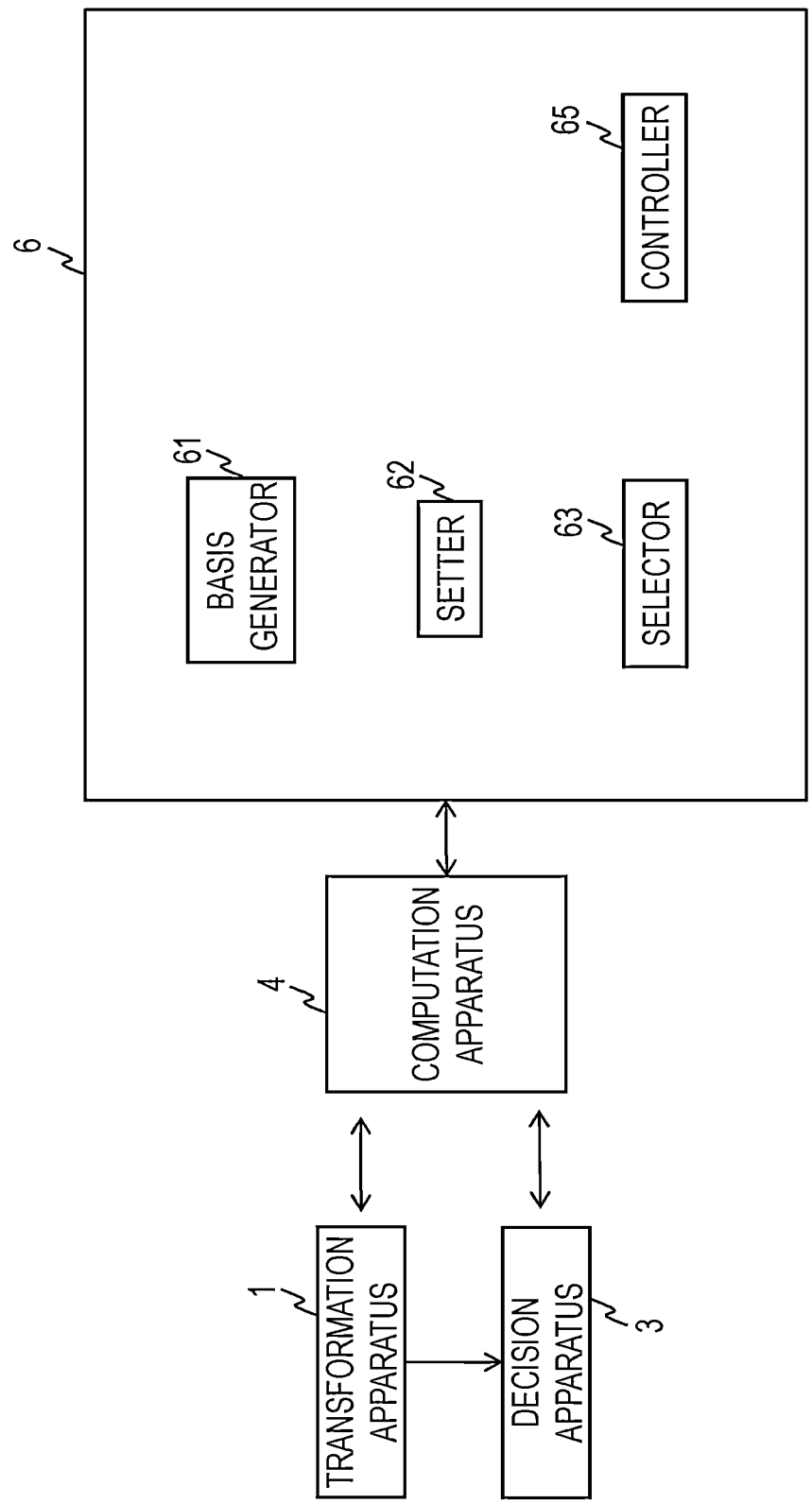
FIG. 16 is a block diagram exemplifying a functional configuration of a computation apparatus of the embodiment.

As shown in FIG. 16, the computation apparatus 6 of this embodiment includes a basis generator 61, a setter 62, a selector 63, and a controller 65. The computation apparatus 6 includes processing circuitry configured to implement the basis generator 61, the setter 62, the selector 63, and the controller 65.

<Processes>

The computation apparatus 6 of this embodiment receives the basis B as an input, and outputs the shortest vector $t^{(c)}$ to the lattice point closest to the origin in the lattice L(B).

First, the basis generator 61 sets $B_i = \{b_1, \ldots, b_{i-1}, 2b_i, b_{i+1}, \ldots, b_n\}$ for all $i=1, \ldots, n$ (step S61).

Next, the setter 62 sets $B = B_i$ and $t = b_i$ for $i=1, \ldots, n$, and requests the computation apparatus 4 described in the fourth embodiment to perform processes. The computation apparatus 4 performs the processes described in the fourth embodiment, with $B = B_i$ and $t = b_i$, and obtains and outputs the difference vector $t^{(d)}$. The setter 62 sets, as $t_i^{(d)}$, the difference vector $t^{(d)}$ obtained with $B = B_i$ and $t = b_i$. Accordingly, the setter 62 obtains $t_1^{(d)}, \ldots, t_n^{(d)}$ (step S62).

The selector 63 receives, as an input, $t_1^{(d)}, \ldots, t_n^{(d)}$ obtained by the setter 62, and outputs, as the shortest vector $t^{(c)}$, the shortest one (having the shortest length) among $t_1^{(d)}, \ldots, t_n^{(d)}$ (step S63).

SEVENTH EMBODIMENT

Figure 17:
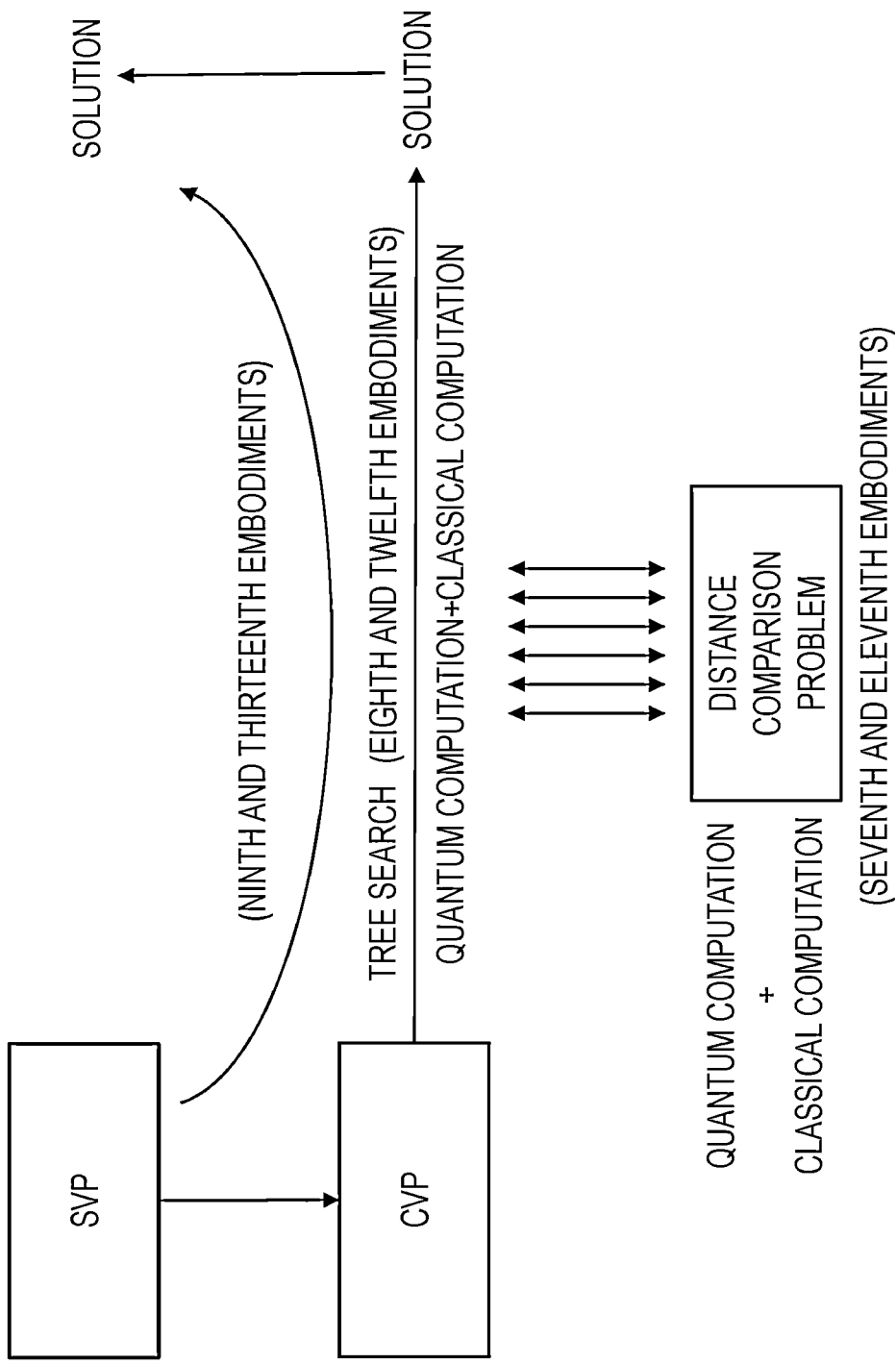
FIG. 17 is a conceptual diagram representing the correspondence relationship between the embodiments.
Figure 18:
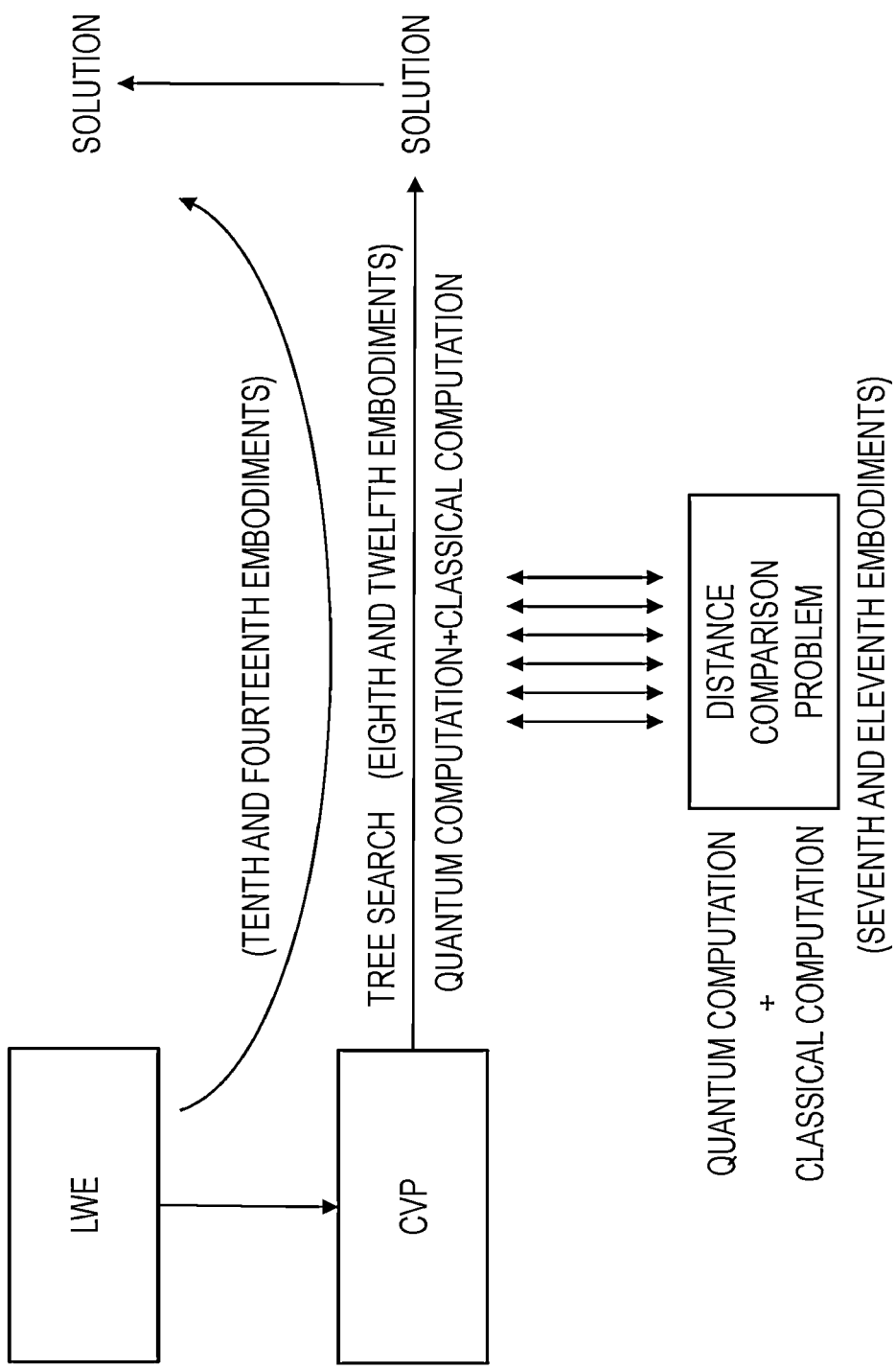
FIG. 18 is a conceptual diagram representing the correspondence relationship between the embodiments.

In the seventh embodiment, the distance comparison problem is solved by computation (quantum computation) through the quantum computer and computation (classical computation) through the classical computer (FIGS. 17 and 18). The distance comparison problem is a problem of judging (deciding) one of two vectors that has a shorter distance to the closest vector in the L(B).

<Configuration>

Figure 19:
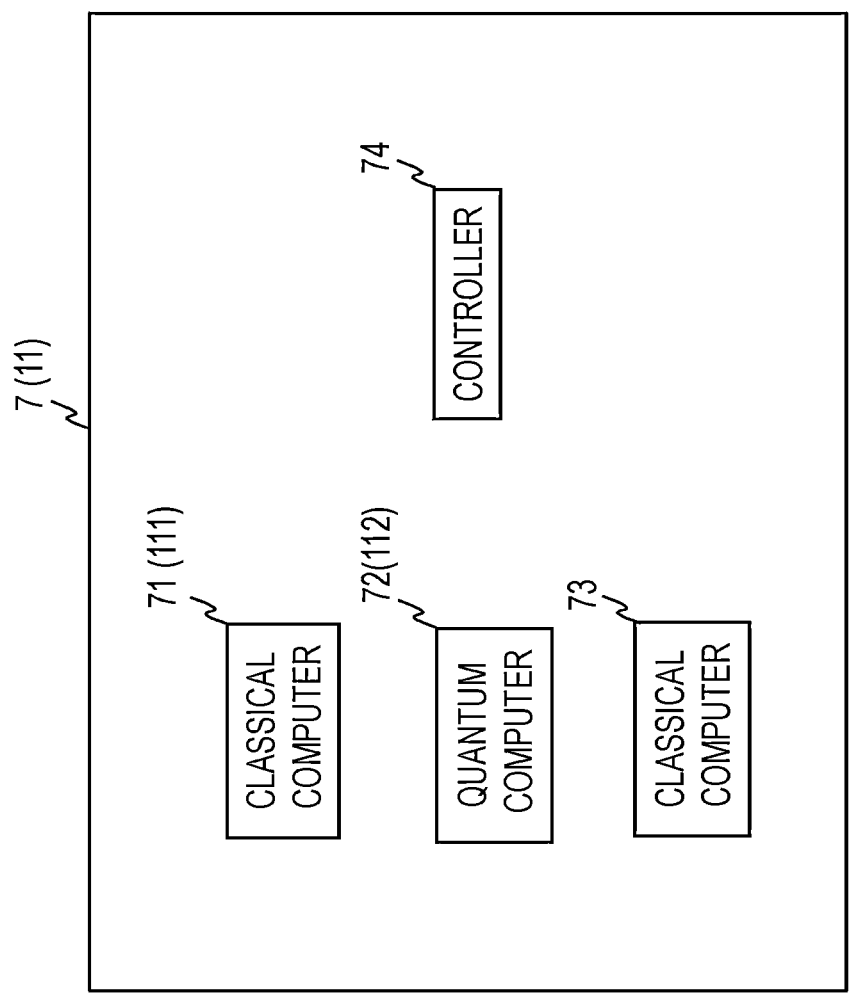
FIG. 19 is a block diagram exemplifying a functional configuration of a decision apparatus of the embodiment.
Figure 20:
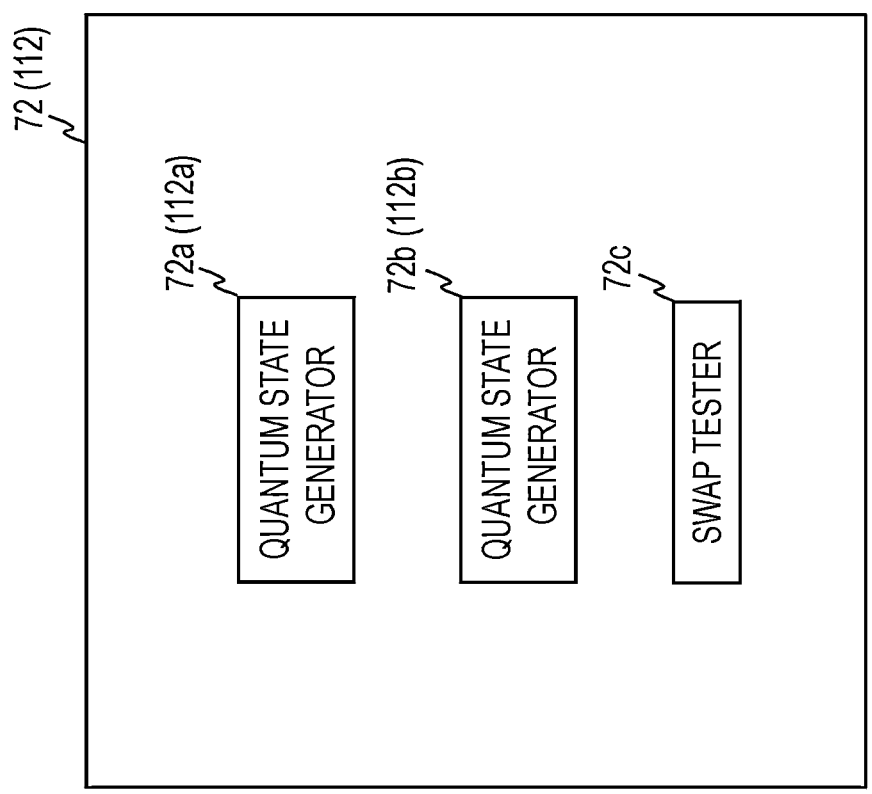
FIG. 20 is a block diagram exemplifying a functional configuration of a quantum computer of the embodiment.

As shown in FIG. 19, a decision apparatus 7 of this embodiment includes classical computers 71 and 73 (first and second classical computers), a quantum computer 72, and a controller 74. As exemplified in FIG. 20, the quantum computer 72 of this embodiment includes quantum state generators 72a and 72b (first to fourth quantum state generators), and a swap tester 72c (first and second swap testers). The decision apparatus 7 executes each process under control of the controller 74. The classical computers 71 and 73 include multiple arithmetic units. The quantum state generators 72a and 72b and the swap tester 72c include multiple quantum computers (not shown). The decision apparatus 7 includes processing circuitry configured to implement the classical computers 71 and 73 and the quantum computer 72 (the first classical computer, the first quantum state generator, the second quantum state generator, the first swap tester, the third quantum state generator, the fourth quantum state generator, the second swap tester, and the second quantum computer).

<Processes>

The processes of this embodiment are described.

The decision apparatus 7 of this embodiment receives, as inputs, the basis B, the target vector $t1 = (t_{1,1}, \ldots, t_{1,n})^T$ having n integer elements $t_{1,i}$ and the target vector $t2 = (t_{2,1}, \ldots, t_{2,n})^T$ having n integer elements $t_{2,i}$, performs classical computation and quantum computation described later, and decides which one is larger between $\|t1^{(d)}\|$ and $\|t2^{(d)}\|$. Note that $t1^{(d)}$ is the difference vector $t1^{(d)} = t1 - t1^{(c)} = (t_{1,1}^{(d)}, \ldots, t_{1,n}^{(d)})$ between the target vector $t1$ and the closest vector $t1^{(c)} \in L(B)$ of this target vector $t1$. $t2^{(d)}$ the difference vector $t2^{(d)} = t2 - t2^{(c)} = (t_{2,1}^{(d)}, \ldots, t_{2,n}^{(d)})$ between the target vector $t2$ and the closest vector $t2^{(c)} \in L(B)$ of this target vector $t2$. n and N are positive integers, $i=1, \ldots, n$. $\eta^T$ is the transpose of $\eta$. $\|\eta\|$ is the length of $\eta$. $B = \{b_1, \ldots, b_n\}$ is the basis having linearly independent n-dimensional vectors $b_i$. Each n-dimensional vector $b_i$ has n integer elements. $\beta$ is a basis matrix (n×n matrix) that has n rows and n columns and has an n-dimensional vectors $b_1, \ldots, b_n$ of the basis B, as elements. For example, $\beta$ is the following matrix having an n-dimensional vector $b_i$ as the i-th component (row vector).

$$B = \begin{pmatrix} b_1 \\ b_2 \\ \vdots \\ b_n \end{pmatrix}$$

<<Processes of Classical Computer 71>>

The arithmetic urns of the classical computer 71 (FIG. 19) of the decision apparatus 7 selects the integer N (step S711). For example, the classical computer 71 sets a common multiple of the denominators of each non-zero elements of the inverse matrix $\beta^{-1}$ of the basis matrix $\beta$ to the integer N. Although there are infinite number of such common multiples, an arbitrarily selected number may be fixed as the integer N. For example, the classical computer 71 sets the least common multiple of the denominators of non-zero elements of the inverse matrix $\beta^{-1}$ of the basis matrix $\beta$ to the integer N.

Furthermore, the arithmetic unit of the classical computer 71 uses the basis B and the integer N to obtain and output a dual basis $B^-$ of B of modulo N (step S712). Note that L(B) is the lattice $\{\Sigma_{i=1, \ldots, n} x_i b_i | x_i \in Z, b_i \in B\}$. $x_i$ is an integer. $L(B^-)$ is the dual lattice of modulo N, the dual lattice being defined for the basis B and the integer N. The upper index of "−" "$B^-$" should be totaled immediately above "B". However, due to limitation of descriptive notation, the index is notated at the upper right of "B". For example, the classical computer 71 computes the dual basis $B^-$ as follows. The classical computer 71 sets a matrix having n rows and 2n columns (n×2n matrix) obtained by arranging NI and B in the horizontal direction, and it is represented as (NI B). Note that I is the n-dimensional unit matrix. The classical computer 71 Hermite-decomposes the transposed matrix of the matrix (NI B)

$$\begin{pmatrix} NI \\ B^T \end{pmatrix}$$

and computes a 2n×2n unimodular matrix U and a 2n×n matrix H in Hermite normal form satisfying $$U \begin{pmatrix} NI \\ B^T \end{pmatrix} = H$$

Furthermore, the classical computer 71 sets a lower right n×n submatrix of the unimodular matrix U to $$\begin{pmatrix} u_1 \\ u_2 \\ \vdots \\ u_n \end{pmatrix}$$

Here, $u_i$ is an n-dimensional vector (n-dimensional row vector). The classical computer 71 computes an LLL-reduced basis of $\{u_1, \ldots, u_n\}$, and outputs the LLL-reduced basis as the dual basis $B^-=\{b^-_1, \ldots, b^-_n\}$. The basis matrix (n×n matrix) that has n rows and n columns and has an n-dimensional vectors $b^-_1, \ldots, b^-_n$, of the dual basis $B^-$ as elements, is represented as $\overline{B}^-$. For example, $\overline{B}^-$ is the following matrix having an n-dimensional vector $b^-_i$ as the i-th component (row vector).

$$\overline{B} = \begin{pmatrix} \overline{b}_1 \\ \overline{b}_2 \\ \vdots \\ \overline{b}_n \end{pmatrix}$$

<<Processes of Quantum Computer 72>>

The quantum computer 72 (FIG. 20) receives the dual basis and the target vectors t1 and t2 as inputs, executes the following process for an appropriate region in the n-dimensional space (a partial region belonging to the n-dimensional space made up of integer elements) $R \subseteq Z^n$, and outputs the result of the swap test (step S72). For example, $R \subset Z^n$. $\eta1 \subseteq \eta2$ represents that $\eta1$ is a subset of $\eta2$, and $\eta1 \subset \eta2$ represents $\eta1$ is a proper subset of $\eta2$.

For example, the following region $R(\Gamma \overline{B}^-)$ can be regarded as the region R.

$$R(\Gamma \overline{B}) = \sum_{j''=1}^n R_{[0,\Gamma)} \overline{b}_{j''} = \left\{ \sum_{j''=1}^n x''_j \overline{b}''_j \mid 0 \le x''_1, \ldots, x''_n < \Gamma \right\}$$

Note that $R_{[0,\Gamma)}$ is a real number of 0 or more and less than $\Gamma$, $x''_{j''}$ is a real number, and $\Gamma$ is an integer of 2 or more, for example $\Gamma=2$.

Alternatively, for example, the following region $R(\Gamma \overline{B}^{-*})$ may be adopted as the region R.

$$R(\Gamma \overline{B}^*) = \sum_{j''=1}^n R_{[0,\Gamma)} \overline{b}^*_{j''} = \left\{ \sum_{j''=1}^n x''_{j''} \overline{b}^*_{j''} \mid 0 \le x''_1, \ldots, x''_n < \Gamma \right\}$$

where $\overline{B}^{-*}$ represents the basis $\overline{B}^{-*}=\{b^{-*}_1, \ldots, b^{-*}_n\}$ made up of Gram-Schmidt non-normalized orthogonal vectors $b^{-*}_1, \ldots, b^{-*}_n$ of the dual basis $B^-$. $b^{-*}_1, \ldots, b^{-*}_n$ are obtained by arranging $b^-_1, \ldots, b^-_n$ in an appropriate order and orthogonalizing the arranged vectors using Gram-Schmidt orthogonalization. Each $b^{-*}_1$ is an n-dimensional vector having n integer elements. Note that the region R does not limit the present invention.

The quantum computer 72 performs the following computation.

(a-1) The quantum state generator 72a of the quantum computer 72 generates (prepares) multiple registers (typically made up of multiple quantum bits) having quantum states $$|\varphi\rangle_0 = \frac{1}{\sqrt{|(R \cap L(\overline{B}))|}} \sum_{x \in R \cap L(B)} |x\rangle$$

Note that $|\Lambda|$ represents the number of elements $\Lambda$ (step S72a-1).

(b-1) The quantum state generator 72b performs quantum manipulation for some registers in the quantum state $|\phi\rangle_0$ (step S72b-1). Accordingly, the quantum state of the register to which the quantum manipulation has been applied transitions (changes) to the following quantum state, $$|\varphi\rangle_M = \frac{1}{\sqrt{|(R \cap L(\overline{B}))|}} \sum_{x \in R \cap L(B)} |x\rangle$$

For example, the quantum state generator 72b performs quantum manipulation to half of registers in the quantum state $|\phi\rangle_0$ created in step S72a-1. Note that $<\tau, \chi>$ the inner product between $\tau$ and $\chi$, and $i_m$ represents an imaginary unit. The herein used quantum manipulation is, for example, quantum rotation gates represented as Follows for $i=1, \ldots, n$, that is, n types of quantum rotation gates.

$$\begin{pmatrix} 1 & 0 & \cdots & 0 \\ 0 & e^{2\pi i_m t_{1,i}/N} & \cdots & 0 \\ \vdots & \vdots & \ddots & \vdots \\ 0 & 0 & \cdots & e^{2\pi i_m t_{1,i}(N-1)/N} \end{pmatrix}$$

As described above, the registers having not been subjected to the quantum manipulation are in a quantum state $|\phi\rangle_0$, and the registers having been subjected to the quantum manipulation are in a quantum state $|\phi\rangle_{t1}$, Hereinafter, for the sake of convenience, the register that stores the quantum state $|\phi\rangle_0$ is called a first register, and the register that stores the quantum state $|\phi\rangle_{t1}$ is called a second register. The number of first registers and the number of second registers may each be two or more. Preferably, the numbers of first registers and second registers are the same.

Figure 21:
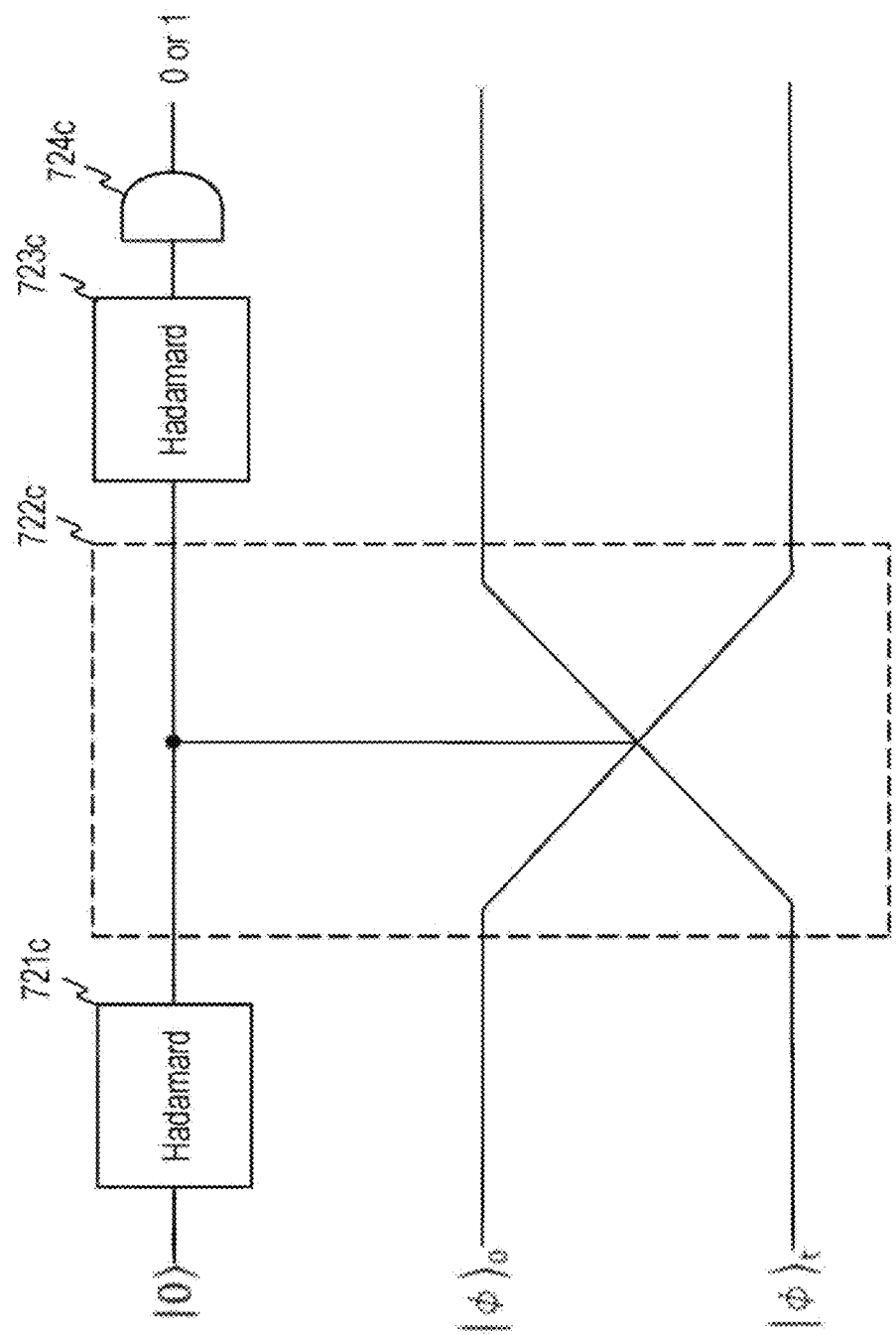
FIG. 21 exemplifies a quantum circuit that performs a swap test of the embodiment.

The swap tester 72c sets the register that stores the quantum state $|\phi\rangle_0$ and the register that stores the quantum state $|\phi\rangle_{t1}$ as a pair, executes a swap test for each pair, and decides whether the result of the swap test for each pair is receipt (0, Yes) or denied (1, No). The swap test is a well-known test method. Accordingly, the detailed description thereof is omitted. For example, the swap tester 72c executes the swap test through quantum manipulation corresponding to a quantum circuit that includes the Hadamard gates 721c and 723c, a control swap gate 722c, and an observation gate 724c, as exemplified in FIG. 21. More specifically, the swap tester 72c applies the Hadamard gate 721c to the quantum bit I (one quantum bit) in the quantum state $|0\rangle$, applies the control swap gate 722c where a quantum bit II and a quantum bit III serve as control bits, and a quantum bit I serves as a target bit, to the quantum bit II in the quantum state $|\phi\rangle_0$ (typically, multiple quantum bits) and the quantum bit III in the quantum state $|\phi\rangle_t = |\phi\rangle_{t1}$ (typically, multiple quantum bits) and the quantum bit I, applies the Hadamard gate 723c to the quantum bit I, and causes the observation gate 724c to observe the quantum bit I, thereby obtaining and outputting a result of receipt (0, Yes) or denied (1, No).

The quantum computer 72 computes the probability $p_2$ as follows.

(a-2) The quantum state generator 72a of the quantum computer 72 generates (prepares) multiple registers (typically made up of multiple quantum bits) having quantum states $$|\varphi\rangle_0 = \frac{1}{\sqrt{|(R \cap L(\overline{B}))|}} \sum_{x \in R \cap L(\overline{B})} |x\rangle$$

and outputs the registers (step S72a-2).

(b-2) The quantum state generator 72b performs quantum manipulation for some registers in the quantum state $|\phi\rangle_0$ (step S72b-2). Accordingly, the quantum state of the register to which the quantum manipulation has been applied transitions (changes) to the following quantum state.

$$|\varphi\rangle_{t2} = \frac{1}{\sqrt{|(R \cap L(\overline{B}))|}} \sum_{x \in R \cap L(\overline{B})} e^{2\pi i m \langle t2, x \rangle / N} |x\rangle$$

For example, the quantum state generator 72b performs quantum manipulation to half of registers in the quantum state $|\phi\rangle_0$, thereby obtaining registers in the quantum state $|\phi\rangle_{t2}$. The quantum manipulation here is, for example, a quantum rotation gate represented as follows.

$$\begin{pmatrix} 1 & 0 & \cdots & 0 \\ 0 & e^{2\pi i m t_{2,i}/N} & \cdots & 0 \\ \vdots & \vdots & \ddots & \vdots \\ 0 & 0 & \cdots & e^{2\pi i m t_{2,i}(N-1)/N} \end{pmatrix}$$

As described above, the registers having not been subjected to the quantum manipulation are in a quantum state $|\phi\rangle_0$, and the registers having been subjected to the quantum manipulation are in a quantum state $|\phi\rangle_{t2}$. Hereinafter, the register that stores the quantum state $|\phi\rangle_0$ is called a first register, and the register that stores the quantum state $|\phi\rangle_{t2}$ is called a third register. The number of first registers and the number of third registers may each be two or more. Preferably, the numbers of first registers and third registers are the same.

(c-2) The swap tester 72c sets the register that stores the quantum state $|\phi\rangle_0$ and the register that stores the quantum state $|\phi\rangle_{t2}$ as a pair, executes a swap test for each pair, and decides whether the result of the swap test for each pair is receipt (0, Yes) or denied (1, No). The swap tester 72c outputs a result obtained by performing the swap test to each of multiple pairs.

<<Processes of Classical Computer 73>>

The classical computer 73 uses the result output from the quantum computer 72 to compute the probability $p_1$ that the result of the swap test for the pair of the quantum state $|\phi\rangle_0$ and the quantum state $|\phi\rangle_{t1}$ is receipt, and the probability $p_2$ that the result of the swap test for the pair of the quantum state $|\phi\rangle_0$ and the quantum state $|\phi\rangle_{t2}$ is receipt. When $p_1 \geq p_2$, information representing that $\|t1^{(d)}\| \leq \|t2^{(d)}\|$ is output. When $p_1 < p_2$, information representing that $\|t1^{(d)}\| > \|t2^{(d)}\|$ is output. Alternatively, when $p_1 > p_2$, the classical computer 73 outputs information representing that $\|t1^{(d)}\| < \|t2^{(d)}\|$. When $p_1 \leq p_2$, the classical computer 73 outputs information representing that $\|t1^{(d)}\| \geq \|t2^{(d)}\|$ (step S73).

<Example of Selection of Region R and Method of Efficiently Creating Quantum State $|\phi\rangle_0$ Corresponding Thereto>

Next, the region R and a method of efficiently creating the quantum state $|\phi\rangle_0$ corresponding thereto are exemplified.

Hereinafter, a case of defining the region R as in Examples 1 and 2 is exemplified.

EXAMPLE 1 OF PARTIAL REGION $$R(2\overline{B}) = \sum_{j''=1}^{n} R_{[0,2]} \overline{b}_{j''} = \left\{ \sum_{j''=1}^{n} x''_{j''} \overline{b}_{j''} \,\middle|\, 0 < x''_1, \ldots, x''_n < 2 \right\}$$

The region R ($2\overline{B}$) is an internal region of an n-dimensional parallelotope in the n-dimensional space spanned by the basis $\overline{B}$.

EXAMPLE 2 OF REGION $$R(2\overline{B}^*) = \sum_{j''=1}^{n} R_{[0,2]} \overline{b}^*_{j''} = \left\{ \sum_{j''=1}^{n} x''_{j''} \overline{b}^*_{j''} \,\middle|\, 0 \leq x''_1, \ldots, x''_n < 2 \right\}$$

The region R ($2\overline{B}^{-*}$) is an internal region of an n-dimensional hyperrectangle in the n-dimensional space spanned by the basis $\overline{B}$.

Hereinafter, a method of efficiently generating the quantum state $|\phi\rangle_0$ defined by $$\frac{1}{\sqrt{|(R \cap L(\overline{B}))|}} \sum_{x \in R \cap L(\overline{B})} |x\rangle$$

for the two types of regions $R = R(2\overline{B}^-)$ and $R(2\overline{B}^{-*})$ is exemplified.

<<Example of Method of Effectively Generating Quantum State $|\phi\rangle_0$ in Example 1 of Region>>

The arithmetic unit of the classical computer 71 sets a common multiple of the denominators of non-zero elements of the inverse matrix $B^{-1}$ of the basis matrix $\beta$ to the integer N. For example, the classical computer 71 sets the least, common multiple of the denominators of non-zero elements of the inverse matrix $B^{-1}$ of the basis matrix $\beta$ to the integer N (step S711). Furthermore, the arithmetic unit of the classical computer 71 uses the basis B and the integer N to obtain and output a dual basis $B^-$ of B of modulo N as described above (step S712).

The quantum state generator 72a generates the quantum state $|\phi\rangle_0$ according to the following procedures (step S72a-1).

1. The quantum state generator 72a prepares the quantum bit string (first register) having the following superposed state in an $N^n$-dimensional quantum state space.

$$\frac{1}{\sqrt{|([0, N)^n \cap L(\overline{B}))|}} \sum_{x \in [0,N)^n \cap L(\overline{B})} |x\rangle \quad (11)$$

This corresponds to the representation of $L(\overline{B}^-)$ lattice point in a superposed state.

2. The quantum state generator 72a performs quantum manipulation corresponding to the following transformation, for the first register that stores the quantum state of Formula (11), and a quantum bit (second register) in a newly prepared initialized quantum bit in the quantum state $|\phi\rangle$.

$$|x\rangle|x'\rangle \rightarrow |x\rangle|x' \oplus x \cdot \overline{B}^{-1}\rangle$$

where $$x \cdot \overline{B}^{-1}$$

is a unique row vector y satisfying $$x = y \cdot \overline{B}$$

Consequently, $$x \cdot \overline{B}^{-1}$$

is the coordinates of the end point of a vector x in the coordinate system spanned by the basis $\overline{B}^-$. This quantum manipulation transforms the quantum states of the first register and the second register into the following states.

$$\frac{1}{\sqrt{|([0, N)^n \cap L(\overline{B}))|}} \sum_{x \in [0,N)^n \cap L(\overline{B})} |x\rangle|x \cdot \overline{B}^{-1}\rangle \quad (12)$$

Provided that $$y = (y_{x,1}, \ldots, y_{x,n}) = x \cdot \overline{B}^{-1}$$

Formula (12) can be written as follows, $$\frac{1}{\sqrt{|([0, N)^n \cap L(\overline{B}))|}} \sum_{x \in [0,N)^n \cap L(\overline{B})} |x\rangle|y_{x,1}, \ldots, y_{x,n}\rangle \quad (13)$$

3. The quantum state generator 72a performs quantum manipulation represented as follows for the first register and the second register that store the quantum state of Formula (13) and a string of newly prepared n initialized quantum bits (third register), $$|y_{x,i}\rangle|0\rangle \rightarrow |y_{x,i}\rangle|\text{floor}(y_{x,i}/2)\rangle$$

This manipulation transforms the quantum states of the first register, the second register and the third register into the following states.

$$\frac{1}{\sqrt{|([0, N)^n \cap L(\overline{B}))|}} \sum_{x \in [0,N)^n \cap L(\overline{B})} |x\rangle|y_{x,1}, \ldots, y_{x,n}\rangle|\text{floor}(y_{x,1}/2), \quad (14)$$

$$\ldots, \text{floor}(y_{x,n}/2)\rangle$$

4. The quantum state generator 72a observes the third register $$|\text{floor}(y_{x,i}/2), \ldots, \text{floor}(y_{x,n}/2)\rangle$$

in Formula (14) to obtain observed values $z_1, \ldots, z_n$. The quantum states of the first register and the second register are in the following states.

$$\frac{1}{\sqrt{|([0, N)^n \cap L_{n+1}(\overline{B}))|}} \sum_{x \in [0,N)^n \cap \left(\sum_{j''=1}^{n} 2z_{j''} \overline{b}_{j''} + L_{n+1}(\overline{B})\right)} |x\rangle|\text{floor}(y_{x,1}), \quad (15)$$

$$\ldots, \text{floor}(y_{x,n})\rangle$$

Here, provided that $$L_1(\overline{B}) = \{\Sigma_{j''=i}^{n} x_j \overline{b}_{j''} | x_1, \ldots, x_{i-1} = 0 \text{ or } 1, \text{ and } x_1, \ldots, x_n \in Z\},$$

$$L_{n+1}(\overline{B}) = \{\Sigma_{j''=1}^{n} x_j \overline{b}_{j''} | x_1, \ldots, x_n = 0 \text{ or } 1\}$$

holds. Accordingly, the following characteristics hold.

$$R(2\overline{B}^-) \cap L(\overline{B}^-) = [0,N)^n \cap_{n+1}(\overline{B}^-) \quad (15A)$$

5. The quantum state generator 72a performs quantum manipulation represented by $$|x\rangle|x'\rangle \rightarrow |x\rangle|x' \oplus x \cdot \overline{B}^{-1}\rangle$$

for the first register and the second register that store the quantum state of Formula (15). This manipulation removes the second register, and causes the first register to be in the following quantum state.

$$\frac{1}{\sqrt{|([0, N)^n \cap L_{n+1}(\overline{B}))|}} \sum_{x \in [0,N)^n \cap \left(\sum_{j''=1}^{n} 2z_{j''} \overline{b}_{j''} + L_{n+1}(\overline{B})\right)} |x\rangle \quad (16)$$

6. The quantum state generator 72a performs quantum manipulation represented by $$|x\rangle \rightarrow |(x - \Sigma_{j''=1}^{n} 2z_j \overline{b}_{j''}) \bmod N\rangle$$

for the first register. This manipulation causes the quantum state of the first register to be in the following state.

$$\frac{1}{\sqrt{|([0, N)^n \cap L_{n+1}(\overline{B}))|}} \sum_{x \in [0,N)^n \cap L_{n+1}(\overline{B})} |x\rangle \quad (17)$$

According to the characteristics of Formula (15A), it can be said that the quantum state of Formula (17) is equal to $$\frac{1}{\sqrt{|(R(2\overline{B}) \cap L(\overline{B}))|}} \sum_{x \in R(2\overline{B}) \cap L(\overline{B})} |x\rangle \quad (18)$$

That is, the above manipulation obtains the quantum state $|\phi\rangle_0$.

<<Example of Method of Effectively Generating Quantum State $|\phi\rangle_0$ in Example 2 of Region>>

The definition of the region $R(2\overline{B}^{-*})$ depends on the order of orthogonalization of the n-dimensional vectors $b^-_1, \ldots, b^-_n$ of the dual basis $\overline{B}^-$. In this example, for the sake of simplicity, vectors $b^-_1, \ldots, b^-_n$ orthogonalized in the order of $b^-_n, \ldots, b^-_1$ are represented as $b^{-*}_1, \ldots, b^{-*}_n$, and a method of generating the quantum state $|\phi\rangle_0$ is exemplified. According to the definition of $b^{-*}_1, \ldots, b^{-*}_n$, $$\bar{b}_n^* = \bar{b}_n$$

$$\bar{b}_{j''}^* = \bar{b}_{j''} - \Sigma_{i''>j''} \text{Proj}(\bar{b}_{j''}, \bar{b}_{i''}^*) \tag{19}$$

holds. Here $j''=n-1, n-2, \ldots 1$.

$$\text{Proj}(\bar{b}_{j''}, \bar{b}_{j''}^*)$$

is a projection of the vector $b^-_{j''}$ onto $b^{-*}_{j''}$. Consequently, $$\text{Proj}(\bar{b}_{j''}, \bar{b}_{i''}^*) = \frac{\langle \bar{b}_{j''}, \bar{b}_{i''}^* \rangle}{\langle \bar{b}_{i''}^*, \bar{b}_{i''}^* \rangle} \bar{b}_{i''}^*$$

$$\frac{\langle \bar{b}_{j''}, \bar{b}_{i''}^* \rangle}{\langle \bar{b}_{i''}^*, \bar{b}_{i''}^* \rangle} \in Q$$

Note that Q represents the set of rational numbers. An upper triangular matrix A" having rational elements is defined as follows.

$$A'' = \begin{pmatrix} 1 & \frac{\langle \bar{b}_1, \bar{b}_2^* \rangle}{\langle \bar{b}_2^*, \bar{b}_2^* \rangle} & \frac{\langle \bar{b}_1, \bar{b}_3^* \rangle}{\langle \bar{b}_3^*, \bar{b}_3^* \rangle} & \cdots & \frac{\langle \bar{b}_1, \bar{b}_n^* \rangle}{\langle \bar{b}_n^*, \bar{b}_n^* \rangle} \\ 0 & 1 & \frac{\langle \bar{b}_2, \bar{b}_3^* \rangle}{\langle \bar{b}_3^*, \bar{b}_3^* \rangle} & \cdots & \frac{\langle \bar{b}_2, \bar{b}_n^* \rangle}{\langle \bar{b}_n^*, \bar{b}_n^* \rangle} \\ 0 & 0 & 1 & \ddots & \vdots \\ & & & \ddots & \langle \bar{b}_{n-1}, \bar{b}_n^* \rangle \\ \vdots & \vdots & & & \langle \bar{b}_n^*, \bar{b}_n^* \rangle \\ 0 & 0 & 0 & \cdots & 1 \end{pmatrix} \tag{20}$$

According to Formula (19), $$\begin{pmatrix} \bar{b}_1 \\ \vdots \\ \bar{b}_n \end{pmatrix} = A'' \begin{pmatrix} \bar{b}_1^* \\ \vdots \\ \bar{b}_n^* \end{pmatrix} \tag{21}$$

holds, $b^{-*}_1, \ldots, b^{-*}_n$ orthogonal vectors. Consequently, a matrix having row vectors including elements obtained by normalizing these orthogonal vectors $$U = \begin{pmatrix} \frac{\bar{b}_1^*}{\|\bar{b}_1^*\|} \\ \vdots \\ \frac{\bar{b}_n^*}{\|\bar{b}_n^*\|} \end{pmatrix} \tag{22}$$

is an orthogonal matrix.

The arithmetic unit of the classical computer 71 sets a common multiple of the denominators of non-zero elements of the inverse matrix $\beta^{-1}$ of the basis matrix $\beta$ (which may be the inverse matrix $\beta^{-1}$ of the basis matrix $\beta^-$) to the integer N. For example, the classical computer 71 sets the least common multiple of the denominators of non-zero elements of the inverse matrix $\beta^{-1}$ of the basis matrix $\beta$ to the integer N (step S711). Furthermore, the arithmetic unit of the classical computer 71 uses the basis B and the integer N to obtain and output a dual basis $B^-$ of B of modulo N as described above (step S712).

The quantum state generator 72a generates the quantum state $|\phi\rangle_0$ according to the following procedures (step S72a-1).

1. The quantum state generator 72a prepares the quantum bit string (first register) in the following quantum superposed state in an $N^n$-dimensional quantum state space.

$$\frac{1}{\sqrt{|([0, N)^n \cap L(\bar{B}))|}} \sum_{x \in [0,N)^n \cap L(\bar{B})} |x\rangle \tag{23}$$

This corresponds to the representation of $L(B^-)$ lattice point in a superposed state.

2. The quantum state generator 72a performs quantum manipulation represented by $$|x\rangle|x'\rangle \to |x\rangle|x' \oplus x \cdot U\rangle$$

for the first register that stores the quantum state of Formula (23), and a quantum bit (second register) in a newly prepared initialized quantum bit. Here, given $x=(x_1, \ldots, x_n)$, $$x \cdot U = \frac{x_1 \bar{b}_1^*}{\|\bar{b}_1^*\|} + \ldots + \frac{x_n \bar{b}_n^*}{\|\bar{b}_n^*\|}$$

holds. This quantum manipulation transforms the quantum states of the first register and the second register into the following slates.

$$\frac{1}{\sqrt{|([0, N)^n \cap L(\bar{B}))|}} \sum_{x \in [0,N)^n \cap L(\bar{B})} |x\rangle|x \cdot U\rangle$$

Given $y=(y'_{x,1}, \ldots, y'_{x,n})=x \cdot U$, the quantum state can be represented as $$\frac{1}{\sqrt{|([0, N)^n \cap L(\bar{B}))|}} \sum_{x \in [0,N)^n \cap L(\bar{B})} |x\rangle|y'_{x,1}, \ldots, y'_{x,n}\rangle \tag{24}$$

The quantum state of Formula (24) is represented as $|\Psi_1\rangle$.

3. The quantum state generator 72a executes the following manipulations (a) and (b) for $i=1, \ldots, n$, and finally obtains the quantum state $|\Psi_{n+1}\rangle$ by sequentially transforming the quantum state $|\Psi_1\rangle$ into $|\Psi_2\rangle, |\Psi_2\rangle, \ldots$, Here, using observed values $z_1, \ldots, z_n$ by observing the third register in Formula (14) described above, $|\Psi_i\rangle$ is the quantum state represented as $$\frac{1}{\sqrt{|([0, N)^n \cap L_i(\bar{B}))|}} \sum_{x \in [0,N)^n \cap \left(\sum_{j''=1}^{i-1} 2z_{j''} \bar{b}_{j''} + L_i(\bar{B})\right)} |x\rangle|y'_{x,1}, \ldots, y'_{x,n}\rangle$$

Here, $$L_i(\bar{B}) = \{\Sigma_{j''=1}^n x_{j''} \bar{b}_{j''} | x_1, \ldots, x_{i-1} = 0 \text{ or } 1, \text{ and } x_1, \ldots, x_n \in Z\}$$

(a) The quantum state generator 72a performs quantum manipulation of transformation into the following quantum state, for the first register and the second register that store the quantum state $|\Psi_1\rangle$ and a newly prepared initialized quantum bit (third register).

$$\frac{1}{\sqrt{|([0,N)^n \cap L_i(\overline{B}))|}} \sum_{x \in [0,N)^n \cap L_i(\overline{B})} |x\rangle |y'_{x,1}, \ldots, y'_{x,n}\rangle \quad (25)$$

$$\left[ \frac{1}{2\|\overline{b}''_i\|} \left( y'_{x,i} \sum_{j''=1}^{i-1} 2z_{j''} \frac{\langle \overline{b}''_i, \overline{b}_{j''} \rangle}{\|\overline{b}''_i\|} \right) \right] \rangle$$

(b) The quantum state generator 72a observes the quantum bit of the third register. Let $z_i$ be the observed value obtained by observation. Let $|\Psi_{i+1}\rangle$ be the quantum states of the first and the second registers after observation.

4. The quantum state generator 72a performs quantum manipulation represented by $$|x\rangle |x'\rangle \to |x\rangle |x' \oplus x \cdot U\rangle$$

for the obtained quantum state $|\Psi_{n+1}\rangle$. This manipulation removes the second register, and causes the first register to be in the following quantum state.

$$\frac{1}{\sqrt{|([0,N)^n \cap L_{L+1}(\overline{B}))|}} \sum_{x \in [0,N)^n \cap (\sum_{j''=1}^{n} 2z_{j''} \overline{b}_{j''} + L_{n+1}(B))} |x\rangle \quad (26)$$

5. The quantum state generator 72a performs quantum manipulation represented by $$|x\rangle \to |(x - \sum_{j''=1}^{n} 2z_{j''} \overline{b}_{j''}) \bmod N\rangle$$

for the first register. This manipulation changes the quantum state of the first register to the following state.

$$\frac{1}{\sqrt{|([0,N)^n \cap L_{n+1}(\overline{B}))|}} \sum_{x \in [0,N)^n \cap L_{n+1}(B)} |x\rangle \quad (27)$$

The quantum state of Formula (27) is equal to $$\frac{1}{\sqrt{|(R(2\overline{B}^*) \cap L(\overline{B}))|}} \sum_{x \in R(2\overline{B}^*) \cap L(B)} |x\rangle \quad (28)$$

Consequently, the above manipulation obtains the quantum state $|\phi\rangle_0$.

SPECIFIC EXAMPLE

Next, a specific example of this embodiment is described. Here, an example of computing the probabilities $p_1$ and $p_2$ for n=2 and B={(8, 4), (6, −5)}, t1=(41, 22), t2=(29, 57) is described. Here, the basis matrix is $$\beta = \begin{pmatrix} 8 & 4 \\ 6 & -5 \end{pmatrix}$$

the closest vector $t1^{(c)}$=(40, 20), $t2^{(c)}$=(34, 57), and the difference vector (shortest difference vector) $t1^{(d)}$=(1, 2), $t2^{(d)}$=(−5, 0).

<<Processes of Classical Computer 71>>

The classical computer 71 computes the inverse matrix $\beta^{-1}$ of the basis matrix β, and obtains $$\beta^{-1} = \frac{1}{64}\begin{pmatrix} 5 & 4 \\ 6 & -8 \end{pmatrix}$$

Although any multiple of 64 may be selected as the integer N, it is assumed that N=64 is selected as the simplest example (step S711).

Furthermore, the arithmetic unit of the classical computer 71 uses the basis B={(8, 4), (6, −5)} and the integer N=64 to obtain and output a dual basis B⁻ of B of modulo N as follows. Let A' be the matrix. $(N\ IB)^T$. That is, $$A' = \begin{pmatrix} 64 & 0 \\ 0 & 64 \\ 8 & 6 \\ 4 & -5 \end{pmatrix}$$

holds. The Hermite normal form of the matrix A' is the upper in angular matrix $$A'' = \begin{pmatrix} 4 & 11 \\ 0 & 16 \\ 0 & 0 \\ 0 & 0 \end{pmatrix}$$

and, for an unimodular matrix $$U = \begin{pmatrix} -3 & 4 & 0 & 49 \\ -3 & 4 & 0 & 48 \\ -1 & 1 & 1 & 14 \\ -4 & 5 & 0 & 64 \end{pmatrix}$$

U·A'=A'' holds. A set {(1, 14), (0, 64)} of row vectors of the lower right 2×2 submatrix of this U is a basis of the dual lattice of the lattice L(B) of modulo N. An LLL-reduced basis of {(1, 14), (0, 64)} is computed using the LLL algorithm to obtain {(5, 6), (4, −8)}. Consequently, the dual basis is set as B⁻={(5, 6), (4, −8)}. The matrix including the basis vectors (5, 6) and (4, −8) of the dual basis B⁻ as row vectors is written as $$\overline{B} = \begin{pmatrix} 5 & 6 \\ 4 & -8 \end{pmatrix}$$

(step S712).

<<Processes of Quantum Computer 72>>

The quantum computer 72 receives the dual basis B⁻ and the target vectors t1 and t2 as inputs, executes the following process for the region R=R(2B⁻), and computes and outputs the probabilities $p_1$ and $p_2$ of obtaining 0 (receipt, Yes) (step S72). When R=R(2B⁻), the following holds.

$$R \cap L(\overline{B}) = \{(0,0),(5,6),(4,-8),(9,-2)\}$$

The quantum computer 72 computes the probability $p_1$ as follows.

(a-1) The quantum state generator 72a of the quantum computer 72 generates and outputs two registers each having six quantum bits where the following quantum state is encoded (total 12 quantum bits)

$|\varphi\rangle_0 = 1/2(|0,0\rangle + |5,6\rangle + |4,-8\rangle + |9,-2\rangle)$ Note that −8 and −2 are encoded as 56 (=−8 mod 64) and 62 (=−2 mod 64), respectively (step S72a-1).

(b-1) The quantum state generator 72b applies the following two types (as many as the number of dimensions n of the lattice) of quantum rotation gates to one register that stores the quantum state $|\varphi\rangle_0$.

$$\begin{pmatrix} 1 & 0 \\ 0 & \exp\left(\frac{2\pi i_m 2^5 t_{1,1}}{N}\right) \end{pmatrix} \otimes$$
$$\begin{pmatrix} 1 & 0 \\ 0 & \exp\left(\frac{2\pi i_m 2^4 t_{1,1}}{N}\right) \end{pmatrix} \otimes \cdots \otimes \begin{pmatrix} 1 & 0 \\ 0 & \exp\left(\frac{2\pi i_m t_{1,1}}{N}\right) \end{pmatrix}$$
$$\begin{pmatrix} 1 & 0 \\ 0 & \exp\left(\frac{2\pi i_m 2^5 t_{1,2}}{N}\right) \end{pmatrix} \otimes \begin{pmatrix} 1 & 0 \\ 0 & \exp\left(\frac{2\pi i_m 2^4 t_{1,2}}{N}\right) \end{pmatrix} \otimes$$
$$\cdots \otimes \begin{pmatrix} 1 & 0 \\ 0 & \exp\left(\frac{2\pi i_m t_{1,2}}{N}\right) \end{pmatrix}$$

Accordingly, the quantum state of the register to which the rotation gates have been applied is $$|\varphi\rangle_{t1} = \frac{1}{2}\left(|0,0\rangle + e^{2\pi i_m(5t_{1,1}+6t_{1,2})/N}|5,6\rangle + e^{2\pi i_m(4t_{1,1}-8t_{1,2})/N}|4,-8\rangle + e^{2\pi i_m(9t_{1,1}-2t_{1,2})/N}|9,-2\rangle\right)$$

where $t1=(t_{1,1}, t_{1,2})=(41, 22)$ (step S72b-1).

(c-1) The swap tester 72c executes a swap test for each pair of the register that stores the quantum state $|\varphi\rangle_0$ and the register that stores the quantum state $|\varphi\rangle_{t1}$ to obtain and output a decision result of whether the result is receipt (0, Yes) or denied (1, No) (step S72c-1).

The quantum computer 72 performs the following computation.

(a-2) The quantum state generator 72a of the quantum computer 72 generates and outputs two registers each having six quantum bits where the following quantum state is encoded (total 12 quantum bits)

$|\varphi\rangle = 1/2(|0,0\rangle + |5,6\rangle + |4,-8\rangle + |9,-2\rangle)$ Note that −8 and −2 are encoded as 56 (=−8 mod 64) and 62 (=−2 mod 64), respectively (step S72a-2).

(b-2) The quantum state generator 72b applies the following two types (as many as the number of dimensions) of quantum rotation gates to one register (six quantum bits) in the quantism state $|\varphi\rangle_0$.

$$\begin{pmatrix} 1 & 0 \\ 0 & \exp\left(\frac{2\pi i_m 2^5 t_{2,1}}{N}\right) \end{pmatrix} \otimes$$

$$\begin{pmatrix} 1 & 0 \\ 0 & \exp\left(\frac{2\pi i_m 2^4 t_{2,1}}{N}\right) \end{pmatrix} \otimes \cdots \otimes \begin{pmatrix} 1 & 0 \\ 0 & \exp\left(\frac{2\pi i_m t_{2,1}}{N}\right) \end{pmatrix}$$

$$\begin{pmatrix} 1 & 0 \\ 0 & \exp\left(\frac{2\pi i_m 2^5 t_{2,2}}{N}\right) \end{pmatrix} \otimes \begin{pmatrix} 1 & 0 \\ 0 & \exp\left(\frac{2\pi i_m 2^4 t_{2,2}}{N}\right) \end{pmatrix} \otimes$$

$$\cdots \otimes \begin{pmatrix} 1 & 0 \\ 0 & \exp\left(\frac{2\pi i_m t_{2,2}}{N}\right) \end{pmatrix}$$

Accordingly, the quantum state of the register to which the quantum rotation gates have been applied becomes as follows.

$$|\varphi\rangle_{t2} = \frac{1}{2}\left(|0,0\rangle + e^{2\pi i_m(5t_{2,1}+6t_{2,2})/N}|5,6\rangle + e^{2\pi i_m(4t_{2,1}-8t_{2,2})/N}|4,-8\rangle + e^{2\pi i_m(9t_{2,1}-2t_{2,2})/N}|9,-2\rangle\right)$$

where $t2=(t_{2,1}, t_{2,2})=(29, 57)$ (step S72b-2).

(c-2) The swap tester 72c executes a swap test for each pair of the register that stores the quantum state $|\varphi\rangle_0$ and the register that stores the quantum state $|\varphi\rangle_{t2}$ to obtain and output a decision result of whether the result is receipt (0, Yes) or denied (1, No) (step S72c-2).

<<Processes of Classical Computer 73>>

The classical 73 computes the probabilities $p_1$ and $p_2$ described above, using the decision result of the swap tester 72c. The target vector t1 is (41, 22). Consequently, the following holds.

$$\langle \varphi_0 | \varphi \rangle_{t1} = \frac{1}{4} \sum \exp(2\pi i_m t1 \cdot \Delta(B)^T / N)$$
$$= \frac{1}{4} \sum \exp\left(2\pi i_m (41, 22) \begin{pmatrix} 0 & 5 & 4 & 9 \\ 0 & 6 & -8 & -2 \end{pmatrix} / 64\right)$$
$$= \frac{1}{4}\left(1 + \exp\left(\frac{17\pi i_m}{32}\right) + \exp\left(-\frac{3\pi i_m}{8}\right) + \exp\left(\frac{5\pi i_m}{32}\right)\right)$$
$$\approx 0.54167 + 0.135675 i_m$$

where $i_m$ is an imaginary unit, as described above. $\Delta(B^-)$ is a matrix where the vertex coordinates of the unit parallelotope of $L(B^-)$ are listed. Consequently, the following holds.

$$p_1 = \frac{1 + |\langle \varphi_0 | \varphi \rangle_{t1}|^2}{2} \approx 0.655895$$

The target vector t2 is (29, 57). Consequently, the following holds.

$$\langle \varphi_0 | \varphi \rangle_{t2} = \frac{1}{4} \sum \exp(2\pi i_m t2 \cdot \Delta(\overline{B})^T / N)$$
$$= \frac{1}{4} \sum \exp\left(2\pi i_m (29, 57) \begin{pmatrix} 0 & 5 & 4 & 9 \\ 0 & 6 & -8 & -2 \end{pmatrix} / 64\right)$$
$$= \frac{1}{4}\left(1 + \exp\left(\frac{19\pi i_m}{32}\right) + \exp\left(-\frac{5\pi i_m}{8}\right) + \exp\left(\frac{25\pi i_m}{32}\right)\right)$$
$$\approx -0.111495 + 0.150333 i_m$$

Consequently, the following holds.

$$p_2 = \frac{1 + |\langle\varphi|_0|\varphi\rangle_{t2}|^2}{2} \approx 0.517516$$

Figure 22:
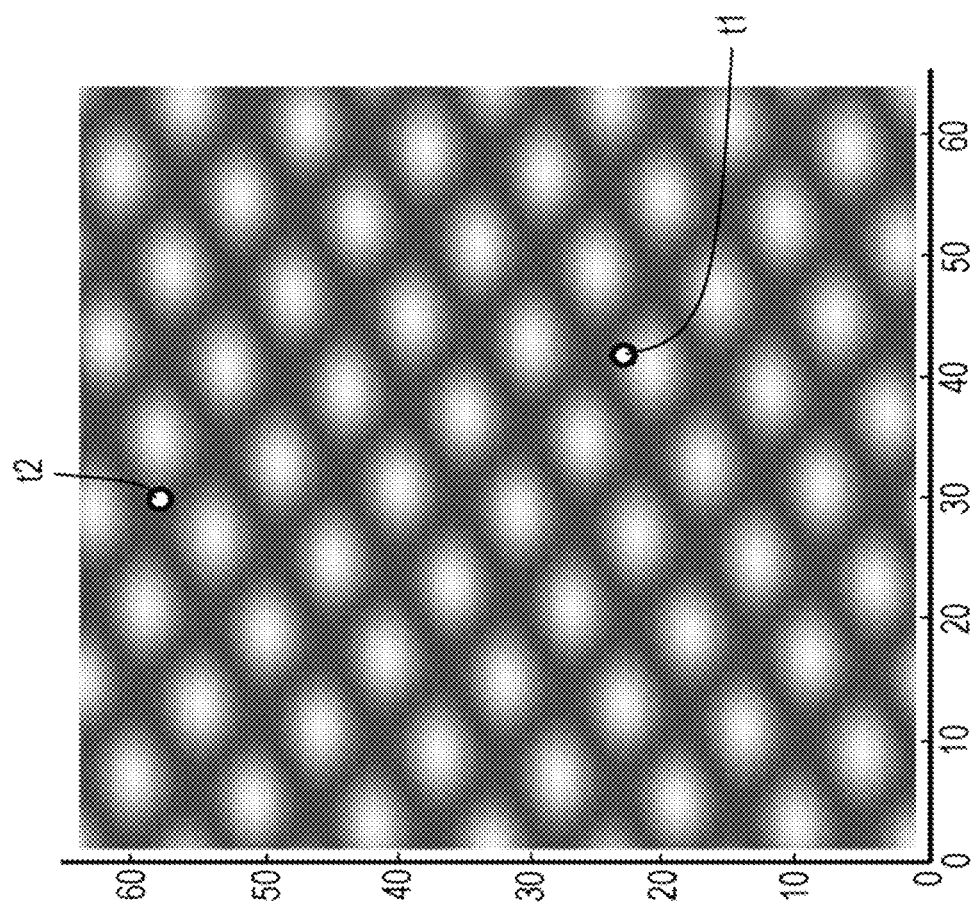
FIG. 22 illustrates a specific example of the embodiment.

The classical computer 73 receives, as inputs, the probabilities $p_1$ and $p_2$ obtained in steps S72c-1 and S72c-2, and compares these probabilities. In this example, $p_1 > p_2$. Accordingly, the classical computer 73 outputs information indicating that $\|t1^{(d)}\| < \|t2^{(d)}\|$ (step S73). FIG. 22 exemplifies the relationship between the density distribution of the probability $p=p_1$, $p_2$ in this specific example and the target vector t1, t2. The closer to the lattice point of the lattice $L(B)(B=(8, 4), (6, -5))$, the higher the value of p is. In FIG. 22, the higher p is in an area, the darker the area is colored. Also according to FIG. 22, it can be understood that $\|t1^{(d)}\| < \|t2^{(d)}\|$.

EIGHTH EMBODIMENT

An eighth embodiment uses the method of the seventh embodiment, and computes the solution of the given n-dimensional closest vector problem (B, t) (FIG. 17). That is, the method of the seventh embodiment is used for the given n-dimensional closest vector problem (B, t), and the closest vector $t^{(B, c)} \in L(B)$ is obtained on the lattice L(B). The closest vector is a vector having the shortest difference vector $t^{(B, d)} = t - t^{(B, c)}$ from the target vector t. Note that $t=(t_1, \ldots, t_n)^T$ is a target vector having n integer elements $t_i$. In a case where no confusion occurs when B is not represented in $t^{(B, c)}$ and $t^{(B, d)}$, $t^{(B, c)}$ and $t^{(B, d)}$ are represented as $t^{(c)}$ and $t^{(d)}$, respectively. (B, t)=$(B_0, t(0))$.

In this embodiment, to compute the difference vector $t^{(d)}$, the computation apparatus appropriately selects a string of sub-lattices of the lattice L(B)

$$L(B)=L(B_0) \supset L(B_1) \supset L(B_2) \supset \ldots \quad (30)$$

($\eta 2 \supset \eta 1$) represents that $\eta 1$ is a proper subset of $\eta 2$), and searches the representatives $\{c_{D,0}, c_{D,1}, \ldots, c_{D,v(D)-1}\}$ of the coset in $L(B_{D-1})/L(B_D)$ (where D is a positive integer, i.e., D=1, 2, ...), for $\alpha(D)$ (where $0 \leq \alpha(D) < v(D)$) satisfying the following $$t^{(B,d)} = (t(D-1) - c_{D,\alpha(D)})^{(BD,d)} \quad (31)$$

where v(D) is a positive integer. "BD" included in the upper index "(BD, d)" should be appropriately notated as "$B_D$". However due to limitation of descriptive notation, the actual notation is "BD". That is, the upper index "(BD, d)" represents "($B_D$, d)". Here, the fact that $\{c_{D, 0}, c_{D, 1}, \ldots, c_{D, v(D)-1}\}$ is the coset of $L(B_{D-1})/L(B_D)$ means that $\{C_{D, 0}, c_{D, 1}, \ldots, c_{D, v(D)-1}\}$ satisfies the following conditions 1 and 2.

$$(c_{D,0}+L(B_D)) \cup (c_{D,1}+L(B_D)) \cup \ldots \cup (c_{D,v(D)-1}+L(B_D))=L(B_{D-1}) \quad \text{Condition 1}$$

when $\kappa 1 \neq \kappa 2$ for any $\kappa 1, \kappa 2 (0 \leq \forall \kappa 1, \kappa 2 \leq v(D))$ Condition 2 ranging from 0 to v(D), both inclusive, $(c_{D,i}+L(B_D)) \cap (c_{D,j}+L(B_D))$ is empty.

For $\alpha(D)$ selected through the search, it is defined that $t(D)=t(D-1)-c_{D,k'}$, where k'=0, 1, ..., v(D)-1. According to Formula (31), the difference vector $t_{(B,d)}$ can be represented as follows.

$$t^{(B,d)} = t(0)^{(B0,d)} = t(1)^{(B1,d)} = t(2)^{(B2,d)} \quad (32)$$

That is, a sequence of t(0), t(1), t(2), ... is selected so that the closest vectors $t^{(B0, c)}$, $t^{(B1, c)}$, $t^{(B2, c)}$, ... in the closest vector problem $(B_0, t(0))$, $(B_1, t(1))$, $(B_2, t(2))$, ... can be invariant. In general, the larger the distance between points in lattices, the easier the closest vector computation becomes. Accordingly, execution of search to a sufficient depth D can solve $(B_D, t(D))$ in a short time by the classical algorithm. Consequently, the solution of the closest vector problem (B, t) can be computed using Formula (32) by a classical computer.

In this embodiment, the probability obtained from the result of the swap test described in the seventh embodiment is adopted as an evaluation function, and $\alpha(D)$ satisfying Formula (30) is searched for in a search interval $0 \leq \alpha(D) < v(D)$. Note that when the sequence of sub-lattices $L(B)=L(B_0) \supset L(B_1) \supset L(B_2) \supset \ldots$ of the lattice L(B) in Formula (30) is selected at the beginning, a search error caused by the selection error of the sequence of sub-lattices. Search for the candidates of sub-lattices $L(B_D)$ at each depth D is executed to select the best sub-lattice $B_D$ and $\alpha(D)$. That is, the sequence of sub-lattices of the lattice L(B) in Formula (30) is not decided at the beginning, but is sequentially decided by the search process at each depth D=1, 2, ....

<Configuration>

Figure 23:
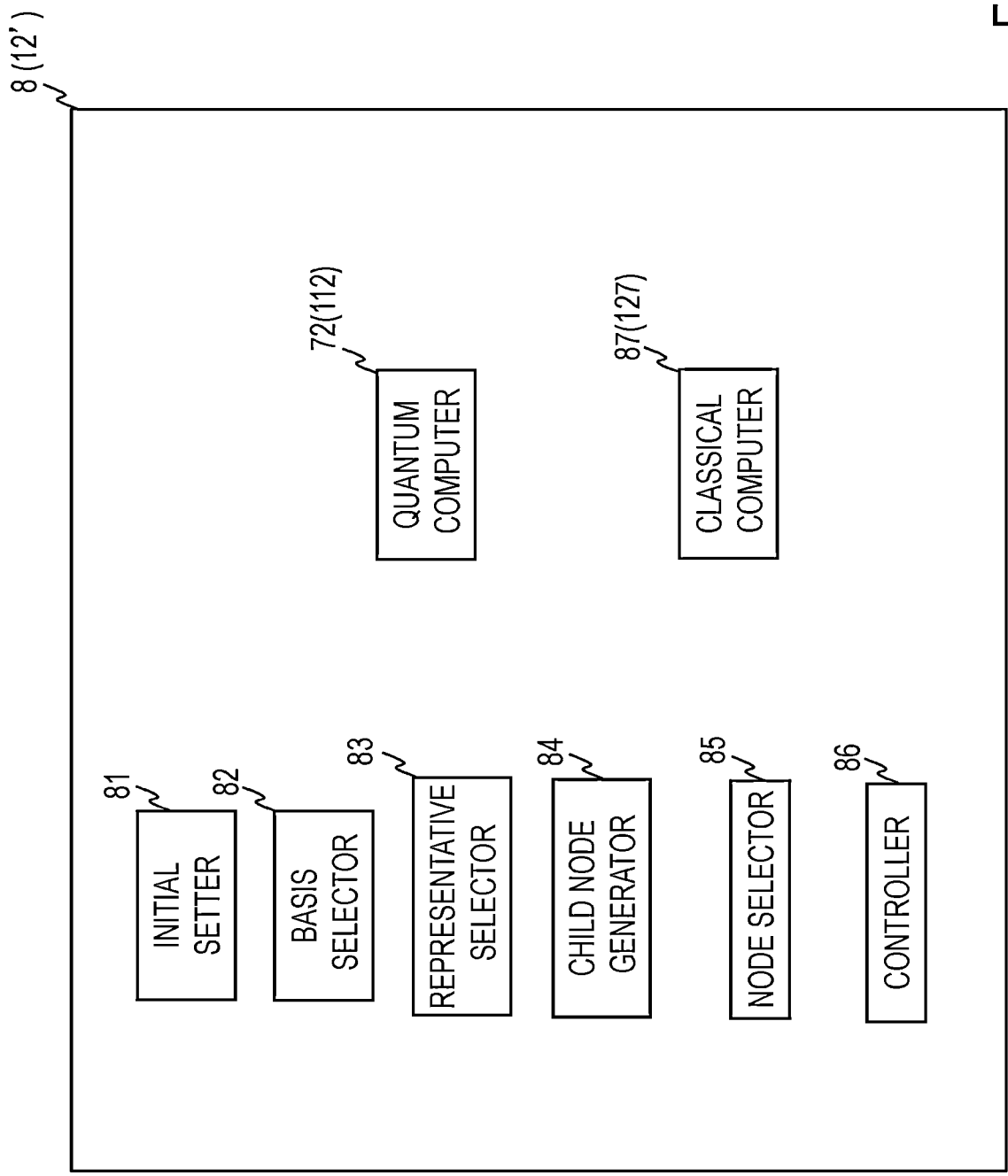
FIG. 23 is a block diagram exemplifying a functional configuration of a computation apparatus of the embodiment.

As exemplified in FIG. 23, a computation apparatus 8 in this embodiment includes an initial setter 81, a basis selector 82, a representative selector 83, a child node generator 84, a classical computer 87, a node selector 85, a controller 86, and a quantum computer 72. The initial setter 81, the basis selector 82, the representative selector 83, the child node generator 84, the classical computer 71, the node selector 85, and the controller 86 include multiple arithmetic units, and the quantum computer 72 includes multiple quantum arithmetic units (not shown). The computation apparatus 8 includes processing circuitry configured to implement the initial setter 81, the basis selector 82, the representative selector 83, the child node generator 84, the classical computer 87, the node selector 85, the controller 86, and the quantum computer 72.

<Processes>

The processes of this embodiment are described.

<<Processes of Initial Setter 81>>

The initial setter 81 receives, as an input, the pair (B, t) corresponding to the closest vector problem (B, t), and sets and outputs a node $(B_0, t(0))=(B, t)$ including the basis $B_0$ and the target vector t(0). The initial setter 81 adds a label representing $(B_0, t(0))$ to the generated node $(B_0, t(0))$. It is further set such that D=1 (step S81).

<<Processes of Basis Selector 82>>

The basis selector 82 receives the basis $B_{D-1}$ as an input, and selects and outputs the basis $B_D$ of the sub-lattice $L(B_D) \subset L(B_{D-1})$ of the lattice $L(B_{D-1})$ (step S82).

<<Processes of Representative Selector 83>>

The representative selector 83 receives the lattices $L(B_D)$ and $L(B_{D-1})$ as inputs, and selects and outputs representatives $c_{D,0}, c_{D,1}, \ldots, c_{D,v(D)-1}$ in the coset in the $L(B_{D-1})/L(B_D)$ satisfying the conditions 1 and 2 described above (step S83). Each of the representatives $c_{D,0}, c_{D,1}, \ldots, c_{D,v(D)-1}$ is an n-dimensional vector having integer elements.

<<Child Node Generator 84>>

Figure 24:
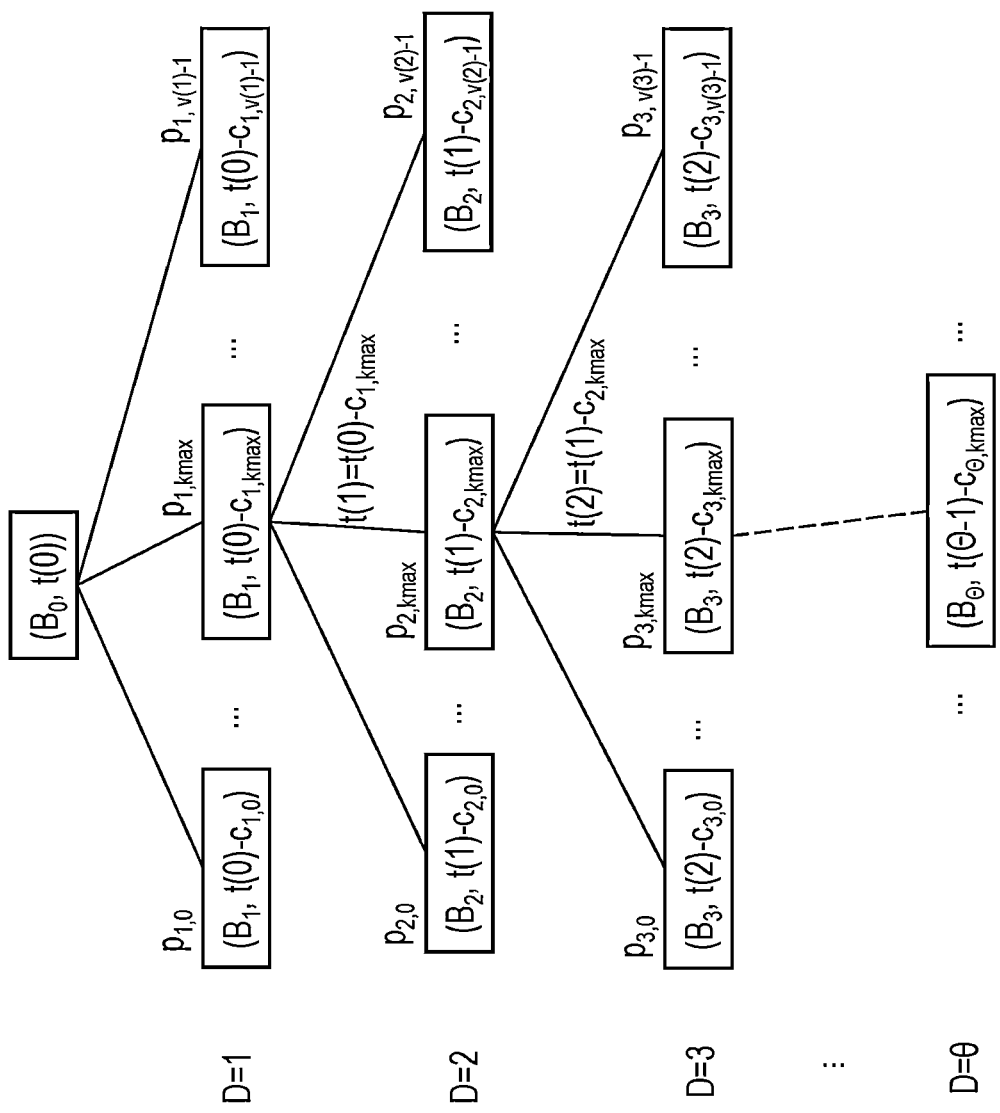
FIG. 24 is a conceptual diagram for illustrating child node generation of the embodiment.
Figure 25:
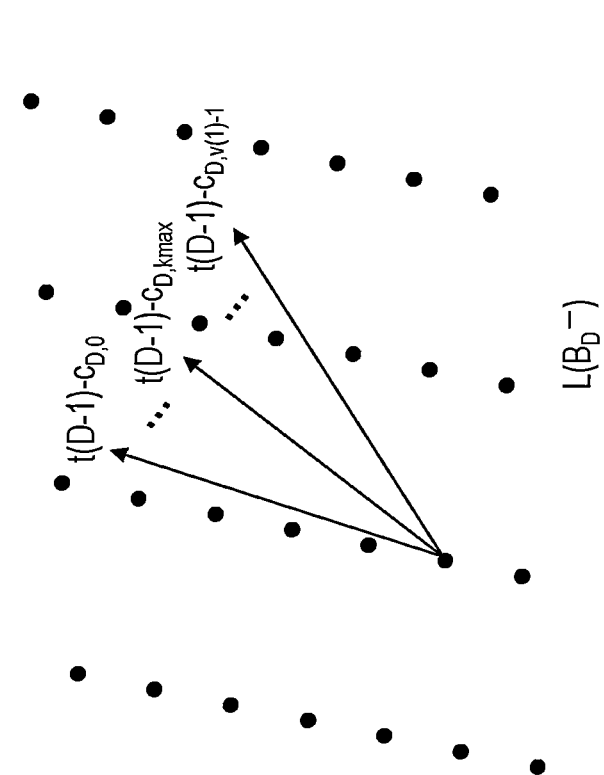
FIG. 25 is a conceptual diagram for illustrating child node generation of the embodiment.

As exemplified in FIGS. 24 and 25, the child node generator 84 receives $B_D$, t(D-1), $c_{D,0}, c_{D,1}, \ldots, c_{D, v(D)-1}$ as inputs, and generates nodes $(B_D, t(d-1)-c_{D,k'})$ for k'=0, 1, ..., v(D)-1 as child nodes of the node $(B_{D-1}, t(D-1))$. The child node generator 84 adds a label representing $(B_D, t(D-1)-c_{D,k'})$ to the generated node $(B_D, t(D-1)-c_{D,k'})$ (step S84).

<<Processes of Classical Computer 87>>

The classical computer 87 uses the basis $B_D$ and the integer N to obtain and output a dual basis $B_D^-$ of $B_D$ of modulo N (step S87).

The quantum computer 72 performs the same processes as those of the quantum computer 72 in the seventh embodiment, and obtains and outputs an observed value that is a result of the swap test. Note that, while the basis B is used in the seventh embodiment, the quantum computer 72 in this embodiment uses the basis $B_D$ instead of the basis B.

Instead of the quantum states $|\phi\rangle_0$ and $|\phi\rangle_{t1}$ generated for the basis B in the seventh embodiment, the quantum states obtained by executing the processes of the quantum computer 72 in the seventh embodiment for the basis $B_D$ in this embodiment are represented as $|\phi\rangle_{D,0}$ and $|\phi\rangle_{t(D,k')}$. Accordingly, each quantum state can be represented as follows.

$$|\varphi\rangle_{D,0} = \frac{1}{\sqrt{|(R \cap L(\overline{B}_D))|}} \sum_{x \in R \cap L(\overline{B}_D)} |x\rangle$$

$$|\varphi\rangle_{t(D,k')} = \frac{1}{\sqrt{|(R \cap L(\overline{B}_D))|}} \sum_{x \in R \cap L(\overline{B}_D)} e^{2\pi i m \langle t(D-1) - c_{D,k'}, x \rangle / N} |x\rangle$$

The quantum computer 72 executes the swap test for each pair of the register that stores the quantum state $|\phi\rangle_{D,0}$ and the register that stores the quantum state for $|\phi\rangle_{t(D,k')}$ for k'=0, 1, . . . , ν(D)−1 according to the processes analogous to those of the swap tester 72c in the seventh embodiment, to obtain and output a result of whether the result of the swap test for the pair of the quantum state $|\phi\rangle_{D,0}$ and the quantum state $|\phi\rangle_{t(D,k')}$ is receipt or denied (step S872).

<<Processes of Node Selector 85>>

The node selector obtains the probabilities $p_{D,0}, \ldots, p_{D,\nu(D)-1}$ that the result of the swap test for the pair of the quantum state $|\phi\rangle_{D,0}$ and the quantum state $|\phi\rangle_{t(D,k')}$ receipt, from the result of the swap test that is an output of the quantum computer 72, and selects the node ($B_D$, t(D−1)−$c_{D,kmax}$) corresponding to the highest probability $p_{D,kmax}$ among the probabilities $p_{D,0}, \ldots, p_{D,\nu(D)-1}$, and outputs the node. Note that kmax∈{0, 1, . . . , ν(D)−1} (step S85).

<<Processes of Controller 86>>

The controller 86 solves the closest vector problem ($B_D$, t(D−1)−$c_{D,kmax}$) by a well-known classical algorithm, such as the nearest plane algorithm, to obtain the shortest difference vector $t^{(BD,d)}$ between the t(D−1)−$c_{D,kmax}$ and the lattice L($B_D$). When the length of the difference vector $t^{(BD,d)}$ is smaller than a reference value, the controller 86 decides that the obtained difference vector $t^{(BD,d)}$ is correct. If not, the controller 86 decides that the difference vector $t^{(BD,d)}$ is not correct. For example, when the length of the difference vector $t^{(BD,d)}$ is smaller than $2^{n/2}$ times the shortest vector of an LLL-reduced basis of $B_D$, the controller 86 decides that the obtained difference vector $t^{(BD,d)}$ is correct. If not, the controller 86 decides that the difference vector $t^{(BD,d)}$ is not correct. When the controller 86 decides that the obtained difference vector $t^{(BD,d)}$ is correct (when the length of the difference vector $t^{(BD,d)}$ is smaller than the reference value), the controller 86 outputs the difference vector $t^{(BD,d)}$ as the difference vector $t^{(d)}$, and outputs the closest vector $t^{(BD,c)}$=t−$t^{(BD,d)}$∈L($B_D$) as the closest vector $t^{(c)}$ (i.e., the solution of the closest vector problem (B, t)) (FIG. 24: D=θ). On the contrary, when the controller 86 decides that the obtained difference vector $t^{(BD,d)}$ is not correct (when the length of the difference vector $t^{(BD,d)}$ is equal to or more than the reference value), the controller 86 regards D+1 as the new D, and further regards that t(D)=t(D−1)−$c_{D,kmax}$ and performs control of re-executing the processes (steps S82, S83, S84, S87, S872, S85 and S86) with the basis selector 82, the representative selector 83, the child node generator 84, the classical computer 87, the quantum computer 72, the node selector 85 and the controller 86 (step S86). That is, D+1 is regarded as the new D, and it is regarded that t(D)=t(D−1)−$c_{D,kmax}$, and the processes of steps S82, S83, S84, S87, S872, S85 and S86 are repeated. That is, search tree searching is continued.

[Standard Method of Steps S82 and S83]

While steps S82 and S83 described above may be executed according to any method, the following can be exemplified as a standard method of steps S82 and S83. However, this example does not limit the present invention. $B_{D-1}=\{b_{D-1,1}, \ldots, b_{D-1,n}\}$, where for i=1, . . . , n, $b_{D-1,i}$ is a linearly independent n-dimensional vector, and each n-dimensional vector $b_{D-1,i}$ has n integer elements. The representative selector 83 selects any positive integer ρ' (where 1≤ρ'≤n) and a prime number p', and sets $B_D$={$b_{D-1,1}, \ldots, b_{D-1,\rho'-1}, p'b_{D-1,\rho'}, b_{D-1,\rho'+1}, \ldots, b_{D-1,n}$}, $c_{D,k}$=κ'$b_{D-1,\rho'}$ (where κ'=0, 1, . . . , p'−1), and ν(D)=p'.

NINTH EMBODIMENT

This embodiment uses the processes in the eighth embodiment as a subroutine, and solves SVP (FIG. 17).

<Configuration>

Figure 26:
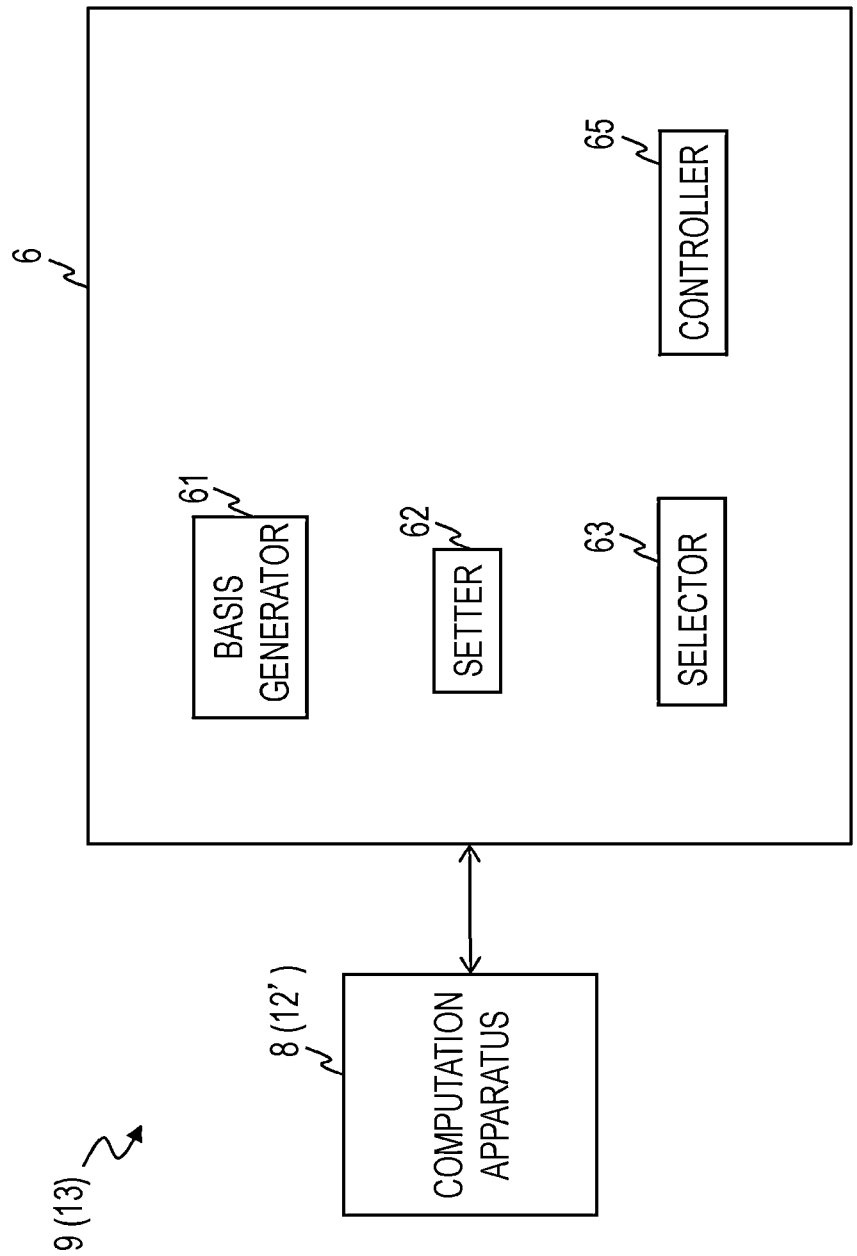
FIG. 26 is a block diagram exemplifying a functional configuration of a computation apparatus of the embodiment.

As shown in FIG. 26, the computation apparatus 6 of this embodiment includes a basis generator 61, setter 62, a selector 63, and a controller 65.

<Processes>

The computation apparatus 6 of this embodiment receives the basis B as an input, and outputs the shortest vector $t^{(c)}$ to the lattice point closest to the origin in the lattice L(B).

First, the basis generator 61 sets $B_i=\{b_1, \ldots, b_{i-1}, 2b_i, b_{i+1}, \ldots, b_n\}$ for all i=1, . . . , n (step S61).

Next, the setter 62 sets B=$B_i$ and t=$b_i$ for i=1, . . . , n, and requests the computation apparatus 8 described in the eighth embodiment to perform processes. The computation apparatus 8 performs the processes described in the eighth embodiment, with B $B_i$ and t=$b_i$, and obtains and outputs the difference vector $t^{(d)}$. The setter 62 sets, as $t_i^{(d)}$, the difference vector $t^{(d)}$ obtained for B=$B_i$ and t=$b_i$. Accordingly, the setter 62 obtains $t_1^{(d)}, \ldots, t_n^{(d)}$ (step S62).

The selector 63 receives, as an input, $t_1^{(d)}, \ldots, t_n^{(d)}$ obtained by the setter 62, and outputs, as the shortest vector $t^{(c)}$, the shortest one (having the shortest length) among $t_1^{(d)}, \ldots, t_n^{(d)}$ (step S63).

TENTH EMBODIMENT

The computation apparatus in this embodiment uses the method in the seventh embodiment, and obtains and outputs $(X_1, \ldots, X_m)^T$ satisfying $$\begin{pmatrix} a_{11} & \cdots & a_{1m} \\ a_{21} & \cdots & a_{2m} \\ a_{31} & \cdots & a_{3m} \\ \vdots & \ddots & \vdots \\ a_{n1} & \cdots & a_{nm} \end{pmatrix} \begin{pmatrix} X_1 \\ \vdots \\ X_m \end{pmatrix} + \begin{pmatrix} d_1 \\ d_2 \\ d_3 \\ \vdots \\ d_n \end{pmatrix} \bmod N = \begin{pmatrix} g_1 \\ g_2 \\ g_3 \\ \vdots \\ g_n \end{pmatrix} \quad (33)$$

for inputs of the n-dimensional vectors $a_j$, g and N (FIG. 18). n, m and N are positive integers. For example, n and m satisfy m<n. N is a prime number (note that the algorithm of the present invention is applicable even though N is not a prime number; i.e., N may be a composite number). $a_j$ is an n-dimensional vector $a_j=(a_{1j}, \ldots, a_{nj})^T$ having n integer elements $a_{1j}, \ldots, a_{nj}$. j=1, . . . , m. For example, $a_{tj}, \ldots a_{nj}$ are non-negative integers each less than N. $(X_1, \ldots, X_m)^T$ is an m-dimensional vector having integer elements $X_1, \ldots, X_m$. For example, $X_1, \ldots, X_m$ are non-negative integers each less than N. g is an n-dimensional vector $g=(g_1, \ldots, g_n)^T$ having n elements $g_1, \ldots, g_n$. For example, $g_1, \ldots, g_n$ are non-negative integers each less than N. d is an n-dimensional vector $d=(d_1, \ldots d_n)^T$ having n elements $d_1, \ldots, d_n$. For example, $d_1, \ldots, d_n$ are non-negative integers each less than N.

Given $$A = \begin{pmatrix} a_{11} & \cdots & a_{1m} \\ a_{21} & \cdots & a_{2m} \\ a_{31} & \cdots & a_{3m} \\ \vdots & \ddots & \vdots \\ a_{n1} & \cdots & a_{nm} \end{pmatrix}$$

$$X = \begin{pmatrix} X_1 \\ \vdots \\ X_m \end{pmatrix}$$

$$d = \begin{pmatrix} d_1 \\ d_2 \\ d_3 \\ \vdots \\ d_n \end{pmatrix}$$

$$g = \begin{pmatrix} g_1 \\ g_2 \\ g_3 \\ \vdots \\ g_n \end{pmatrix}$$

Formula (33) can be represented as follows.

$$g = AX + d \bmod N \qquad (34)$$

Here, $a_j=(a_{1j}, \ldots, a_{nj})^T$. Consequently, A can be represented, as follows.

$$A=(a_1, a_2, \ldots a_m)$$

This embodiment computes $(X_1, \ldots, X_m)^T$ through search tree searching analogous to that in the eighth embodiment. Here, each variable of $X=(X_1, \ldots, X_m)^T$ corresponds to the depth D of the search tree in a one to one manner. Consequently, the depth of the search tree coincides with the number m of variables of X, That is, each of $X_1, \ldots, X_m$ can be obtained by search tree searching at a certain depth D=1, . . . , m in (the process corresponding to any one of D=1, . . . , m). The variable $X_j$ decided at the depth D(=1, 2, . . . , m) of the search tree ($X_j$ obtained by the process corresponding to the depth D) is represented as $X_{j(D)} \in \{X_1, \ldots, X_m\}$. The value of $X_{j(D)}$ obtained by search at the depth D (obtained by the process corresponding to the depth D) is $\alpha_{j(D)}$, and the n-dimensional vector $a_j$ corresponding to $X_{j(D)}$ is $a_{j(D)} \in \{a_1, \ldots, a_m\}$. This is because $g=X_1 a_1 + \ldots + X_{m(D)} a_{j(D)} + \ldots + X_m a_m + d \bmod N$ according to Formula (34). For example, $X_{j(D)}$ and $a_{j(D)}$ corresponding to each D=1, . . . m is predefined. For example, $X_{j(D)}=X_D$, and $a_{j(D)}=a_D$. The value of each variable $X_{j(D)}$ is any of 0, 1, . . . , N-1. Accordingly, the number of branches of the search tree is N irrespective of the depth. In this embodiment, the representatives of coset $L(B_{D-1})/L(B_D)$ are $c_{D,0}, c_{D,1}, \ldots, c_{D,N-1}$, which correspond to 0, $X_{j(D)}$, $2X_{j(D)}, \ldots, (N-1)X_{j(D)}$, respectively. Consequently, $c_{D,j'}=j' \cdot_{j(D)}$ (where j'=0, 1, 2, . . . , N-1). $B_D$ and $c_{D,j'}$ can be computed by "the standard method in steps S82 and S83" exemplified in the eighth embodiment, for example. When N is a prime number, selection of the prime number p' by the standard method in steps S82 and S83 requires p'=N.

A formula obtained by replacing the order of elements of A and X in Formula (34) is as follows.

$$g = (a_{j(1)} a_{j(2)} \cdots a_{j(m)}) \begin{pmatrix} X_{j(1)} \\ X_{j(2)} \\ \vdots \\ X_{j(m)} \end{pmatrix} + d \bmod N \qquad (35)$$

Completion of search to the depth D−1 decides the values of variables $X_{j(1)}, X_{j(2)}, \ldots, X_{j(D-)}$. Provided that the value $X_{j(D)}$ obtained by search at the depth D (the value of $X_{j(D)}$ obtained by the process corresponding to the depth D) is $\alpha_{j(D)}$, the following relationship is obtained from Formula (35).

$$g - \sum_{j'=1}^{D-1} \alpha_{j(j')} a_{j(j')} = (a_{j(D)} a_{j(D+1)} \cdots a_{j(m)}) \begin{pmatrix} X_{j(D)} \\ X_{j(D+1)} \\ \vdots \\ X_{j(m)} \end{pmatrix} + d \bmod N$$

The variable $X_{j(D)}$ for search at the depths D may be any of variables having not been searched yet. Here, for D=2, . . . , m, let $A_{D-1}=(a_{j(D)}, a_{j(D+1)}, \ldots, a_{j(m)})$, $X'_{D-1}=(X_{j(D)}, X_{j(D+1)}, \ldots, X_{j(m)})^T$, and $g_{D-1}'=g-\sum_{j'=1}^{D-1} \alpha_{j(j')} a_{j(j')}$.

For D=1, $A_0=A$, $X'_0=X$, and $g_0'=g$. For the depth D=1, 2, . . . , m of the search tree, under the condition $$g_{D-1}' = A_{D-1} X'_{D-1} + d \bmod N, \qquad (36)$$

$X_{j(D)}$ is obtained from $(A_{D-1}, g_{D-1}', N)$, thereby allowing, the value of $(X_1, \ldots, X_m)^T$ to be finally obtained.

<Configuration>

Figure 27:
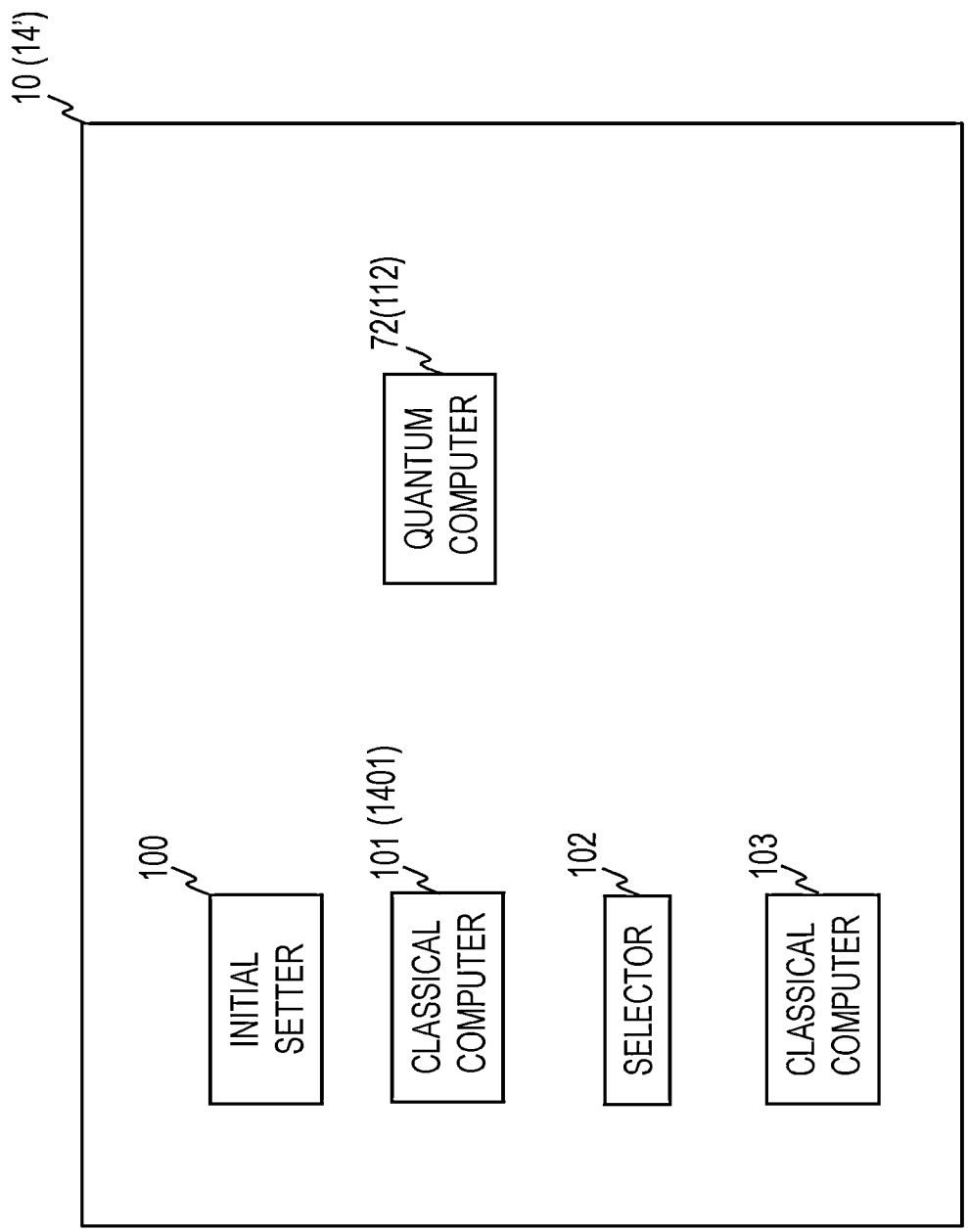
FIG. 27 is a block diagram exemplifying a functional configuration of a computation apparatus of the embodiment.

As shown in FIG. 27, a computation apparatus 10 of this embodiment includes an initial setter 100, classical computers 101 and 103 (first and second classical computers), a selector 102, and a quantum computer 72. The classical computers 101 and 103 include multiple arithmetic units, and the quantum computer 72 includes multiple quantum arithmetic units (not shown). The computation apparatus 10 includes processing circuitry configured to implement the initial setter 100, the classical computer 101, the quantum computer 72, the selector 102, and the classical computer 103.

<Processes>

The processes of this embodiment are described.

<<Initial setter 100>>

The initial setter 100 initially sets D=1, $A_0=A$, $X'_0=X$, and $g_0'=g$ (step S100). Subsequently, each of the following processes as searching at the depth D (the process corresponding to the depth D) is executed.

<<Processes of Classical Computer 101>>

For each j'=0, 1, 2 . . . , N−1, Formula (36) can be represented as follows.

$$g_{D-1}'-j'\bullet a_{j(D)} = A_D X'_D + d \bmod N \tag{37}$$

Transposition of Formula (37) obtains the following Formula (38).

$$g_{D-1}'^T - j'\bullet a_{j(D)}^T = X'_D{}^T A_D{}^T + d^T \bmod N \tag{38}$$

The column vectors $A_D$ are $a_{j(D+1)}$, $a_{j(D+2)}$, . . . , $a_{j(m)}$. Consequently, $a_{j(D+1)}^T$, $a_{j(D+2)}^T$, . . . , $a_{j(m)}^T$ are the row vectors of $A_D$.

The arithmetic unit of the classical computer 101 receives $A_D$, N, $\varepsilon_1$, . . . , $\varepsilon_n$ as inputs, and computes and outputs an LLL-reduced basis $B_D$ of the lattice defined by the set of the row vector $\{a_{j(D+1)}^T a_{j(D+2)}^T \ldots a_{j(m)}^T N\varepsilon_1^T \ldots N\varepsilon_n^T\}$ obtained by adding $N\varepsilon_i^T$ (where i=1, . . . , n) to $A_D{}^T$. For each j'=0, 1, 2, . . . , N−1 and $d^T$, the existence of the solution $X'_D{}^T$ of Formula (38) is equivalent to the existence of the solution of $u(D) \in Z^n$ satisfying $$g_{D-1}'^T - j'\bullet a_{j(D)}^T = u(D)B_D + d^T \tag{39}$$

where u(D) is an n-dimensional vector having integer elements (step S1011).

The arithmetic unit of the classical computer 101 obtains and outputs a dual basis $B_D^-$ of modulo N of the LLL-reduced basis $B_D$ obtained in step S1011 (step S1012).

The quantum computer 72 obtains the decision result of the swap test corresponding to each j'=0, 1, 2, . . . , N−1, for each node ($B_D$, $g_{D-1}'^T - j'\bullet a_{j(D)}^T$) corresponding to the depth D, as follows.

The quantum computer 72 performs the same process as that of the quantum computer 72 in the eighth embodiment, generates quantum states $|\phi\rangle_{D,0}$ and $|\phi\rangle_{t(D,j')}$, performs the swap test for these quantum states, and obtains and outputs the decision results of the swap test (step S1072). Note that instead of k' in the eighth embodiment, j'=0, 1, 2, . . . , N−1 are used in this embodiment. Each quantum state can be represented as follows.

$$|\varphi\rangle_{D,0} = \frac{1}{\sqrt{|R \cap L(\bar{B}_D)|}} \sum_{x \in R \cap L(\bar{B}_D)} |x\rangle$$

$$|\varphi\rangle_{t(D,j')} = \frac{1}{\sqrt{|R \cap L(\bar{B}_D)|}} \sum_{x \in R \cap L(\bar{B}_D)} e^{2\pi i m (g'^T_{D-1} - j' \cdot a^T_{j(D)}, x)/N} |x\rangle$$

An example of the quantum rotation gate used to generate the quantum state $|\phi\rangle_{t(D,j')}$ is represented as follows.

$$\begin{pmatrix} 1 & 0 & \cdots & 0 \\ 0 & e^{2\pi j m (g'^T_{D-1} - j \cdot a^T_{j(D)})/N} & \cdots & 0 \\ \vdots & \vdots & \ddots & \vdots \\ 0 & 0 & \cdots & e^{2\pi j m (g'^T_{D-1} - (N-1) a^T_{j(D)})/N} \end{pmatrix}$$

The quantum computer 72 executes the swap test for each pair of the register that stores the quantum state $|\phi\rangle_{D,0}$ obtained in step S1072a and the register that stores the quantum state $|\phi\rangle_{t(D,j')}$ obtained in step S1072b for j'=0, 1, 2, . . . , N−1 to obtain and output a result of whether the result of the swap test for the pair of the quantum state $|\phi\rangle_{D,0}$ and the quantum state $|\phi\rangle_{t(D,j')}$ is receipt or denied.

<<Processes of Selector 102>>

The selector 102 obtains the probabilities $p_{D,0}$, $p_{D,1}$, . . . , $p_{D,N-1}$ that the result of the swap test for the pair of the quantum state $|\phi\rangle_{D,0}$ and the quantum state $|\phi\rangle_{t(D,j')}$ is receipt, on the basis of the decision result of the swap test output from the quantum computer 72, and outputs j max $\in \{0, 1, 2, \ldots, N-1\}$ corresponding to the highest probability $p_{D,j\,max}$ thereamong as $\alpha_{j(D)}$. That is, $p_{D,jmax} \geq p_{D,0}, p_{D,1}, p_{D,jmax-1}, p_{D,jmax+1}, \ldots, p_{D,N-1}$, and $\alpha_{j(D)=jmax}$. Furthermore, the selector 102 computes and outputs $g_D' = g_{D-1}' - \alpha_{j(D)} \bullet a_{j(D)}$ (step S102). The value $\alpha_{j(D)}$ obtained here is the value of $X_{j(D)}$ at the depth D.

<<Processes of Classical Computer 103>>

When the selector 102g outputs $\alpha_{j(D)}$ for all D=1, . . . , m, the classical computer 103 outputs the solution $(\alpha_1, \ldots, \alpha_m)^T$ of $(X_1, \ldots, X_m)^T$ obtained by arranging $\alpha_{j(1)}, \ldots, \alpha_{j(m)}$. On the contrary, when the selector 102g does not output $\alpha_{j(D)}$ for any D=1, . . . , m, the classical computer 103 sets D+1 as a new D, and performs control of re-executing the processes (step S1011, S1012, S1072, S102 and S103) of the classical computer 101, the quantum computer 72, the selector 102 and the classical computer 103 (step S103).

SPECIFIC EXAMPLE

Next, a specific example of this embodiment is described. Here, as an example of LWE, the following case is exemplified, m=3, n=9 (=$m^2$), N=11 (the minimum prime number larger than n), $$A = \begin{pmatrix} 0 & 2 & 1 \\ 1 & 6 & 5 \\ 3 & 0 & 7 \\ 1 & 3 & 4 \\ 9 & 2 & 5 \\ 0 & 10 & 3 \\ 7 & 9 & 7 \\ 4 & 5 & 6 \\ 0 & 6 & 10 \end{pmatrix}, X = \begin{pmatrix} 10 \\ 2 \\ 6 \end{pmatrix}, d = \begin{pmatrix} 2 \\ 0 \\ 0 \\ 0 \\ 1 \\ 0 \\ -1 \\ 1 \\ 0 \end{pmatrix}, g = \begin{pmatrix} 1 \\ 8 \\ 6 \\ 7 \\ 4 \\ 5 \\ 8 \\ 10 \\ 6 \end{pmatrix}$$

Here, A and X are a matrix and a vector that have random elements. d is a vector that includes random elements conforming to a normal distribution having an average of 0 and a variance of 1. g is a vector obtained by computing AX+d mod N. In LWE, X and d are unknown. Given (A, g, N), X is obtained. Hereinafter, the first variable $X_1$ of X is denoted as $X_{j(1)}$, and procedures of computing its value $\alpha_{j(1)}=10$ in searching at the depth D=1 are exemplified. Likewise, variables $X_2$ and $X_3$ can also be obtained by searching at the depth D=2, 3. Consequently, the procedures of computing the variables $X_2$ and $X_3$ are omitted.

<<Initial Setter 100>>

The initial setter 100 initially sets D−1, $A_0$=A, $X'_0$=X, and $g_0'$=g (step S100).

<<Processes of Classical Computer 101>>

An n×(m−1) matrix obtained by removing, from A, the column of the variable number intended to be obtained is represented as Rest(A). In the case of this example, the value of the first variable $X_1$ of X is intended to be obtained. Accordingly, Rest(A) is the 9×2 matrix obtained by removing the first column from A. The arithmetic unit of the classical computer 101 computes and outputs an LLL-reduced basis $B_1$ of the lattice defined by the basis represented by (n+m−1)×n matrix $$\begin{pmatrix} NI \\ Rest(A)^T \end{pmatrix}$$

In a case where m=3 and n=9, a basis matrix $\beta_1$ that has 9 rows and 9 columns and includes, as elements, the n-dimensional vectors $b_1, \ldots, b_n$ constituting $B_1$ in this example is as follows (step S1011).

$$\begin{pmatrix} 1 & -2 & -1 & -2 & 2 & -1 & 1 & 2 & 2 \\ 0 & 1 & -2 & 4 & 2 & -1 & 4 & -1 & -2 \\ -4 & 0 & -2 & -2 & -2 & 1 & -3 & 0 & -3 \\ -2 & 1 & -3 & 3 & 1 & 5 & -3 & -1 & 2 \\ 1 & 4 & -2 & 0 & 3 & 4 & 3 & -4 & 1 \\ -4 & -2 & 2 & 1 & 5 & 3 & 0 & 2 & 1 \\ 3 & 3 & 1 & -3 & 2 & -1 & -5 & -3 & -1 \\ 3 & -2 & 0 & -1 & 3 & 4 & -3 & 2 & -2 \\ 0 & 5 & 1 & -2 & -1 & -5 & -2 & 6 & 1 \end{pmatrix}$$

The arithmetic unit of the classical computer 101 obtains and outputs a dual basis $B_1^-$ of modulo N of $B_1$ (step S1012). In a case where n=9, the basis matrix $\beta_1^-$ that has 9 rows and 9 columns and includes, as elements, the n-dimensional vectors $b_1^-, \ldots, b_9^-$ constituting $B_1^-$ in this example is as follows.

$$\begin{pmatrix} 0 & 1 & 0 & 0 & 0 & 0 & 0 & 1 & 0 \\ -1 & 0 & 1 & 0 & 1 & 0 & 0 & 0 & 0 \\ 0 & -1 & 0 & 1 & -1 & 0 & 0 & 1 & 0 \\ 0 & 1 & -1 & 0 & 0 & 1 & 0 & 0 & 1 \\ 0 & 0 & 0 & 0 & 1 & -1 & -1 & -1 & 0 \\ -1 & 1 & 0 & 0 & 0 & -1 & 0 & 0 & 1 \\ 0 & -1 & -1 & 1 & 0 & 0 & 1 & 0 & -1 \\ 1 & 0 & 1 & 1 & 0 & 0 & 0 & 0 & 1 \\ 1 & 0 & 1 & 1 & 0 & 0 & 0 & 0 & 1 \\ 0 & -1 & -1 & -1 & 0 & -1 & 1 & 2 & 0 \end{pmatrix}$$

<<Processes of Quantum Computer 72>>

In this example, the quantum computer 72 selects $R(2B^-)$ described above, as the region R. Provided that the region R is $R(2B^-)$ described above, the following holds.

$$R \cap L(\bar{B}) = \left\{ \sum_{k'=1}^{9} \delta_{k'} \bar{b}_{k'} \,\middle|\, \delta_{k'} = 0 \text{ or } 1 \right\}$$

The quantum computer 72 generates and outputs multiple first registers where the quantum state $|\phi\rangle_{1,0}$ is in the quantum superposed state on $n \times \log_2 N$ quantum bits. The first register corresponds to the quantum superposed state of the encoded values of the values of the vertices of a unit parallelotope whose vertices are the lattice points of the lattice $L(B^-)$. For example, in a case of n=9, the quantum state generator 72a generates multiple first registers in the following quantum state $|\phi\rangle_{1,0}$.

$$|\phi\rangle_{1,0} = \frac{1}{\sqrt{2^9}} \left( |0\rangle + \sum_{i=1}^{9} |\bar{b}_i\rangle + \sum_{i,i'-1}^{9} |\bar{b}_i + \bar{b}_{i'}\rangle + \ldots + \left| \sum_{i=1}^{9} \bar{b}_i \right\rangle \right)$$

The quantum computer 72 classifies the multiple registers in the quantum state $|\phi\rangle_{1,0}$ into two groups, and applies the quantum rotation gate to one group of the registers. Accordingly, the registers in the following quantum state are obtained.

$$|\phi\rangle_{t(1,j')} = \left( \frac{1}{\sqrt{2^9}} |0\rangle \left| \sum_{i=1}^{9} e^{2\pi i m (g_0^T - j' \cdot a_{j(1)}^T \cdot \bar{b}_j)/N} |\bar{b}_i\rangle + \right.\right.$$

$$\sum_{i,i'=1}^{9} e^{2\pi i m (g_0^T - j' \cdot a_{j(1)}^T \cdot \bar{b}_{1,i} + \bar{b}_{1,i'})/N} |\bar{b}_i + \bar{b}_{i'}\rangle +$$

$$\left.\left. \ldots + e^{2\pi i m (g_0^T - j' \cdot a_{j(1)}^T \cdot \Sigma_{i=1}^{9} \bar{b}_j)/N} \left| \sum_{i=1}^{9} \bar{b}_i \right\rangle \right) \right.$$

Here, the target vectors $g_0'^T - j' \cdot a_{j(1)}^T$ in this example are of the following 11 types.

$$g_0'^T - j' \cdot a_{j(1)}^T = (1, 8-j', 6-3j', 7-j', 4-9j', 5, 8-7', 10-4j', 6) \mod 11$$

The swap test is executed for each pair of the register that stores the quantum state $|\phi\rangle_{1,0}$ and the register that stores the quantum state $|\phi\rangle_{t(1,j')}$, for j'=0, 1, 2, ..., 10, and obtains and outputs the result of the swap test for the pair of the quantum state $|\phi\rangle_{1,0}$ and the quantum state $|\phi\rangle_{t(1,j')}$.

<<Processes of Selector 102>>

The selector 102 computes the probability $p_{1,j}$ that the swap test results in receipt, from the result of the swap test obtained in the quantum computer 72. For example, the quantum computer 72 executes multiple times of (e.g., 100) swap tests for each j'=0, 1, 2, ..., 10, to compute the ratio of receipt as the probability $p_{1,j'}$ in each j'. The probability $p_{1,j'}$ is theoretically computed as follows.

$p_{1,0}$=0.500002
$p_{1,1}$=0.500001
$p_{1,2}$=0.500000
$p_{1,3}$=0.500000
$p_{1,4}$=0.500002
$p_{1,5}$=0.500132
$p_{1,6}$=0.500093
$p_{1,7}$=0.500000
$p_{1,8}$=0.504587
$p_{1,9}$=0.500001
$p_{1,10}$=0.665613

Next, the selector 102 outputs, as $\alpha_{j(1)}$, 10 corresponding to the highest probability $p_{1,10}$ among the probabilities $p_{1,0}, p_{1,1}, \ldots, p_{1,N-1}$. As in Formula (41), $X_1$=10. The correct answer $\alpha_{j(1)}$=10 can be computed.

ELEVENTH EMBODIMENT

Also in an eleventh embodiment, the distance comparison problem is computed by quantum computation and classical computation (FIGS. 17 and 18). The seventh embodiment uses the dual lattice $L(B^-)$ having the same dimension as the lattice $L(B)$ that is the target of the distance comparison problem. This embodiment increases the precision using the lattice obtained by embedding the lattice L(B) that is the target of the distance comparison problem into a space having a larger dimension n'.

<Configuration>

As shown in FIG. 19, a decision apparatus 11 of this embodiment includes classical computers 111 and 73 (first and second classical computers), a quantum computer 112, and a controller 74. As exemplified in FIG. 20, the quantum computer 112 of this embodiment includes quantum state generators 112a and 112b (first to fourth quantum state generators), and a swap tester 72c (first and second swap testers). The decision apparatus 11 executes each process under control of the controller 74. The classical computers 111 and 73 include multiple arithmetic units. The quantum state generators 112a and 112b and the swap tester 72c include multiple quantum computers (not shown). The decision apparatus 11 includes processing circuitry configured to implement the classical computers 111 and 72 and the quantum computer 112 (the first classical computer, the first quantum state generator, the second quantum state generator, the first swap tester, the third quantum state generator, the fourth quantum state generator, the second swap tester, and the second classical computer).

<Processes>

The processes of this embodiment are described. The decision apparatus 11 of this embodiment receives, as inputs, the basis B, the target vector $t1=(t_{1,1}, \ldots, t_{1,n})^T$ having n integer elements $t_{1,i}$ and the target vector $t2=(t_{2,1}, \ldots, t_{2,n})^T$ having n integer elements $t_{2,i}$, performs classical computation and quantum computation described later, and decides which one is larger between $\|t1^{(d)}\|$ and $\|t2^{(d)}\|$.

<<Processes of Classical Computer 111>>

The arithmetic unit of the classical computer 111 of the decision apparatus 11 (FIG. 19) receives the basis B as an input, selects a matrix $\alpha$ where the Hermite normal form of the transposed matrix $\beta'^T$ of a matrix $\beta'=(\alpha\beta)$ obtained by arranging the matrix $\alpha$ and the basis matrix $\beta$ in the horizontal direction is a matrix having diagonal elements of 1, and obtains and outputs the matrix $\beta'$. $\beta$ is a basis matrix that has n rows and n columns and includes the n-dimensional vectors $b_1, \ldots, b_n$ of the basis B as elements, and is a matrix where the n-dimensional vectors $b_1, \ldots, b_n$ are row vectors. $\alpha$ is a matrix having integer elements in n rows. An example of the matrix $\alpha$ is an n×n unit matrix. However, the present invention is not limited thereto. In general, provided that an n×n matrix having elements of random 0 or 1 is $\alpha$, the Hermite normal form of the transposed matrix $\beta'^T$ of the matrix $\beta'=(\alpha\beta)$ is a matrix having diagonal elements of 1 (a matrix only having diagonal elements), and satisfies the condition described above. The matrix $\alpha$ is not necessarily an n×n matrix, and may be a matrix that has n rows and columns the number of which is less than n, or a matrix that has n rows and columns the number of which is much larger than n (e.g., the number of columns is larger than $n^2$). The basis having the row vectors $b_1', \ldots, b_n'$ of the matrix $\beta'=(b_1', \ldots, b_n')^T$ is represented as B'. The row vectors $b_1', \ldots, b_n'$ are linearly independent. $b_i'$ is an n'-dimensional vector having integer elements, for $i=1, \ldots, n$. Note that n' is a positive integer larger than n (step S111-1).

The arithmetic unit of the classical computer 111 receives the matrix $\beta'$ as an input, Hermite-decomposes the matrix $\beta'^T$, and obtains a unimodular matrix $\beta^{-1}$ and the matrix H' in Hermite normal form that satisfy $B^{-1}\beta'^T=H'$. The basis having the row vectors $b_1^{-1}, \ldots, b_n^{-1}$ of the unimodular matrix $\beta^{-1}=(b_1^{-1}, \ldots, b_n^{-1})^T$ is output as $B^{-1}$. The row vectors $b_1^{-1}, \ldots, b_n^{-1}$ are linearly independent. $b_{i'}^{-1}$ is an n'-dimensional vector having integer elements, for $i'=1, \ldots, n'$. n' is the number of rows of $\beta^{-1}$. Note that the upper index "−" of $B^{-1}$ should be properly notated immediately above "B". However, due to the limitation of the descriptive notation, the index is sometimes notated at the upper right of the "B". Note that the upper index "−" of "$b_i^{-1}$" should be properly notated immediately above "b". However, due to the limitation of the descriptive notation, the index is sometimes notated at the upper right of "b" (step S111-2).

The arithmetic unit of the classical computer 111 receives, as inputs, the basis B' and the target vectors $t1=(t_{1,1}, \ldots, t_{1,n})^T$ and $t2=(t_{2,1}, \ldots, t_{2,n})^T$, and obtains and outputs the target vector $t1'=(t'_{1,1}, \ldots, t'_{1,n'})^T \in \text{span}(B')$ having n' integer elements $t'_{1,i'}$ belonging to the space span(B') spanned by the basis B', and the target vector $t2'=(t'_{2,1}, \ldots, t'_{2,n'})^T \in \text{span}(B')$ having n' integer elements $t'_{2,i'}$. Note that $\text{Proj}(t1')=(0,t1)$ and $\text{Proj}(t2')=(0,t2)$. $\text{Proj}(\mu)$ represents a projection onto an n-dimensional vector space where initial n'−n elements of $\mu$ are 0 (step S111-3).

<<Processes of Quantum Computer 112>>

The quantum computer 112 (FIG. 20) receives the basis $B^{-1}$ and the target vectors t1' and t2' as inputs, executes the following process for an appropriate region in the n'-dimensional space (a partial region belonging to the n'-dimensional space made up of integer elements) $R \subseteq Z^{n'}$, and outputs the result of the swap test (step S112). For example, $R \subset Z^{n'}$.

For example, the following region $R(\Gamma B^{-1})$ can be regarded as the region R.

$$R(\Gamma \overline{B}') = \sum_{j''=1}^{n'} R_{[0,\Gamma)} b'_{j''} = \left\{ \sum_{j''=1}^{n'} x''_{j''} b'_{j''} \,\middle|\, 0 \le x''_1, \ldots, x''_n < \Gamma \right\}$$

Note that $R_{[0,\Gamma)}$ is a real number of 0 or more and less than $\Gamma$, $x''_{j''}$ is a real number, and $\Gamma$ is an integer of 2 or more, for example $\Gamma=2$. Different integers $\Gamma$ may be used dependent on the value of j".

Alternatively, for example, the following region $R(\Gamma B^{-*})$ may be adopted as the region R.

$$R(\Gamma \overline{B}'^*) = \sum_{j''=1}^{n'} R_{[0,\Gamma)} \overline{b}'^*_{j''} = \left\{ \sum_{j''=1}^{n'} x''_{j''} \overline{b}'^*_{j''} \,\middle|\, 0 \le x''_1, \ldots, x''_n < \Gamma \right\}$$

where $B^{-*'}$ represents the basis $B^{-*'}=\{b^{-*'}_1, \ldots, b^{-*'}_n\}$ made up of Gram-Schmidt non-normalized orthogonal vectors $b^{-*'}_1, \ldots, b^{-*'}_n$ of the dual basis $B^{-'}$. Each $b^{-*'}_i$ is an n'-dimensional vector having n' integer elements. Note that the region R does not limit the present invention.

The quantum computer 112 obtains the result of the swap test according to the following procedures.

(a-1) The quantum state generator 112a of the quantum computer 112 generates multiple registers in the following quantum, state (step S1182a-1).

$$|\varphi\rangle_0 = \frac{1}{\sqrt{|R \cap L(\overline{B}')|}} \sum_{x \in R \cap L(\overline{B}')} |x\rangle$$

(b-1) The quantum state generator 112b performs quantum manipulation for some registers among the registers generated in (a-1) to obtain registers transformed into the following quantum state (step S1172b-1).

$$|\varphi\rangle_{t1'} = \frac{1}{\sqrt{|R \cap L(\overline{B}')|}} \sum_{x \in R \cap L(\overline{B}')} e^{2\pi i m \langle t1', x \rangle} |x\rangle$$

Accordingly, multiple registers in the quantum state $|\varphi\rangle_0$ and multiple registers in the quantum state $|\varphi\rangle_{t1}'$ are present.

(c-1) The swap tester 72c executes a swap test for each pair of the register that stores lite quantum state $|\varphi\rangle_0$ and the register that stores the quantum state $|\varphi\rangle_{t1}$ to obtain and output a decision result of whether the result of the swap test tor each pair is receipt (0, Yes) or denied (1, No) (step S1172c-1).

Furthermore, the quantum computer 112 also computes the result of another swap test according to the following procedures.

(a-2) The quantum state generator 112a of the quantum computer 112 creates multiple registers in the following quantum state (step S1172a-2).

$$|\varphi\rangle_0 = \frac{1}{\sqrt{|R \cap L(\overline{B}')|}} \sum_{x \in R \cap L(\overline{B}')} |x\rangle$$

(b-2) The quantum state generator 112b performs quantum manipulation for some registers among the registers generated in (a-2) to obtains registers in the following quantum state (step S1172b-2).

$$|\varphi\rangle_{t2'} = \frac{1}{\sqrt{|R \cap L(\overline{B}')|}} \sum_{x \in R \cap L(\overline{B}')} e^{2\pi i m \langle t2', x \rangle} |x\rangle$$

(c-2) The swap tester 72c executes a swap test for each pair of the register that stores the quantum state $|\varphi\rangle_0$ and the register that stores the quantum state $|\varphi\rangle_{t2}$ to obtain and output a decision result of whether the result of the swap test for each pair is receipt (0, Yes) or dented (1, No) (step S1172c-2).

<<Processes of Classical Computer 73>>

The classical computer 73 uses the result of the swap test obtained by the quantum computer 112 to compute the probability $p_1$ that the result of the swap test for the pair of the quantum state $|\varphi\rangle_0$ and the quantum state $|\varphi\rangle_{t1}'$ is receipt, and the probability $p_2$ that the result of the swap test for the pair of the quantum state $|\varphi\rangle_0$ and the quantum state $|\varphi\rangle_{t2'}$ is receipt. When $p_1 \geq p_2$, information representing that $\|t1^{(d)}\| \leq \|t2^{(d)}\|$ is output. When $p_1 < p_2$, information representing that $\|t1^{(d)}\| > \|t2^{(d)}\|$ is output. Alternatively, when $p_1 > p_2$, the classical computer 73 outputs information representing that $\|t1^{(d)}\| < \|t2^{(d)}\|$. When $p_1 \leq p_2$, the classical computer 73 outputs information representing that $\|t1^{(d)}\| \geq \|t2^{(d)}\|$ (step S73).

SPECIFIC EXAMPLE

The same problem as that of the specific example in the seventh embodiment is described. Here, the simplest example where the basis B is embedded in a space having dimensions higher by one is described.

<<Processes of Classical Computer 111>>

The arithmetic unit of the classical computer 111 receives the basis B as an input, and obtains and outputs the following matrix β'.

$$\begin{pmatrix} 1 & 8 & 4 \\ 1 & 6 & -5 \end{pmatrix}$$

The basis having the row vectors $b_1', \ldots, b_{n'}$ of the matrix $\beta' = (b_1', \ldots, b_{n'}')^T$ is represented as B' (step S111-1).

The arithmetic unit of the classical computer 111 receives the matrix β' as an input, Hermite-decomposes the matrix $\beta'^T$. All the diagonal elements of the matrix H' in Hermite normal form are 1. A unimodular matrix $\beta^{-1}$ is as follows.

$$\overline{\beta}' = \begin{pmatrix} 29 & -4 & 1 \\ 36 & -5 & 1 \\ 64 & -9 & 2 \end{pmatrix}$$

Consequently, the following holds.

$$\overline{\beta}' \cdot \begin{pmatrix} 1 & 1 \\ 8 & 6 \\ 4 & -5 \end{pmatrix} = \begin{pmatrix} 1 & 0 \\ 0 & 1 \\ 0 & 0 \end{pmatrix}$$

The arithmetic unit of the classical computer 111 outputs, as $\overline{B}'$, the basis made up of the row vectors $\overline{b}_1', \overline{b}_2'$ and $\overline{b}_3'$ of the unimodular matrix $\overline{\beta}' = (\overline{b}_1', \overline{b}_2', \overline{b}_3')^T$ (step S111-2).

The arithmetic unit of the classical computer 111 receives, as inputs, the basis $\overline{B}$ and the target vector $t1 = (t_{1,1}, t_{1,2})^T$ and $t2 = (t_{2,1}, t_{2,2})^T$, and obtains and outputs the target vector $t1' = (t'_{1,1}, \ldots, t'_{1,3})^T \in \text{span}(B')$ having three integer elements $t'_{1,1}$, belonging to the space span (B') spanned by the basis B', and the target vector $t2' = (t'_{2,1}, t'_{2,2}, t'_{2,3})^T \in \text{span}(B')$ having three integer elements $t'_{2,1}$. t1' and t2' are as follows (step S111-3).

$t1' = (325/64, 41, 22)$ $t2' = (147/64, 29, 57)$

<<Processes of Quantum Computer 112>>

When the region $R(2\overline{B}^{-'})$ is the region R, the following holds.

$R \cap L(\overline{B}') = \{i_1 \overline{b}_1' + i_2 \overline{b}_2' + i_3 \overline{b}_3' | i_1, i_2, i_3 = 0 \text{ or } 1\}$ The quantum computer 112 performs the following computation.

(a-1) The quantum state generator 112a of the quantum computer 112 generates multiple registers in the following quantum state.

$$|\varphi\rangle_0 = \frac{1}{\sqrt{2^3}} \sum_{x \in R(2\overline{B}') \cap L(\overline{B}')} |x\rangle$$

(b-1) The quantum state generator 112b applies the quantum rotation gate to some registers among the multiple registers described above. Accordingly, the quantum state of the registers to which the rotation gates have been applied becomes as follows.

$$|\varphi\rangle_{t1'} = \frac{1}{\sqrt{2^3}} \sum_{x \in R(2\overline{B}') \cap L(\overline{B}')} e^{2\pi i m \langle t1', x \rangle} |x\rangle$$

(c-1) The swap tester 72c executes the swap test for each pair of the register having the quantum state $|\phi\rangle_0$ and the register having the quantum state $|\phi\rangle_{t1}$, and outputs the result.

The quantum computer 112 performs the following computation.

(a-2) The quantum state generator 112a of the quantum computer 112 generates multiple registers in the following quantum state.

$$|\varphi\rangle_0 = \frac{1}{\sqrt{2^3}} \sum_{x \in R(2B') \cap L(B')} |x\rangle$$

(b-2) The quantum state generator 112b applies the quantum rotation gate manipulations to some registers among the multiple registers described above. Accordingly, the quantum state of the registers to which the rotation gates have been applied becomes as follows.

$$|\varphi\rangle_{t2'} = \frac{1}{\sqrt{2^3}} \sum_{x \in R(2B') \cap L(B')} e^{2\pi i m(t2',x)} |x\rangle$$

(c-2) The swap tester 72c executes the swap test for each pair of the register having the quantum state $|\phi\rangle_0$ and the register having the quantum state $|\phi\rangle_{t2}$, and obtains and outputs the result.

<<Processes of Classical Computer 73>>

Figure 28:
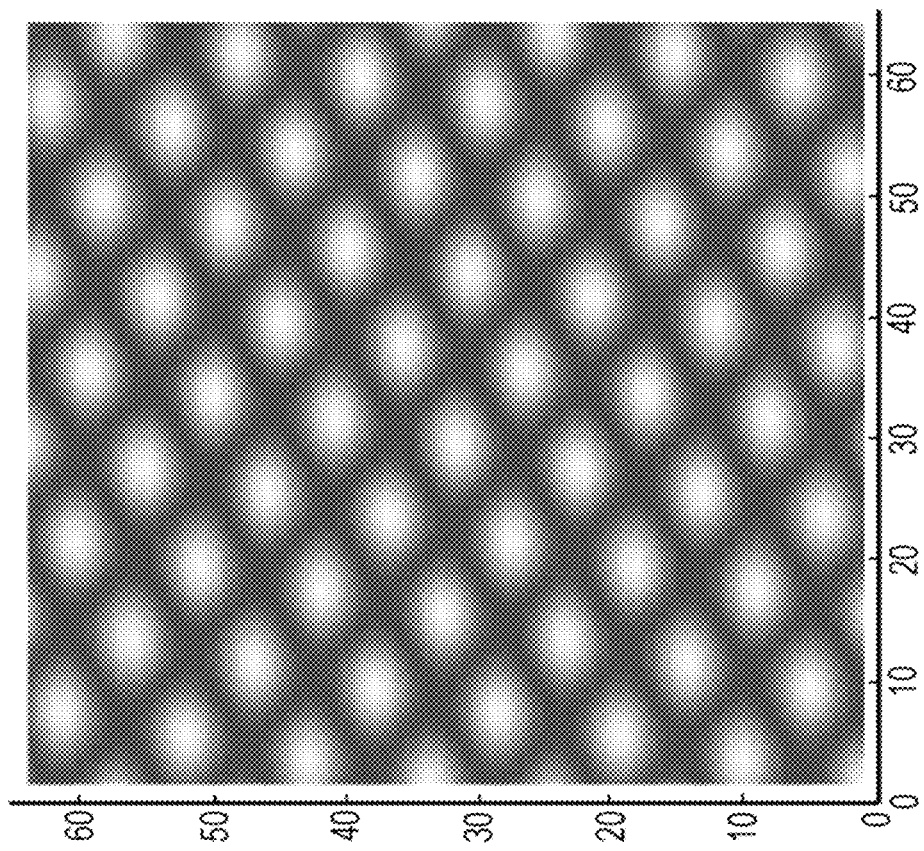
FIG. 28 illustrates a specific example of the embodiment.

The classical computer 73 computes the values of the probabilities $p_1$ and $p_2$ front the result of the swap test described above. The values are theoretically obtained as follows $p_1 \approx 0.655895$, and $p_2 \approx 0.517516$. These values are the same as those of the specific example in the seventh embodiment. FIG. 28 exemplifies the density distribution of the probability $p = p_1, p_2$ in this specific example. As understood from FIG. 28, in a manner analogous to that in the seventh embodiment, it can be decided whether the target vector is close to the lattice point or not from the values of the probabilities $p = p_1$ and $p_2$.

Lastly, in this example, $p_1 > p_2$. Accordingly, the classical computer 73 outputs information indicating that $\|t1^{(d)}\| < \|t2^{(d)}\|$.

TWELFTH EMBODIMENT

A twelfth embodiment is a modification example of the eighth embodiment, uses the method of the eleventh embodiment instead of the method of the seventh embodiment, and solves the given n-dimensional closest vector problem (B, t) (FIG. 17). That is, the method of the eleventh embodiment is used for the given n-dimensional closest vector problem (B, t), and obtains the closest vector $t^{(B, c)} \in L(B)$ on the lattice $L(B)$ so that the difference vector $t^{(B, d)} = t - t^{(B, c)}$ from the target vector t is the shortest.

<Configuration>

As exemplified in FIG. 23, a computation apparatus 12' in this embodiment includes an initial setter 81, a basis selector 82, a representative selector 83, a child node generator 84, a classical computer 127, a node selector 85, a controller 86, a quantum computer 112, and a swap tester 112c. The initial setter 81, the basis selector 82, the representative selector 83, the child node generator 84, the classical computer 71, the node selector 85, and the controller 86 include multiple arithmetic units, and the quantum computer 112 includes multiple quantum arithmetic units (not shown). The computation apparatus 12' includes processing circuitry configured to implement the initial setter 81, the basis selector 82, the representative selector 83, the child node generator 84, the classical computer 127, the node selector 85, the controller 86, and the quantum computer 112.

<Processes>

The processes of this embodiment are described.

The processes of the initial setter 81, the basis selector 82, the representative selector 83, and the child node generator 84 are the same as those in the eighth embodiment.

<<Processes of Classical Computer 127>>

The classical computer 127 uses the basis $B_D$ and the integer N, selects a matrix $\alpha_D$ where the Hermite normal form of the transposed matrix $\beta_D'^T$ of a matrix $\beta_D' = (\alpha_D \beta_D)$ obtained by arranging the matrix $\alpha_D$ and the basis matrix $\beta_D$ in the horizontal direction is a matrix having diagonal elements of 1, and outputs $\beta_D'$. The classical computer 127 obtains and outputs a unimodular matrix $\beta_D'^{-1}$ satisfying $\beta_D'^{-1} \beta_D'^T = H'$ for H' in Hermite normal form. The classical computer 127 assumes that the basis made up of the row vectors $b_{D,1}', \ldots, b_{D,n'}'$ of the matrix $\beta_D' = (b_{D,1}', \ldots, b_{D,n'}')^T$ as $B_D'$, assumes the basis made up of the row vectors $b_{D,1}^{-'}, \ldots, b_{D,n'}^{-'}$ of the unimodular matrix $\beta_D'^{-1} = (b_{D,1}^{-'}, \ldots, b_{D,n'}^{-'})^T$, and $B_D'^{-'}$, obtains and outputs the target vector $t(D, k') \in \text{span}(B_D')$ having n' integer elements belonging to the space $\text{span}(B_D')$ spanned by the basis $B_D'$. Note that $k' = 0, 1, \ldots, v(D) - 1$, $\text{Proj}(t(D, k')) = (0, t(D-1) - c_{D,k'})$, $\text{Proj}(\mu)$ represents a projection onto an n-dimensional vector space where first $n' - n$ elements of $\mu$ are 0, $L(B^{-'})$ is the lattice $L(B^{-'}) = \{\Sigma_{i'1, \ldots, n'} x_i b^{-'}_i | x_i \in Z, b^{-'}_i \in B^{-'}\}$, $x_{i'}$ is an integer, and $R \subseteq Z^{n'}$ is a partial region belonging to the n'-dimensional space made up of integer elements (step S1287).

The process of the quantum computer 112 is the same as that in the eleventh embodiment except that $|\phi\rangle_0, B^{-'}, |\phi\rangle_{t1'}$ and $t1'$ in (a-1) and (b-1) are replaced with $|\phi\rangle_{D,0}, B_D'^{-'}, |\phi\rangle_{t(D,k')}$ and $t(D,k')$, respectively, (c-1) is replaced with the swap test in the eighth embodiment, and (a-2), (b-2) and (c-2) are not executed.

The processes of the node selector 85 and the controller 86 are the same as those in the eighth embodiment.

THIRTEENTH EMBODIMENT

This embodiment uses the processes in the twelfth embodiment as a subroutine, and solves SVP (FIG. 17).

<Configuration>

As shown in FIG. 26, the computation apparatus 6 of this embodiment includes a basis generator 61, setter 62, a selector 63, and a controller 65.

<Processes>

The computation apparatus 6 of this embodiment receives the basis B as an input, and outputs the shortest vector $t^{(c)}$ to the lattice point closest to the origin in the lattice $L(B)$.

While the setter 62 in the sixth embodiment obtains the difference vector $t^{(d)}$ by the computation apparatus in the fourth embodiment, the setter 62 in this embodiment obtains the difference vector $t^{(d)}$ by the computation apparatus 12' described in the twelfth embodiment. The other processes are the same as those in the sixth embodiment. Consequently, the description thereof is omitted.

FOURTEENTH EMBODIMENT

This embodiment is a modification example of the tenth embodiment. The computation apparatus in this embodiment uses the method in the eleventh embodiment instead of the method in the seventh embodiment, and obtains and outputs $(X_1, \ldots, X_m)^T$ satisfying $$\begin{pmatrix} a_{11} & \cdots & a_{1m} \\ a_{21} & \cdots & a_{2m} \\ a_{31} & \cdots & a_{3m} \\ \vdots & \ddots & \vdots \\ a_{n1} & \cdots & a_{nm} \end{pmatrix} \begin{pmatrix} X_1 \\ \vdots \\ X_m \end{pmatrix} + \begin{pmatrix} d_1 \\ d_2 \\ d_3 \\ \vdots \\ d_n \end{pmatrix} \bmod N = \begin{pmatrix} g_1 \\ g_2 \\ g_3 \\ \vdots \\ g_n \end{pmatrix} \quad (40)$$

for inputs of the n-dimensional vectors $a_j$, g and N (FIG. 18).

<Configuration<

As shown in FIG. 27, a computation apparatus 14' of this embodiment includes an initial setter 100, classical computers 1401 and 103 (first and second classical computers), a selector 102, and a quantum computer 122. The classical computers 1401 and 103 include multiple arithmetic units, and the quantum computer 122 includes multiple quantum arithmetic units (not shown). The computation apparatus 14' includes processing circuitry configured to implement the initial setter 100, the classical computer 1401, the quantum computer 112, the selector 102, and the classical computer 103.

<Processes>

The processes of this embodiment are described. The description of the functions of the processors having already been described is omitted.

<<Processes of Classical Computer 1401>>

The arithmetic unit of the classical computer 1401 receives $A_D$, N, $\varepsilon_1, \ldots, \varepsilon_n$ as inputs, and computes and outputs an LLL-reduced basis $B_D$, of the lattice defined by the set of tire row vector $\{a_{j(D+1)}{}^T \; a_{j(D+2)}{}^T \; \ldots \; a_{j(m)}{}^T \; N\varepsilon_1{}^T \; \ldots \; N\varepsilon_n{}^T\}$ obtained by adding $N\varepsilon_i{}^T$ (where i=1, ..., n) to $A_D{}^T$ (step S1411).

The arithmetic unit of the classical computer 1401 obtains and outputs the basis matrix $\beta_D$ of the LLL-reduced basis $B_D$ of $a_{j(D+1)}{}^T, a_{j(D+2)}{}^T, \ldots, a_{j(m)}{}^T, N\varepsilon_1{}^T, \ldots, N\varepsilon_n{}^T$, selects a matrix $\alpha_D$ where the Hermite normal form of the transposed matrix $\beta_D{}'^T$ of the matrix $\beta_D'=(\alpha_D\beta_D)$ obtained by arranging the matrix $\alpha_D$ having n rows of integer elements and the basis matrix $\beta_D$ in the horizontal direction is a matrix having diagonal elements of 1, and outputs $\beta_D'$. The arithmetic unit of the classical computer 1401 obtains and outputs a unimodular matrix $\beta_D{}'^{-1}$ satisfying $\beta_D{}'^{-1}\beta_D{}'^T=H'$ for a matrix H' in Hermite normal form. The arithmetic unit of the classical computer 1401 outputs, as $B_D'$, the basis made up of the row vectors $b_{D,1}', \ldots, b_{D,n'}'$ of the matrix $\beta_D'=(b_{D,1}', \ldots, b_{D,n'}')^T$, and outputs, as $B_D{}^{-1}$, the basis made up of the row vectors $b_{D,1}{}^{-1}, \ldots, b_{D,n'}{}^{-1}$ of a unimodular matrix $\beta_D{}^{-1}=(b_{D,1}{}^{-1}, \ldots, b_{D,n'}{}^{-1})^T$. The arithmetic unit of the classical computer 1401 obtains and outputs the target vector $t(D,j') \in \mathrm{span}(B_D')$ having n' integer elements belonging to the space $\mathrm{span}(B_D')$ spanned by the basis $B_D'$. Note that $j'=0, 1, 2, \ldots, N-1$, and $\mathrm{Proj}(t(D,j'))=(0, g_{D-1}'^T - j' \bullet a_{j(D)}{}^T)$, and $\mathrm{Proj}(\mu)$ represents a projection onto an n-dimensional vector space where initial n'−n elements of $\mu$ are 0 (step S1412).

The process of the quantum computer 112 is the same as that in the eleventh embodiment except that $|\phi\rangle_0$, $B^{-1}$, $|\phi\rangle_{t1}$ in (a-1) and (b-1) are replaced with $|\phi\rangle_{D,0}$, $B_D{}^{-1}$, $|\phi\rangle_{t(D,j')}$ and $t(D,j')$, respectively, (c-1) is replaced with the swap test in the tenth embodiment, and (a-2), (b-2) and (c-2) are not executed.

SPECIFIC EXAMPLE

Next, a specific example of this embodiment is described. Here, as an example of LWE, the same problem as that of the specific example in the tenth embodiment is described. Here, the processes at the depth D=1 is exemplified. These processes are analogous to those at the other D except the value of D itself.

<<Example 1 of Processes Of Classical Computer 1401>>

1. An n×(m−1) matrix obtained by removing, from A, the column of the variable number intended to be obtained is represented as Rest(A). In the case of this example, the value of the first variable $X_1$ of X is intended to be obtained. Accordingly. Rest(A) is the 9×2 matrix obtained by removing the first column from A. The arithmetic unit of the classical computer 1401 computes and outputs an LLL-reduced basis $B_1$ of the lattice defined by the basis represented by (n+m−1)×n matrix $$\begin{pmatrix} NI \\ \mathrm{Rest}(A)^T \end{pmatrix}$$

(step S1411). In a case where m=3 and n=9, the basis matrix $\beta_1$ that has 9 rows and 9 columns and includes, as elements, the n-dimensional vectors $b_1, \ldots, b_9$ constituting $B_1$ in this example is as follows (step S1411).

$$\begin{pmatrix} 1 & -2 & -1 & -2 & 2 & -1 & 1 & 2 & 2 \\ 0 & 1 & -2 & 4 & 2 & -1 & 4 & -1 & -2 \\ -4 & 0 & -2 & -2 & -2 & 1 & -3 & 0 & -3 \\ -2 & 1 & -3 & 3 & 1 & 5 & -3 & -1 & 2 \\ 1 & 4 & -2 & 0 & 3 & 4 & 3 & -4 & 1 \\ -4 & -2 & 2 & 1 & 5 & 3 & 0 & 2 & 1 \\ 3 & 3 & 1 & -3 & 2 & -1 & -5 & -3 & -1 \\ 3 & -2 & 0 & -1 & 3 & 4 & -3 & 2 & -2 \\ 0 & 5 & 1 & -2 & -1 & -5 & -2 & 6 & 1 \end{pmatrix}$$

Subsequently, as step S1412, the following steps S1412*a* to S1412*g* are executed.

2. The arithmetic unit of the classical computer 1401 decides the dimension n' of the space in which the lattice $L(B_1)$ is embedded (step S1412*a*). n is a multiple of n. Hereinafter, an example where n' is three times as large as n, i.e., n'=9×3=27, is described.

3. The arithmetic unit of the classical computer 1401 randomly selects the reduced basis of the lattice $L(B_1)$ that are different from each other $$C_1, C_2, \ldots, C_{\frac{n'}{n}-1}$$

(step S1412*b*). That is, $$L(C_1) = L(C_2) = \ldots = L\left(C_{\frac{n'}{n}-1}\right) = L(B_1)$$

holds. The arithmetic unit of the classical computer 1401 arranges the n×n matrix $\beta_1 C_i^{-1}$ (i=1, 2, ..., (n'/n)−1) laterally (in the horizontal direction), and obtains n×(n'−n) matrix $$R' = \left(\beta_1 C_1^- \beta_1 C_2^{-1} \ldots \beta_1 C_{\frac{n'}{n}-1}^{-1}\right)$$

(step S1412c). Furthermore, the arithmetic unit of the classical computer 1401 sets the n×n' matrix $\beta_1'$ as follows.

$$\beta_1' = (I_n R') \quad (41)$$

where $I_n$ is an n×n unit matrix (step S1412d). The n-dimensional lattice basis defined by $\{b_1', \ldots, b_n'\}$ including the row vectors $b_1', \ldots, b_n'$ of $\beta_1'$ is represented as $B_1'$. Hereinafter, R' in a case where n'=3n=27 is exemplified.

$$R' = \begin{pmatrix} 1 & 0 & 0 & 0 & 0 & 0 & 0 & 0 & 1 & 0 & 0 & 0 & 0 & 0 & 0 & 0 \\ 0 & 1 & 0 & 0 & 0 & 0 & 0 & 0 & 0 & 0 & 1 & 0 & 0 & 0 & 0 & 0 \\ 0 & 0 & -1 & 0 & 0 & 0 & 0 & 0 & -1 & 1 & 0 & 0 & 0 & 0 & 0 & 0 \\ 0 & 0 & 0 & 0 & 1 & 0 & 0 & 0 & 0 & 0 & 0 & 0 & 1 & 0 & 0 & 0 \\ 0 & 0 & 0 & -1 & 0 & 0 & 0 & 0 & 1 & -1 & 0 & 0 & -1 & 1 & 0 & 0 \\ 1 & 0 & 0 & 0 & 1 & 1 & 0 & 0 & 0 & 0 & 0 & 0 & 0 & 0 & 1 & 0 \\ 0 & 0 & 0 & 0 & 0 & 0 & 1 & 0 & 0 & 0 & -1 & 0 & 0 & 0 & -1 & 0 \\ 0 & 0 & 0 & 0 & 0 & 1 & 0 & 0 & 0 & 0 & 0 & -1 & 0 & 0 & 0 & 0 \\ 0 & 0 & 0 & 0 & 0 & 0 & 0 & 1 & 0 & 0 & 0 & 0 & 0 & 0 & 0 & -1 \end{pmatrix}$$

4. The arithmetic unit of the classical computer 1401 Hermite-decomposes the transposed matrix $\beta_1'^T$ of $\beta_1'$ to obtain an n'×n matrix where the diagonal elements of the Hermite normal form are 1, and a unimodular matrix $$\begin{pmatrix} I_n & O_{n,n'-n} \\ -R'^T & I_{n'-n} \end{pmatrix} \quad (42)$$

(step S1412e). Here, $O_{n,n'-n}$ is an n×(n'−n) zero matrix. The arithmetic unit of the classical computer 1401 sets the row vectors of the unimodular matrix as $b_1'^{-1}, \ldots, b_{n'}'^{-1}$, and sets the n'-dimensional lattice basis defined, by $\{b_1'^{-1}, \ldots, b_{n'}'^{-1}\}$ as $B_1^{-1}$ (step S1412f). That is, $$\overline{\beta_1}' \beta_1^T = \begin{pmatrix} I_n & O_{n,n'-n} \\ -R'^T & I_{n'-n} \end{pmatrix} \beta_1'^T = \begin{pmatrix} I_n \\ O_{n,n'-n} \end{pmatrix} \quad (43)$$

holds. Note that according to Formula (43), the space (span$\{b_1', \ldots, b_n'\}$) spanned by the row vectors of $\beta_1'$ and the space (span$\{b_{n+1}'^{-1}, \ldots, b_{n'}'^{-1}\}$) spanned by the row vectors of an (n'−n)×n' matrix ($-R^T I_{n'-n}$) are perpendicular to each other.

As represented in the following Formula (43A), the arithmetic unit of the classical computer 1401 obtains and outputs the target vector $t(1,j') \in \text{span}(B_1')$ having n' integer elements belonging to the space span$(B_1')$ spanned by the basis $B_j'$. The target vector $t(1,j')$ is obtained by embedding the target vector $g_0'^T - j' \cdot a_{j(1)}^T$ in the n'-dimensional space.

$$t(1,j') = (g_0'^T - j' \cdot a_{j(1)}^T) \beta_1^{-1} \beta_1' \quad (43A)$$

According to the definition, $t(1,j')$ is the linear sum of $\beta_1'$. Consequently, $t(1,j') \in \text{span}(B_1')$ (step S1412g). Here, span$(B_1')$ is a hyperplane made of the real coefficient linear sum of $B_1'$. However, $(g_0'^T - j' \cdot a_{j(1)}^T) \beta_1^{-1}$ is not necessarily an integer. Consequently, in general, $t(1,j') \notin L(B_1')$. For example, the computation result of $t(1,10)$ in this specific example is represented as follows.

$$\begin{aligned} t(1,10) = (&-87/11, -87/11, -156/11, 1/11, 109/11, 65/11, \\ &-109/11, 25/11, 89/11, -2, =87/11, 156/11, -109/11, \\ &6, 65/11, 25/11, -109/11, 89/11, 178/11, -265/11, 2, \\ &-25/11, -109/11, 10, 109/11, 65/11, -89/11) \end{aligned}$$

Subsequently, for example, $B^-$ is set as $B_1^{-1}$ and the aforementioned region $R(\Gamma B^-)$ or $R(\Gamma B^{-*})$ is set as the region R, and the subsequent process of the quantum computer 112, process of the selector 102, and process of the classical computer 103 are performed.

EXAMPLE 2 OF PROCESSES OF CLASSICAL COMPUTER 1401

Instead of $B_1^{-1}$, $B_1^{-11}$ that is generated as follows may be used. Accordingly, the correct $\alpha_{j(D)}$ can be obtained using a space having a smaller dimension number n'. In this case, the arithmetic unit of the classical computer 1401 executes step S1411 described in the aforementioned <<Example 1 of process of classical computer 1401>>, executes the processes in steps S1412a to S1412f as step S1412, and further executes the following steps S1412h to S1412k and S1412f.

5. The arithmetic unit of the classical computer 1401 computes the projection vectors $\text{Proj}_{B_1'}(\text{unit}_1), \ldots, \text{Proj}_{B_1'}(\text{unit}_{n'})$ onto the space span$(B_1')$ spanned by the n-dimensional lattice basis $B_1'$ of the unit vectors $\text{unit}_1, \ldots, \text{unit}_{n'}$ in the n'-dimensional space (step S1412h). Here, the unit vectors $\text{unit}_1, \ldots, \text{unit}_{n'}$ are thus used because $L(B_1^{-1})$ coincides with the lattice where the unit vectors $\text{unit}_1, \ldots, \text{unit}_{n'}$ are the basis. These projection vectors $\text{Proj}_{B_1'}(\text{unit}_1), \ldots, \text{Proj}_{B_1'}(\text{unit}_{n'})$ are n'-dimensional vectors that have a length of 1 or less and include rational elements. As represented in Formula (44), an n'×n' matrix where these projection vectors $\text{Proj}_{B_1'}(\text{unit}_1), \ldots, \text{Proj}_{B_1'}(\text{unit}_{n'})$ are vertically arranged is set as $p_1$.

$$P_1 = \begin{pmatrix} \text{Proj}_{B_1'}(\text{unit}_1) \\ \text{Proj}_{B_1'}(\text{unit}_2) \\ \vdots \\ \text{Proj}_{B_1'}(\text{unit}_{n'}) \end{pmatrix} \quad (44)$$

Note that the rank (the maximum number of linearly independent row vectors) of Formula (44) is n. Consequently, the matrix $P_1$ does not have the inverse matrix $P_i^{-1}$.

6. The arithmetic unit of the classical computer 1401 computes an LLL-reduced basis $\{q_1, q_2, \ldots, q_n\}$ of $\{\text{Proj}_{B_1'}(\text{unit}_1), \ldots, \text{Proj}_{B_1'}(\text{unit}_{n'})\}$, and obtains the n'-dimensional vectors $q_1, q_2, \ldots, q_n$ that have rational elements constituting the LLL-reduced basis $\{q_1, q_2, \ldots, q_n\}$ (step S1412i). As represented in Formula (45), the n×n' matrix (the n-dimensional lattice basis in the n'-dimensional space) where the n'-dimensional vectors $q_1, q_2, \ldots, q_n$ are vertically arranged is $Q_1$.

$$Q_1 = \begin{pmatrix} q_1 \\ q_2 \\ \vdots \\ q_n \end{pmatrix} \quad (45)$$

7. The arithmetic unit of the classical computer 1401 obtains an n×n' matrix $X_1$ having integer elements satisfying the following Formula (46) (step S1412*j*).

$$X_1 P_1 = Q_1 \qquad (46)$$

Note that the matrix $P_1$ does not have the inverse matrix $P_1^{-1}$ as described above. Consequently, the matrix $X_1$ cannot be obtained by multiplying both the sides of Formula (46) from the right by the inverse matrix $P_1^{-1}$ of the matrix $P_1$. Accordingly, first, the arithmetic unit of the classical computer 1401 Smith-decomposes the matrix $P_1$, and computes unimodular n'×n' matrices $U_1$ and $V_1$ satisfying the following Formula (47), and integers $\alpha_{1,1}, \alpha_{2,2}, \ldots, \alpha_{n,n}$.

$$U_1 P_1 V_1 = \begin{pmatrix} \alpha_{1,1} & 0 & \ldots & 0 & 0 & \ldots & 0 \\ 0 & \alpha_{2,2} & \ldots & 0 & 0 & \ldots & 0 \\ \vdots & \vdots & \ddots & \vdots & \vdots & \ddots & \vdots \\ 0 & 0 & \ldots & \alpha_{n,n} & 0 & \ldots & 0 \\ 0 & 0 & \ldots & 0 & 0 & \ldots & 0 \\ \vdots & \vdots & \ddots & \vdots & \vdots & \ddots & \vdots \\ 0 & 0 & \ldots & 0 & 0 & \ldots & 0 \end{pmatrix} \qquad (47)$$

Here, removal of $P_1$ from Formula (45) using Formula (47) obtains the following Formula (48).

$$X_1 = Q_1 V_1 \begin{pmatrix} \frac{1}{\alpha_{1,1}} & 0 & \ldots & 0 & 0 & \ldots & 0 \\ 0 & \frac{1}{\alpha_{2,2}} & \ldots & 0 & 0 & \ldots & 0 \\ \vdots & \vdots & \ddots & \vdots & \vdots & \ddots & \vdots \\ 0 & 0 & \ldots & \frac{1}{\alpha_{n,n}} & 0 & \ldots & 0 \\ 0 & 0 & \ldots & 0 & 0 & \ldots & 0 \\ \vdots & \vdots & \ddots & \vdots & \vdots & \ddots & \vdots \\ 0 & 0 & \ldots & 0 & 0 & \ldots & 0 \end{pmatrix} U_1 \qquad (48)$$

The arithmetic unit of the classical computer 1401 uses the matrices $Q_1$, $U_1$ and $V_1$ and the integers $\alpha_{1,1}, \alpha_{2,2}, \ldots, \alpha_{n,n}$, and obtains the matrix $X_1$ according to Formula (48). Note that the elements on the right side of Formula (48) are represented by fractions. Computation thereof, however, allows the numerator each element to be evenly divided by the denominator, and each element of the matrix $X_1$ becomes an integer.

8. The arithmetic unit of the classical computer 1401 replaces the first to n-th rows of Formula (42) (i.e., the part of $I_n \; O_{n,n'-n}$) with the n×n' matrix $X_1$ to generate the matrix $\overline{\beta_1}^{\prime\prime}$ represented by the following Formula (49).

$$\overline{\beta_1}^{\prime\prime} = \begin{pmatrix} X_1 \\ -R^T & I_{n'-n} \end{pmatrix} \qquad (49)$$

The arithmetic unit of the classical computer 1401 sets, to $B_1^{-\prime\prime}$, the basis defined by the set of the row vectors of the matrix $\overline{\beta_1}^{\prime\prime}$ (step S1412*k*).

Subsequently, the arithmetic unit of the classical computer 1401 executes step S1412*g* described above. For example, $B^-$ is set as $B_1^{-\prime\prime}$ and the aforementioned region $R(TB^-)$ or $R(TB^{-*})$ is set as the region R, and the subsequent process of the quantum computer 112, process of the selector 102, and process of the classical computer 103 are performed.

<<Processes of Selector 102>>

The selector 102 computes the probability $p_{1,j'}$ that is the evaluation value of each $j'=0, 1, 2, \ldots, 10$, for each node $(B_1, g_0^{\prime T} - j' \bullet a_{j(1)}^T)$ corresponding to the depth of 1, on the basis of the result of the swap test performed by the quantum computer 112, and obtains the value $\alpha_{j(1)}$ of $X_{j(1)}$ at the depth D on the basis of these evaluation values. In this specific example, when the process of the quantum computer 112 is executed using $R(2B_1^{-\prime\prime*})$ as the region R, the probability $p_{1,j'}$ becomes as follows.

$p_{1,0}=0.500007$
$p_{1,1}=0.500167$
$p_{1,2}=0.500019$
$p_{1,3}=0.500106$
$p_{1,4}=0.500013$
$p_{1,5}=0.500133$
$p_{1,6}=0.500007$
$p_{1,7}=0.500128$
$p_{1,8}=0.500071$
$p_{1,9}=0.500012$
$p_{1,10}=0.500721$

In the above example, when the swap test is performed 10,000 times, 0 (receipt, Yes) is obtained about 5,007 times for j=10, but 0 (receipt, Yes) is obtained only about 5,001 times for j≠10. Consequently, the selector 102 outputs, as $\alpha_{j(1)}$, 10 corresponding to the highest probability $p_{1,10}$ among the probabilities $p_{1,0}, p_{1,1}, \ldots, p_{1,10}$. The selector 102 computes and outputs $g_1' = g_0 - 10 \bullet a_{j(1)}$.

Figure 29:
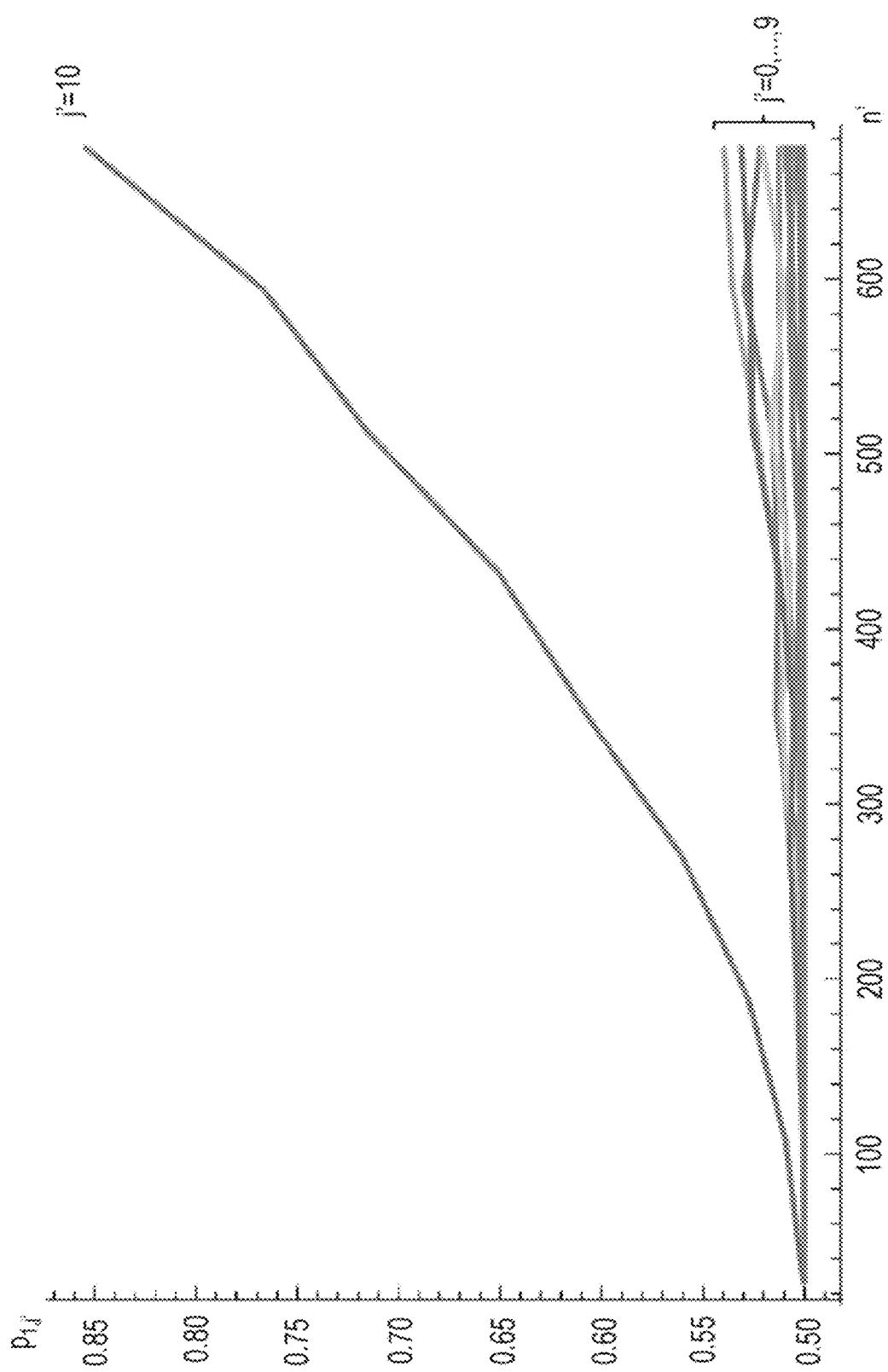
FIG. 29 illustrates a specific example of the embodiment.

The difference between the probability $p_{1,10}$ and each of the other probabilities $p_{1,0}, \ldots, p_{1,9}$ in the specific example in the fourteenth embodiment is significantly smaller than those in the specific example in the tenth embodiment, because the number of dimensions of the space in which the lattice is embedded is too small. Increase in the difference between the probability $p_{1,10}$ and each of the other probabilities $p_{1,0}, \ldots, p_{1,9}$ only requires to increase the dimension number n'. FIG. 29 exemplifies the relationship between the dimension number n' and the probability $p_{1,j'}$ (where $j'=0, \ldots, 10$). FIG. 29 shows that increase in the dimension number n', in turn, increases the difference between the probability $p_{1,10}$ and each of the other probabilities $p_{1,0}, \ldots, p_{1,9}$. In general, the dimension number n' required to select a correct j' depends on the dimension number n of the original lattice, the basis $B_1'$, and the magnitude of the error $\|error\|$. The dimension n' of the space in which the lattice is embedded is increased, and the basis $B_1'$ is appropriately selected, thereby enabling a solution to be obtained against a larger error.

FIFTEENTH EMBODIMENT

Figure 30:
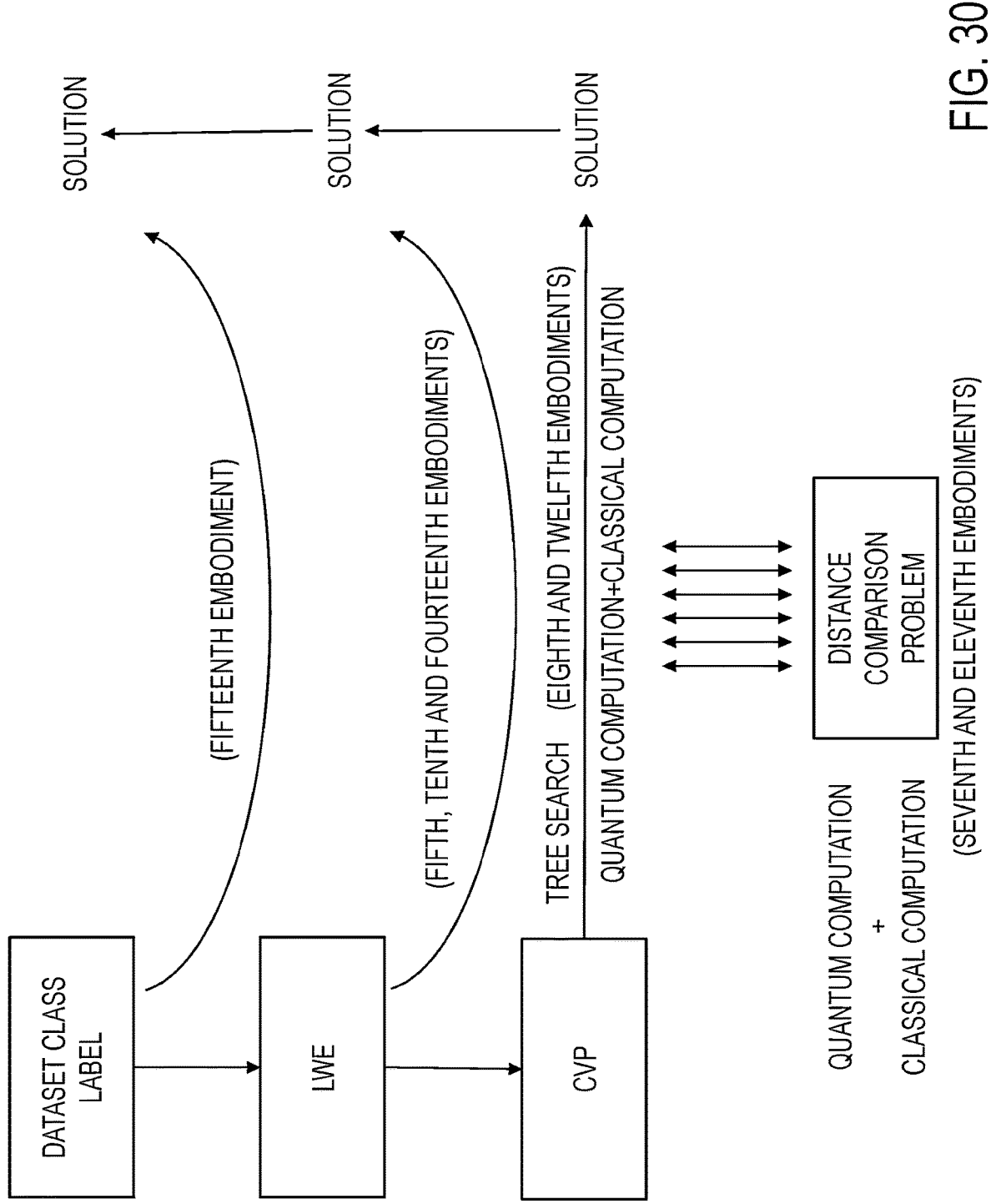
FIG. 30 is a conceptual diagram representing the correspondence relationship between the embodiments.

A fifteenth embodiment receives, as inputs, a dataset that is learning data and a class label, and uses any of the methods in the fifth, tenth and fourteenth embodiments to perform supervised learning of a feed-forward neural network (FIG. 30). The neural network dealt with in this embodiment is only feed-forward one. Hereinafter, the description of "feed-forward" is omitted, and simple representation of "neural network" is adopted.

Figure 31:
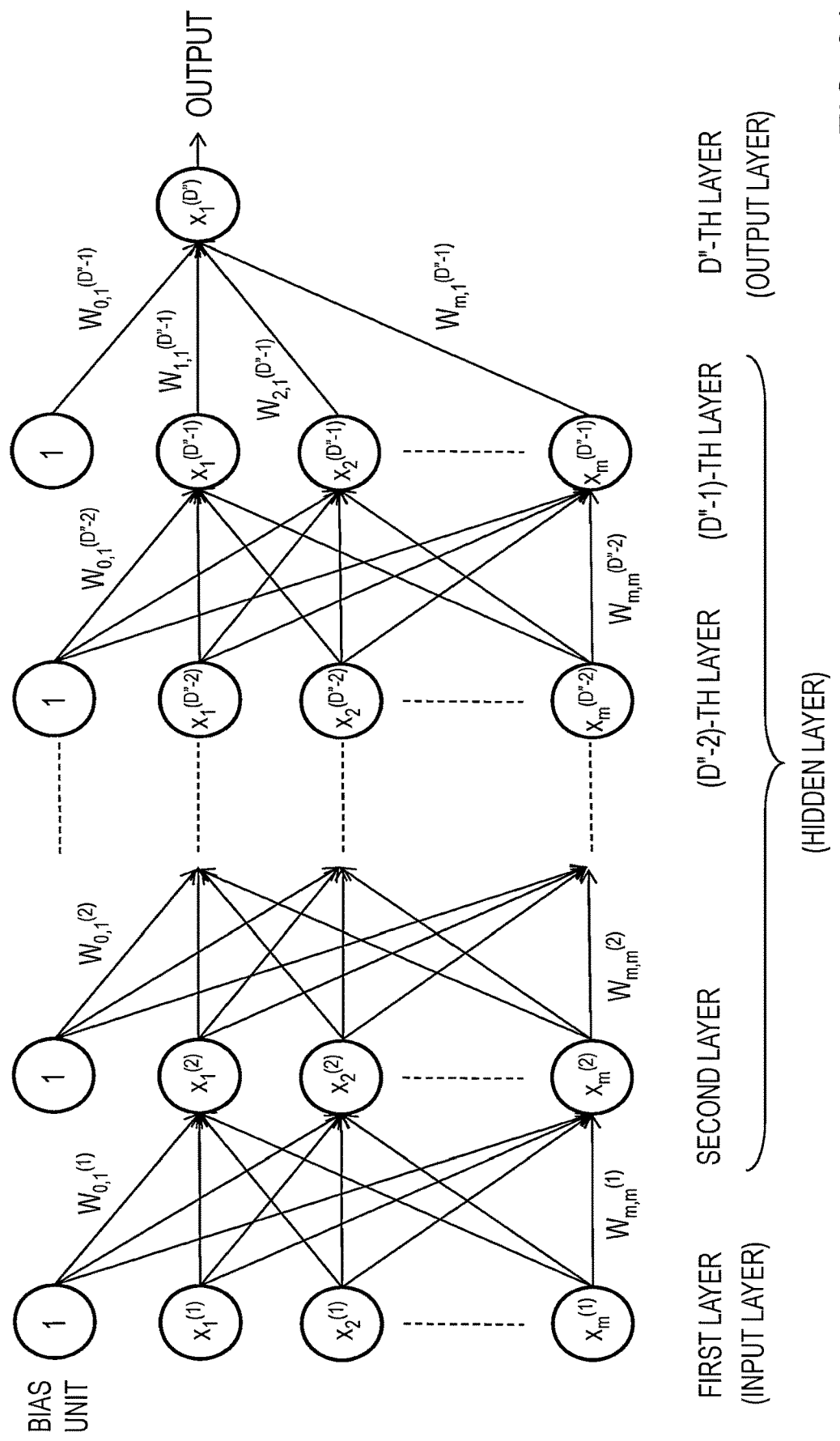
FIG. 31 is a conceptual diagram exemplifying a configuration of a feed-forward neural network.

FIG. 31 shows the configuration diagram of the neural network. The neural network is represented by a weighted directed graph of nodes called units, and includes an input layer. Hidden layers, and an output layer. Neural networks having no hidden layer are called single-layer neural networks. Neural networks having one or more hidden layers are called deep (multi-) layer neural networks. Except units that are called bias units and have fixed values, a variable of a real number (floating point) value is labelled to a unit. Hereinafter, the variable of the ι"-th (ι"=0, 1, 2, . . . , m) unit on the L"-th layer (L"=1, 2, . . . , D"-2, D"-1, D") is represented as $x_{\iota''}^{(L'')}$. Note that D" is an integer of 2 or more, and m is a positive integer. The unit corresponding to ι"=0 is a bias unit. The bias unit at every depth L" has the fixed value 1.

From the values of variables $x_{\iota''}^{(L'')}, \ldots, x_m^{(L'')}$ on the L"-th layer (L"=1, 2, . . . , D"-2, D"-1), the values of the variables $x_{\kappa''}^{(L''+1)}$ of the κ"-th unit on the (L"+1)-th layer are computed as follows.

$$z_{\kappa''}^{(L''+1)} = W_{0,\kappa''}^{(L'')} + x_1^{(L'')} W_{1,\kappa''}^{(L'')} + \ldots + x_m^{(L'')} W_{m,\kappa''}^{(L'')} \quad (50)$$

$$x_{\kappa''}^{(L''+1)} = \Psi(z_{\kappa''}^{(L''+1)}) \quad (51)$$

Here, $W_{\iota'',\kappa''}^{(L'')}$ is a real number value representing the weight between the ι"-th unit on the L"-th layer and the κ"-th unit on the (L"+1)-th layer. Note that the upper indices of "$x_{\kappa''}^{(L''+1)}$", "$W_{\iota'',\kappa''}^{(L'')}$" and the like should be notated immediately above the lower index. However, due to the limitation of the descriptive notation, the upper indices are sometimes notated at the upper right of the lower subscripts. Ψ is a nonlinear function called an activation function. Examples of the activation function Ψ include a sigmoid function (also called a logistic function), $$\Psi(z'') = \frac{1}{1 + e_{nap}^{-Z''}}$$

and a hyperbolic tangent (tan h)

$$\Psi(z'') = \tanh(z'') = \frac{e_{nap}^{Z''} - e_{nap}^{-Z''}}{e_{nap}^{Z''} + e_{nap}^{-Z''}}$$

An algorithm described below is not limited to these activation functions. For the sake of convenience of description, this embodiment assumes that the inverse image of the activation function Ψ is uniquely decided. $e_{nap}$ represents the base of the natural logarithm (Napier's constant).

Given a matrix $$A_t = \begin{pmatrix} a''_{1,1} & a''_{1,2} & \ldots & a''_{1,m} \\ a''_{2,1} & a''_{2,2} & \ldots & a''_{2,m} \\ a''_{3,1} & a''_{3,2} & \ldots & a''_{3,m} \\ \vdots & \vdots & \ddots & \vdots \\ a''_{n,1} & a''_{n,2} & \ldots & a''_{n,m} \end{pmatrix} \in \text{Re}^{n \times m}$$

made up of n sets of n-dimensional datasets $\{a''_{i,1}, \ldots, a''_{i,m}\}$ (i=1, 2, 3, . . . , n) that are training data, and a vector $$G'' = \begin{pmatrix} g''_1 \\ g''_2 \\ \vdots \\ g''_n \end{pmatrix} \in \text{Re}^n$$

having class labels $g''_i$ for the datasets $\{a''_{i,1}, \ldots, a''_{i,m}\}$, and the depth D" of the neural network, neural network supervised learning is decision of the weight $W_{\iota'',\kappa''}^{(L'')}$ (where 0≤ι"≤m, 1≤κ"≤m when 1≤L"<D"-2, and 0≤ι"≤m,κ"=1 when L"=D"-1) where each element $a''_{i,j}$ (j=1, . . . , m) is substituted in the variable $x_j^{(1)}$ for each of the (i=1, 2, 3, . . . , n)-th datasets $\{a''_{i,1}, \ldots, a''_{i,m}\}$, and the value $a''_{i,j}^{(L'')}$ of the variable $x_j^{(L'')}$ is computed according to Formulae (50) and (51) in an order of the depth L"=2, 3, . . . , D" to obtain the value $a''_{i,1}^{(D'')}$ of the variable $x_j^{(D'')}$ for L"=D", satisfying $$\begin{pmatrix} a''^{(D'')}_{1,1} \\ a''^{(D'')}_{2,1} \\ \vdots \\ a''^{(D'')}_{n,1} \end{pmatrix} \approx G''$$

Note that Re represents the set of real numbers, and α1≈α2 represents that α1 and α2 come near to each other.

This is represented in a mathematical formula as follows. The neural network supervised learning is decision of $W^{(1)}$, $W^{(2)}, \ldots, W^{(D''-1)}$ satisfying Formula (55), for an n×1 matrix $A_t^{(D'')}$ obtained by computation according to the following Formulae (52), (53) and (54), from a given n×m matrix $A_t$, n+1 matrix G" and integer D"≥2.

$$(A_t^{(1)} = A_t \quad (52)$$

$$Z^{(L'+1)} = (U1 \frown A_t^{(L'')}) W^{(L'')} \text{ for } 1 \leq L'' \leq D''-1 \quad (53)$$

$$A_t^{(L''+1)} = \Psi(Z^{(L''+1)}) \text{ for } 1 \leq L'' \leq D''-1 \quad (54)$$

$$A_t^{(D'')} \approx G'' \quad (55)$$

where $$U1 = \begin{pmatrix} 1 \\ 1 \\ 1 \\ \vdots \\ 1 \end{pmatrix}$$

$$W^{(L'')} = \begin{pmatrix} W_{0,1}^{(L'')} & W_{0,2}^{(L'')} & W_{0,3}^{(L')} & \ldots & W_{0,m}^{(L'')} \\ W_{1,1}^{(L'')} & W_{1,2}^{(L'')} & W_{1,3}^{(L')} & \ldots & W_{1,m}^{(L'')} \\ W_{2,1}^{(L'')} & W_{2,2}^{(L'')} & W_{2,3}^{(L')} & \ldots & W_{2,m}^{(L'')} \\ \vdots & \vdots & \vdots & \ddots & \vdots \\ W_{m,1}^{(L'')} & W_{m,2}^{(L'')} & W_{m,3}^{(L')} & \ldots & W_{m,m}^{(L'')} \end{pmatrix} \text{ for } 1 \leq L'' \leq D''-2$$

$$W^{(D''-1)} = \begin{pmatrix} W_{0,1}^{(D'-1)} \\ W_{1,1}^{(D'-1)} \\ W_{2,1}^{(D'-1)} \\ \vdots \\ W_{m,1}^{(D'-1)} \end{pmatrix}$$

holds.

$$U1 \frown A_t^{(L'')}$$

in Formula (53) means an m×(m+1) matrix created by arranging an m×1 matrix U1 and an m×m matrix $A_t^{(L'')}$ the horizontal direction (lateral direction). $\Psi(Z^{L''+1})$ in Formula

(54) represents a matrix having elements obtained, by applying the activation function $\Psi$ to the respective elements of $Z^{(L''+1)}$.

This embodiment uses any of the methods of the fifth, tenth and fourteenth embodiments to perform neural network supervised learning. Its concept is described as follows.

<<Case of Single-Layer Neural Network (D''=2)>>

For the sake of simplicity, a case of a single-layer neural network is described. According to Formulae (52), (53), (54) and (55), the following holds.

$$\begin{pmatrix} 1 & a''_{1,1} & \cdots & a''_{1,m} \\ 1 & a''_{2,1} & \cdots & a''_{2,m} \\ 1 & a''_{3,1} & \cdots & a''_{3,m} \\ \vdots & \vdots & \ddots & \vdots \\ 1 & a''_{n,1} & \cdots & a''_{n,m} \end{pmatrix} \begin{pmatrix} W^{(1)}_{0,1} \\ W^{(1)}_{1,1} \\ \vdots \\ W^{(1)}_{m,1} \end{pmatrix} \approx \begin{pmatrix} \Psi^{-1}(g''_1) \\ \Psi^{-1}(g''_2) \\ \Psi^{-1}(g''_3) \\ \vdots \\ \Psi^{-1}(g''_n) \end{pmatrix} \quad (56)$$

This neural network supervised learning computes $W_{0,1}^{(1)}$, $W_{1,1}^{(1)}, \ldots, W_{m,1}^{(1)}$ satisfying Formula (56).

Here, a sufficiently large integer s'' is selected, and N is set to a power-of-two number sufficiently larger than s''. For example, an integer equal to or larger than the significant figures in the binary expression in a computer is selected as s'', and N is a power-of-two number sufficiently larger than s''. An example of N sufficiently larger than s'' is N satisfying N>(s'')²m. Specific examples of s'' and N are as follows. For example, in a case where the number of significant figures in the binary expression is 64 and m=$2^{10}$, s'' and N that satisfy N=$2^{140}$>(s'')²m>s''=$2^{64}$ are selected. Here, s''$a''_{i,j}$ and s''$\Psi^{-1}(g''_i)$ can be regard as integers (i=1, ..., n, j=1, ... m). Accordingly, Formula (56) is equivalent to the LWE problem in the following Formula (57).

$$\begin{pmatrix} s'' & s''a''_{1,1} & \cdots & s''a''_{1,m} \\ s'' & s''a''_{2,1} & \cdots & s''a''_{2,m} \\ s'' & s''a''_{3,1} & \cdots & s''a''_{3,m} \\ \vdots & \vdots & \ddots & \vdots \\ s'' & s''a''_{n,1} & \cdots & s''a''_{n,m} \end{pmatrix} \begin{pmatrix} X_0 \\ X_1 \\ \vdots \\ X_m \end{pmatrix} + \begin{pmatrix} d_1 \\ d_2 \\ d_3 \\ \vdots \\ d_n \end{pmatrix} \bmod N = \begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix} \quad (57)$$

Accordingly, the solutions $X_0, X_1, \ldots, X_m$ of the LWE problem of Formula (57) can be obtained using any of the methods in the fifth, tenth and fourteenth embodiments, and the obtained solutions can be set in $W_{0,1}^{(1)}=X_0$, $W_{1,1}^{(1)}=X_1, \ldots, W_{m,1}^{(1)}=X_m$. $d=(d_1, \ldots, d_n)^T$ is a short vector. In the LWE problem in the fifth, tenth and fourteenth embodiments, j=1, ..., m, and the solutions are $(X_1, \ldots, X_m)^T$. Replacement of j=1, ..., m in the fifth, tenth and fourteenth embodiments with ι''=0, 1, 2, ..., m can obtain the solutions $X_0, X_1, \ldots, X_m$ of the LWE problem of Formula (57).

<<Case of Deep Neural Network (D''>3)>>

Next, a ease of a deep-layer neural network is described. The deep neural network supervised learning in this embodiment sequentially computes the weight $W_{ι'',κ''}^{(L'')}$ in an order of L''=1, 2, ..., D''−1 (i.e., a forward order from before backward). The process in a case of L''=D''−1 is the same as that of the case of the single-layer neural network. Hereinafter, provided that $W_{ι'',κ''}^{(L''-1)}$ (0≤ι''≤m, 1≤κ''≤m) has already been computed for 1<L''<D''−1, a method of computer $W_{ι'',κ''}^{(L'')}$ (0≤ι''≤m, 1≤κ''≤m) is described.

First, when L''=1, $$\begin{pmatrix} a''^{(1)}_{1,1} & a''^{(1)}_{1,2} & \cdots & a''^{(1)}_{1,m} \\ a''^{(1)}_{2,1} & a''^{(1)}_{2,2} & \cdots & a''^{(1)}_{2,m} \\ a''^{(1)}_{3,1} & a''^{(1)}_{3,2} & \cdots & a''^{(2)}_{3,m} \\ \vdots & \vdots & \ddots & \vdots \\ a''^{(1)}_{n,1} & a''^{(1)}_{n,2} & \cdots & a''^{(2)}_{n,m} \end{pmatrix} = A_t$$

is set. When 1<L''<D''−1, Formulae (52), (53) and (54) are used to compute the value $a''^{(L'')}_{ι'',κ''}$ of the variable $x_{κ''}^{(L'')}$ from $W_{ι'',κ''}^{(L''-1)}$ (0≤ι''≤m, 1≤κ''≤m). Next, any of the methods of the fifth, tenth and fourteenth embodiments is used, to obtain the candidate value of the solution $X=(X_0, X_1, \ldots, X_m)^T$ of the LWE problem of the following Formula (58), and to set the candidate value of the obtained solution X to $W_{ι'',κ''}^{(L'')}$ (0≤ι''≤m, 1≤κ''≤m).

$$\begin{pmatrix} s'' & s''a''^{(L'')}_{1,1} & \cdots & s''a''^{(L'')}_{1,m} \\ s'' & s''a''^{(L'')}_{2,1} & \cdots & s''a''^{(L'')}_{2,m} \\ s'' & s''a''^{(L'')}_{3,1} & \cdots & s''a''^{(L'')}_{3,m} \\ \vdots & \vdots & \ddots & \vdots \\ s'' & s''a''^{(L'')}_{n,1} & \cdots & s''a''^{(L'')}_{n,m} \end{pmatrix} \begin{pmatrix} X_0 \\ X_1 \\ \vdots \\ X_m \end{pmatrix} + \begin{pmatrix} d_1 \\ d_2 \\ d_3 \\ \vdots \\ d_n \end{pmatrix} \bmod N = \begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix} \quad (58)$$

$d=(d_1, \ldots, d_n)^T$ is a short vector. In a case where the LWE problem of Formula (58) has a unique solution, only one candidate value among the solutions $X=(X_0, X_1, \ldots, X_m)^T$ corresponds to the difference vector d that is significantly shorter than the others in the LWE problem solution computation process. Accordingly, a correct solution can be easily found out from the length $\|d\|$ of the difference vector d. Meanwhile, in the neural network learning, it is considered that many suboptimal values of the weights are present, and there is a possibility that many of the candidate values of the solution X correspond to the difference vector d having a similar length $\|d\|$. Accordingly, Formula (58) is solved to select the candidate value of m sets of solutions X corresponding to the first to m-th difference vectors d in an ascending order of the length $\|d\|$ and to set the candidate value of the κ''(1≤κ''≤m)-th solution $X=(X_0, X_1, \ldots, X_m)^T$ to $(W_{0,κ''}^{(L'')}, W_{1,κ''}^{(L'')}, \ldots, W_{m,κ''}^{(L'')})^T$. The selector 102 in the tenth embodiment and the like obtains the probabilities $p_{d,0}, p_{D,1}, \ldots, p_{D,N-1}$ that the result of the swap test is receipt, and outputs jmax∈{0, 1, 2, ..., N−1} corresponding to the highest probability $p_{D,jmax}$ among these probabilities, as $\alpha_{j(D)}=X_{j(D)}$. The candidate value of $X_{j(D)}$ is j corresponding to multiple probabilities selected from among the probabilities $p_{D,0}, p_{D,1}, \ldots, p_{D,N-1}$ the descending order of probability.

By deciding the weight $W_{ι'',κ''}^{(L'')}$ described above, the value $a''^{(L''+1)}_{i,j}$ of the variable $x_j^{(L''+1)}$ of the (L''+1)-th layer unit is expected to approach the class label $g''_i$ more closely than the value $a''^{(L'')}_{i,j}$ of the variable $x_j^{(L'')}$ on the L''-th layer unit. This is because of the following reason.

According to the definition of $a''^{(L''+1)}_{i,j}$ by Formulae (52), (53) and (54), the following holds.

$$\begin{pmatrix} a''^{(L''+1)}_{1,κ''} \\ a''^{(L''+1)}_{2,κ''} \\ a''^{(L''+1)}_{3,κ''} \\ \vdots \\ a''^{(L''+1)}_{n,κ''} \end{pmatrix} = \Psi\left(\begin{pmatrix} 1 & a''^{(L'')}_{1,1} & \cdots & a''^{(L'')}_{1,m} \\ 1 & a''^{(L'')}_{2,1} & \cdots & a''^{(L'')}_{2,m} \\ 1 & a''^{(L'')}_{3,1} & \cdots & a''^{(L'')}_{3,m} \\ \vdots & \vdots & \ddots & \vdots \\ 1 & a''^{(L'')}_{n,1} & \cdots & a''^{(L'')}_{n,m} \end{pmatrix} \begin{pmatrix} W^{(L'')}_{0,κ''} \\ W^{(L'')}_{1,κ''} \\ \vdots \\ W^{(L'')}_{m,κ''} \end{pmatrix}\right) \quad (59)$$

In Formula (58), each element is sufficiently small with respect to N. Accordingly, without consideration of mod N, the following Formula (60) holds.

$$\begin{pmatrix} g''_1 \\ g''_2 \\ g''_3 \\ \vdots \\ g''_n \end{pmatrix} = \Psi \left( \begin{pmatrix} 1 & a_{1,1}^{''(L'')} & \cdots & a_{1,m}^{''(L'')} \\ 1 & a_{2,1}^{''(L'')} & \cdots & a_{2,m}^{''(L'')} \\ 1 & a_{3,1}^{''(L'')} & \cdots & a_{3,m}^{''(L'')} \\ \vdots & \vdots & \ddots & \vdots \\ 1 & a_{n,1}^{''(L'')} & \cdots & a_{n,m}^{''(L'')} \end{pmatrix} \begin{pmatrix} W_{0,\kappa''}^{(L'')} \\ W_{1,\kappa''}^{(L'')} \\ \vdots \\ W_{m,\kappa''}^{(L'')} \end{pmatrix} \right) + \frac{1}{s''} \begin{pmatrix} d_{1,\kappa''}^{(L'')} \\ d_{2,\kappa''}^{(L'')} \\ d_{3,\kappa''}^{(L'')} \\ \vdots \\ d_{n,\kappa''}^{(L'')} \end{pmatrix} \quad (60)$$

Provided that c" is an appropriate number satisfying $|\Psi(z_1'') - \Psi(z_2'')| \leq c''|z_1'' - z_2''|$ (e.g., it is only required that c" is the upper bound of the absolute value of the derivative value of $\Psi(z_1'')$). According to Formulae (59) and (60), the following Formula (61) holds.

$$\left\| \begin{pmatrix} a_{1,\kappa''}^{''(L''+1)} \\ a_{2,\kappa''}^{''(L''+1)} \\ a_{3,\kappa''}^{''(L''+1)} \\ \vdots \\ a_{n,\kappa''}^{''(L''+1)} \end{pmatrix} - \begin{pmatrix} g''_1 \\ g''_2 \\ g''_3 \\ \vdots \\ g''_n \end{pmatrix} \right\| \leq \left| \frac{c''}{s''} \right| \left\| \begin{pmatrix} d_{1,\kappa''}^{(L'')} \\ d_{2,\kappa''}^{(L'')} \\ d_{3,\kappa''}^{(L'')} \\ \vdots \\ d_{n,\kappa''}^{(L'')} \end{pmatrix} \right\| \quad (61)$$

The weights $W_{0,\kappa''}(L'')$, $W_{1,\kappa''}^{(L'')}$, ..., $W_{m,\kappa''}^{(L'')}$ are selected so that the right side of Formula (61) (the length of the difference vector) can decrease with increase in L". Consequently, the left side of Formula (61) approaches 0 with increase in L".

<Configuration>

Figure 32:
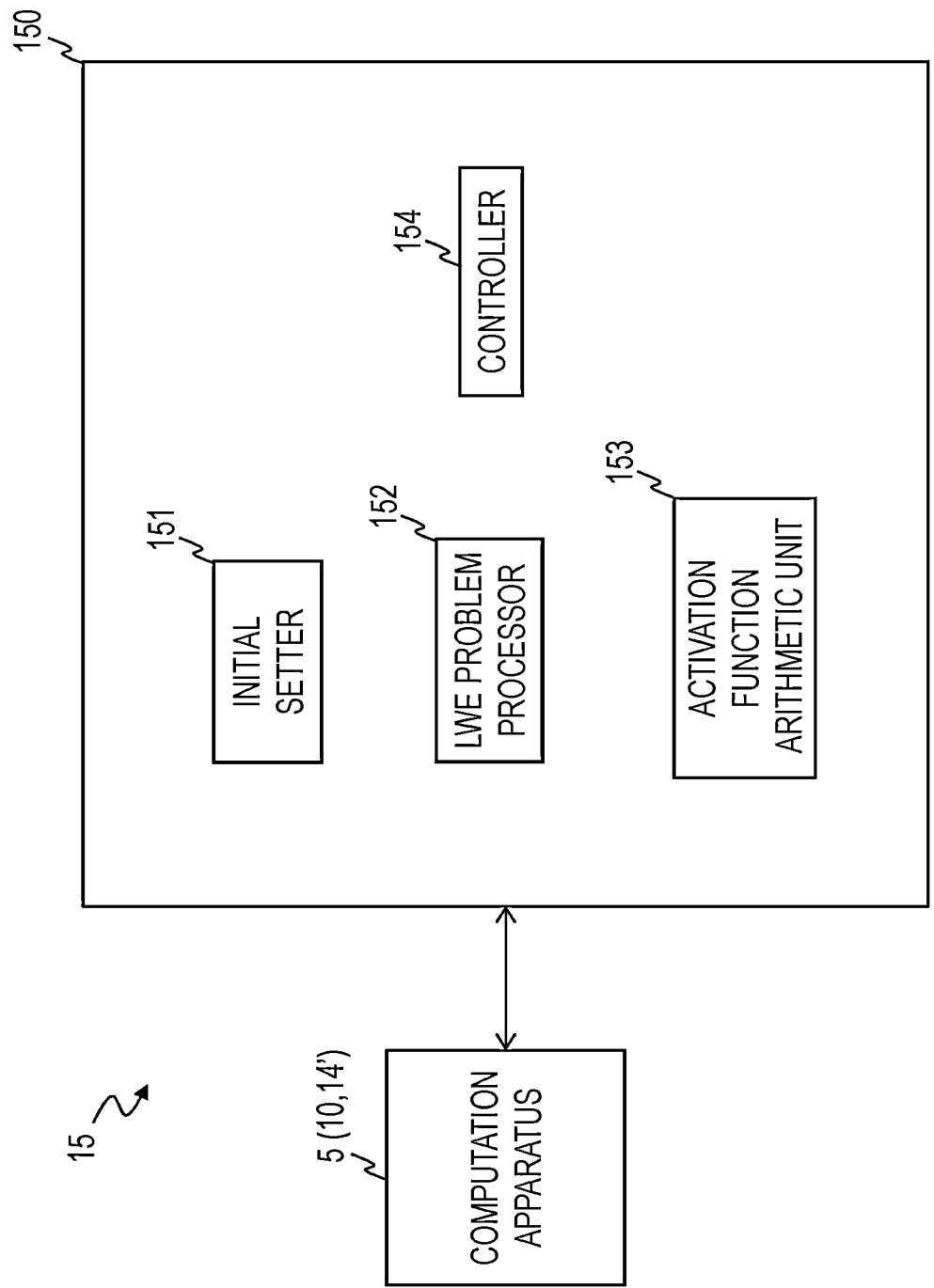
FIG. 32 is a block diagram exemplifying a functional configuration of a learning apparatus of the embodiment.

As exemplified in FIG. 32, a learning system 15 of this embodiment includes a learning apparatus 150, and any of the computation apparatuses 5, 10 and 14 described in the fifth, tenth and fourteenth embodiments. The learning apparatus 150 includes an initial setter 151, a LWE problem processor 152, an activation function arithmetic unit 153, and a controller 154. The learning apparatus 150 includes processing circuitry configured to implement the initial setter 151, the LWE problem processor 152, the activation function arithmetic unit 153, and the controller 154. The learning apparatus 150 is connected to any of the computation apparatuses 5, 10 and 14 via a network, for example.

<Processes>

The processes of this embodiment are described.

The learning apparatus 150 receives, as inputs, a matrix made up of n sets of m-dimensional datasets $\{a''_{i,1}, \ldots, a''_{i,m}\}$ (i=1, 2, 3, ..., n) that are training data $$A_t = \begin{pmatrix} a''_{1,1} & a''_{1,2} & \cdots & a''_{1,m} \\ a''_{2,1} & a''_{2,2} & \cdots & a''_{2,m} \\ a''_{3,1} & a''_{3,2} & \cdots & a''_{3,m} \\ \vdots & \vdots & \ddots & \vdots \\ a''_{n,1} & a''_{n,2} & \cdots & a''_{n,m} \end{pmatrix}$$

a vector having the class labels $g''_i$ (i=1, 2, 3, ..., n) for the respective datasets $\{a''_{i,1}, \ldots, a''_{i,m}\}$ (i=1, 2, 3, ..., n)

$$G'' = \begin{pmatrix} g''_1 \\ g''_2 \\ \vdots \\ g''_n \end{pmatrix}$$

and the depth D" of the neural network. The learning apparatus 150 uses these inputs to execute the following processes.

The initial setter 151 assumes L"=1, and sets $a''_{i,j}{}^{(1)}$ using a matrix $A_t$ as follows (step S151).

$$\begin{pmatrix} a_{1,1}^{''(1)} & a_{1,2}^{''(1)} & \cdots & a_{1,m}^{''(1)} \\ a_{2,1}^{''(1)} & a_{2,2}^{''(1)} & \cdots & a_{2,m}^{''(1)} \\ a_{3,1}^{''(1)} & a_{3,2}^{''(1)} & \cdots & a_{3,m}^{''(2)} \\ \vdots & \vdots & \ddots & \vdots \\ a_{n,1}^{''(1)} & a_{n,2}^{''(1)} & \cdots & a_{n,m}^{''(2)} \end{pmatrix} = A_t$$

The LWE problem processor 152, the activation function arithmetic unit 153, and the controller 154 execute the following steps S152a and S153a in an order of L"=1, 2, ..., D"−2.

<<Step S152a>>

The LWE problem processor 152 transmits the LWE problem of the following Formula (62) to any of the computation apparatuses 5, 10 and 14. The computation apparatuses 5, 10 and 14 having received the LWE problem solve the following Formula (62) as described above, and generate and output the candidate values of the solution $X=(X_0, X_1, \ldots, X_m)^T$.

$$\begin{pmatrix} s'' & a_{1,1}^{''(L'')} & \cdots & a_{1,m}^{''(L'')} \\ s'' & a_{2,1}^{''(L'')} & \cdots & a_{2,m}^{''(L'')} \\ s'' & a_{3,1}^{''(L'')} & \cdots & a_{3,m}^{''(L'')} \\ \vdots & \vdots & \ddots & \vdots \\ s'' & a_{n,1}^{''(L'')} & \cdots & a_{n,m}^{''(L'')} \end{pmatrix} \begin{pmatrix} X_0 \\ X_1 \\ \vdots \\ X_m \end{pmatrix} \mod N \approx \begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix} \quad (62)$$

Note that Formula (62) is equivalent to the LWE problem in the following Formula (63).

$$\begin{pmatrix} s'' & a_{1,1}^{''(L'')} & \cdots & a_{1,m}^{''(L'')} \\ s'' & a_{2,1}^{''(L'')} & \cdots & a_{2,m}^{''(L'')} \\ s'' & a_{3,1}^{''(L'')} & \cdots & a_{3,m}^{''(L'')} \\ \vdots & \vdots & \ddots & \vdots \\ s'' & a_{n,1}^{''(L'')} & \cdots & a_{n,m}^{''(L'')} \end{pmatrix} \begin{pmatrix} X_0 \\ X_1 \\ \vdots \\ X_m \end{pmatrix} + \begin{pmatrix} d_1 \\ d_2 \\ d_3 \\ \vdots \\ d_n \end{pmatrix} \mod N = \begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix} \quad (63)$$

s" is a sufficiently large integer. An example of s" is an integer exceeding the number of significant figures in the binary expression in a computer. In the LWE problem in the fifth, tenth and fourteenth embodiments, j=1, ..., m, and the solutions are $(X_1, \ldots, X_m)^T$. The computation apparatuses 5, 10 and 14 replace j=1, ..., m in the fifth, tenth and fourteenth embodiments with t"=0, 1, 2, ..., m to obtain and output the candidate value of the solution $X=(X_0, X_1, \ldots, X_m)^T$ of the LWE problem of Formulae (62) and (63). Note that $$\begin{pmatrix} s'' & a''^{(L'')}_{1,1} & \cdots & a''^{(L'')}_{1,m} \\ s'' & a''^{(L'')}_{2,1} & \cdots & a''^{(L'')}_{2,m} \\ s'' & a''^{(L'')}_{3,1} & \cdots & a''^{(L'')}_{3,m} \\ \vdots & \vdots & \ddots & \vdots \\ s'' & a''^{(L'')}_{n,1} & \cdots & a''^{(L'')}_{n,m} \end{pmatrix}$$

$$\begin{pmatrix} X_0 \\ X_1 \\ \vdots \\ X_m \end{pmatrix}$$

$$\begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix}$$

in Formula (63) respectively correspond to $$\begin{pmatrix} a_{11} & \cdots & a_{1m} \\ a_{21} & \cdots & a_{2m} \\ a_{31} & \cdots & a_{3m} \\ \vdots & \ddots & \vdots \\ a_{n1} & \cdots & a_{nm} \end{pmatrix}$$

$$\begin{pmatrix} X_1 \\ \vdots \\ X_m \end{pmatrix}$$

$$\begin{pmatrix} g_1 \\ g_2 \\ g_3 \\ \vdots \\ g_n \end{pmatrix}$$

in Formulae (10), (33) and (40). The candidate value of the solution $X=(X_0, X_1, \ldots, X_m)^T$ into the LWE problem processor 152. The LWE problem processor 152 selects solution candidates of m sets of solutions X in an ascending order of the length $\|d\|$ of the corresponding $d=(d_1, \ldots, d_n)^T$ among the candidate values of the solution X, and sets the selected solution candidates of the m sets of solution X to $(W_{0,\kappa''}^{(L'')}, W_{1,\kappa''}^{(L'')}, \ldots, W_{m,\kappa''}^{(L'')})^T$ ($\kappa''=1, 2, \ldots, m$). The LWE problem processor 152 uses $(W_{0,\kappa''}^{(L'')}, W_{1,\kappa''}^{(L'')}, \ldots, W_{m,\kappa''}^{(L'')})^T$ to set and output the following $W^{(L'')}$.

$$W^{(L'')} = \begin{pmatrix} W^{(L'')}_{0,1} & W^{(L'')}_{0,2} & \cdots & W^{(L'')}_{0,m} \\ W^{(L'')}_{1,1} & W^{(L'')}_{1,2} & \cdots & W^{(L'')}_{1,m} \\ \vdots & \vdots & \ddots & \vdots \\ W^{(L'')}_{m,1} & W^{(L'')}_{m,2} & \cdots & W^{(L'')}_{m,m} \end{pmatrix}$$

<<Step S153a>>

Next, the activation function arithmetic unit 153 outputs $a''^{(L''+1)}_{j,\kappa''}$ ($1 \leq j, \kappa'' \leq m$) while setting as follows (step S153a).

$$\begin{pmatrix} a''^{(L''+1)}_{1,1} & a''^{(L''+1)}_{1,2} & \cdots & a''^{(L''+1)}_{1,m} \\ a''^{(L''+1)}_{2,1} & a''^{(L''+1)}_{2,2} & \cdots & a''^{(L''+1)}_{2,m} \\ a''^{(L''+1)}_{3,1} & a''^{(L''+1)}_{3,2} & \cdots & a''^{(L''+1)}_{3,m} \\ \vdots & \vdots & \ddots & \vdots \\ a''^{(L''+1)}_{n,1} & a''^{(L''+1)}_{n,2} & \cdots & a''^{(L''+1)}_{n,m} \end{pmatrix} =$$

$$\Psi \left( \begin{pmatrix} 1 & a''^{(L'')}_{1,1} & \cdots & a''^{(L'')}_{1,m} \\ 1 & a''^{(L'')}_{2,1} & \cdots & a''^{(L'')}_{2,m} \\ 1 & a''^{(L'')}_{3,1} & \cdots & a''^{(L'')}_{3,m} \\ \vdots & \vdots & \ddots & \vdots \\ 1 & a''^{(L'')}_{n,1} & \cdots & a''^{(L'')}_{n,m} \end{pmatrix} W^{(L'')} \right)$$

<<Step S154>>

The controller 154 decides whether L''=D''−2 or not. IF not L''=<D''−2, L''+1 is set as a new L'' and the processing returns to the process in step S152a. If L''=D''−2, the processing proceeds to the next step S152b.

<<Step S152b>>

For L''=D''−1, the following processes are executed.

The LWE problem processor 152 transmits the LWE problem of the following Formula (63) to any of the compulation apparatuses 5, 10 and 14. The computation apparatuses 5, 10 and 14 having received the LWE problem solve the following Formula (63) as described above, and generate and output the solution $X=(X_0, X_1, \ldots, X_m)^T$.

$$\begin{pmatrix} s'' & s''a''^{(D''-1)}_{1,1} & \cdots & s''a''^{(D''-1)}_{1,m} \\ s'' & s''a''^{(D''-1)}_{2,1} & \cdots & s''a''^{(D''-1)}_{2,m} \\ s'' & s''a''^{(D''-1)}_{3,1} & \cdots & s''a''^{(D''-1)}_{3,m} \\ \vdots & \vdots & \ddots & \vdots \\ s'' & s''a''^{(D''-1)}_{n,1} & \cdots & s''a''^{(D''-1)}_{n,m} \end{pmatrix} \begin{pmatrix} X_0 \\ X_1 \\ \vdots \\ X_m \end{pmatrix} \bmod N \approx \begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix} \quad (64)$$

Note that Formula (64) is equivalent to the LWE problem in the following Formula (65).

$$\begin{pmatrix} s'' & s''a''^{(D''-1)}_{1,1} & \cdots & s''a''^{(D''-1)}_{1,m} \\ s'' & s''a''^{(D''-1)}_{2,1} & \cdots & s''a''^{(D''-1)}_{2,m} \\ s'' & s''a''^{(D''-1)}_{3,1} & \cdots & s''a''^{(D''-1)}_{3,m} \\ \vdots & \vdots & \ddots & \vdots \\ s'' & s''a''^{(D''-1)}_{n,1} & \cdots & s''a''^{(D''-1)}_{n,m} \end{pmatrix} \begin{pmatrix} X_0 \\ X_1 \\ \vdots \\ X_m \end{pmatrix} + \begin{pmatrix} d_0 \\ d_1 \\ d_3 \\ \vdots \\ d_n \end{pmatrix} \bmod N = \begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix} \quad (65)$$

Note that $$\begin{pmatrix} s'' & s''a''^{(D''-1)}_{1.1} & \cdots & s''a''^{(D''-1)}_{1.m} \\ s'' & s''a''^{(D''-1)}_{2.1} & \cdots & s''a''^{(D''-1)}_{2.m} \\ s'' & s''a''^{(D''-1)}_{3.1} & \cdots & s''a''^{(D''-1)}_{3.m} \\ \vdots & \vdots & \ddots & \vdots \\ s'' & s''a''^{(D''-1)}_{n.1} & \cdots & s''a''^{(D''-1)}_{n.m} \end{pmatrix}$$

$$\begin{pmatrix} X_0 \\ X_1 \\ \vdots \\ X_m \end{pmatrix}$$

$$\begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix}$$

in Formula (65) respectively correspond to $$\begin{pmatrix} a_{11} & \cdots & a_{1m} \\ a_{21} & \cdots & a_{2m} \\ a_{31} & \cdots & a_{3m} \\ \vdots & \ddots & \vdots \\ a_{n1} & \cdots & a_{nm} \end{pmatrix}$$

$$\begin{pmatrix} X_1 \\ \vdots \\ X_m \end{pmatrix}$$

$$\begin{pmatrix} g_1 \\ g_2 \\ g_3 \\ \vdots \\ g_n \end{pmatrix}$$

in Formulae (10), (33) and (40). The solution $X=(X_0, X_1, \ldots, X_m)^T$ is input into the LWE problem processor 152. The LWE problem processor 152 sets the solution $X=(X_0, X_1, \ldots, X_m)^T$ to $(W_{0,1}^{(D''-1)}, W_{1,1}^{(D''-1)}, \ldots, W_{m,1}^{(D''-1)})^T$. The LWE problem processor 152 uses $(W_{0,1}^{(D''-1)}, W_{1,1}^{(D''-1)}, \ldots, W_{m,1}^{(D''-1)})^T$ to set and output the following $W^{(D''-1)}$.

$$W^{(D''-1)} = \begin{pmatrix} W_{0,1}^{(D'-1)} \\ W_{1,2}^{(D'-1)} \\ \vdots \\ W_{m,1}^{(D'-1)} \end{pmatrix}$$

<<Step S153b>>

Next, the activation function arithmetic unit 153 outputs $a''^{(D''+1)}_{j,1}$ ($1 \leq j \leq m$) while setting as follows.

$$\begin{pmatrix} a''^{(D'')}_{1,1} \\ a''^{(D'')}_{2,2} \\ a''^{(D'')}_{3,1} \\ \vdots \\ a''^{(D'')}_{n,2} \end{pmatrix} = \Psi \begin{pmatrix} \begin{pmatrix} 1 & a''^{(D''-1)}_{1.1} & \cdots & a''^{(D''-1)}_{1.m} \\ 1 & a''^{(D''-1)}_{2.1} & \cdots & a''^{(D''-1)}_{2.m} \\ 1 & a''^{(D''-1)}_{3.1} & \cdots & a''^{(D''-1)}_{3.m} \\ \vdots & \vdots & \ddots & \vdots \\ 1 & a''^{(D''-1)}_{n.1} & \cdots & a''^{(D''-1)}_{n.m} \end{pmatrix} W^{(D''-1)} \end{pmatrix}$$

The learning apparatus 150 outputs the obtained $W^{(1)}, \ldots, W^{D''-1}$ as the weights of the neural network.

OTHER MODIFICATION EXAMPLES ETC.

The present invention is not limited to the embodiments described above. For example, the various processes described above are not necessarily executed in a temporal sequence. The processes may be executed in parallel or separately according, to the processing capability or necessity of the apparatus that executes the processes. Alternatively, it is a matter of course that appropriate change may be made in a range without departing the spirit of the present invention.

The classical computers 11, 21, 13, 71, 73, 101, 103 and 111, the controllers 14 and 74, the decision apparatus 3, and the computation apparatuses 4 to 6 are configured by a general-purpose or dedicated computer executing a predetermined program, the computer including a processor (hardware processor), such as a CPU (central processing unit), and memories, such as a RAM (random-access memory) and a ROM (read-only memory), for example. The computer may include one processor and a memory, or multiple processors and memories. The program may be installed in the computer, or preliminarily stored in a ROM or the like. The processing circuitry, such as a CPU, which is an electronic circuit for achieving the functional configuration by reading the program, is not necessarily used. Alternatively, processing circuitry that is an electronic circuit of achieving the processing functions without using the program may constitute some or all of the arithmetic units. Alternatively, an electronic circuit constituting one apparatus may include multiple CPUs. The quantum computers 12, 72 and 112, the quantum state generators 72a, 72b, 112a and 112b, the swap testers 72c and 112c are each made up of a publicly known quantum computer (processing circuitry by a quantum computer).

Hereinafter, a specific configuration example of the quantum computer is described.

1. Scheme type based on quantum gate (quantum circuit): a quantum gate type quantum computer is a quantum computer that achieves computation by sequentially applicating basic operations called quantum gates to quantum bits. The quantum gate application order can be described as a quantum circuit. The quantum gate type quantum computer applies, to the quantum bits, a manipulation corresponding to the quantum gate. This application sequentially changes the encoded quantum state in the set of quantum bits (qubits). Lastly, the quantum state is observed, thereby obtaining a computation result. The quantum gate type quantum computer is the most orthodox scheme and has a long research history, and its hardware development has been advanced (see Reference literature 12). Many corporations, such as IBM, Google, Intel, Rigetti, and IonQ, have been developing quantum computers based on this scheme. As of 2018, the scale reached several tens of qubits.

[Reference literature 12] Michael A. Nielsen and Isaac L. Chuang, Quantum Computation and Quantum Information, Cam-bridge: Cambridge University Press (2000) ISBN 0-521-63235-8, MR 1796805.

2. Adiabatic quantum computation: a quantum computer based on adiabatic quantum computation executes computation by adiabatically changing the physical system from a simple Hamiltonian to a (complex) Hamiltonian that describes a solution for a problem with a basis state being given. The adiabatic quantum computation has been proven to be equivalent to the quantum circuit model in a polynomial time (see Reference literature 13).

[Reference literature 13] Farhi, E.; Goldstone, J.; Gutmann, S.; Sipser, M. (2000). "Quantum Computation by Adiabatic Evolution".arXiv:quant-ph/0001106v1Freely accessible.

Quantum annealing has also been known as a scheme similar to the adiabatic quantum computation (see Reference literature 14). As of 2018, D-Wave Systems, Inc. in Canada was selling 2048-qubit quantum computers based on quantum annealing. Multiple research institutes have introduced the computer.

[Reference literature 14] Kadowaki, T.; Nishimori, H. (1998 Nov. 1). "Quantum annealing in the transverse Ising model". Physical Review E. 58: 5355. arXiv:cond-mat/9804280Freely accessible. Bibcode: 1998PhRvE.58.5355K. doi: 10.1103/PhysRevE.58.5355.

3. Topological quantum computation: a quantum computer based on topological quantum computation is a quantum computer using unidentified elementary particles called Majorana fermions, which have theoretically been predicted to exist but have not been experimentally identified yet, and is equivalent to a quantum computer based on a quantum circuit (see Reference literature 15). This computer is more resistant to quantum errors than the quantum circuit scheme one, and is believed to be advantageous to increase in scale.

[Reference literature 15] Freedman, Michael; Kitaev, Alexei; Larsen, Michael; Wang, Zhenghan (2003 Jan. 1). "Topological quantum computation". Bulletin of the American Mathematical Society. 40 (1): 3138. arXiv:quant-ph/0101025Freely accessible. doi:10.1090/S0273-0979-02-00964-3. ISSN 0273-0979.

4. Observation-based quantum computation (one-way quantum computation): a quantum computer based on observation-based quantum computation executes computation by preparing many entangled qubits, sequentially observing these qubits from an end, and changing the observation basis for the next time depending on the observation result. The observation-based quantum computation has been proven to be equivalent to the quantum circuit model in a polynomial time (see Reference literature 16).

[Reference literature 16] R. Raussendorf; D. E. Browne & H. J. Briegel (2003). "Measurement based Quantum Computation on Cluster States". Phys. Rev. A. 68 (2): 022312. arXiv:quant-ph/0301052Freely accessible. Bibcode: 2003PhRvA.68b2312R. doi:10.1103/PhysRevA.68.022312.

While large resources related to hardware are required to obtain correct solutions in the eleventh to fourteenth embodiments, use of these embodiments can solve a higher-order lattice problem. Meanwhile, the seventh to tenth embodiments do not require large resources as in the eleventh to fourteenth embodiments, but cannot solve a higher-order lattice problem. This is because the methods in the seventh to tenth embodiments do not have parameters that can be adjusted in conformity with the difficulty of the problem; the parameters include, for example, the order of the space in which the lattice is embedded as described in the eleventh to fourteenth embodiments. Accordingly, it is desirable to use the appropriate one of the methods in consideration of their advantages and drawbacks.

To achieve the configuration described above through a computer (a classical computer and a quantum computer), the processing details of functions to be included in each apparatus are written in a program. Execution of the program on the computer achieves the processing functions on the computer. The program including the processing details written therein can be recorded in a computer-readable recording medium. An example of the computer-readable recording medium is a n on-transitory recording medium. Such an example of the recording medium is a magnetic recording apparatus, an optical disk, a magnetooptical recording medium, a semiconductor memory or the like.

The program is distributed through selling, transferring, lending or the like of a portable recording medium recorded with the program, such as a DVD or CD-ROM. Alternatively, a configuration may be adopted where the program is stored in a storage apparatus of a server computer, and the program is transmitted from the server computer to another computer via the network, thereby distributing the program.

For example, first, the computer that executes such a program temporarily stores, in its storage apparatus, the program stored in the portable recording medium or the program transmitted from the server computer. In execution of the processes, the computer reads the program stored in its storage apparatus, and executes the processes according to the read program. In another execution form of the program, the computer may directly read the program from the portable recording medium and execute the processes according to the program, and further execute the processes according to the received program every time of transmission of the program from the server computer to the computer. Another configuration may be adopted that does not transmit the program from the server computer to the computer but executes the processes described above through a service that is called an ASP (Application Service Provider) service, which achieves the processing functions only through an execution instruction and an acquisition of a result.

The processing functions of this apparatus may be achieved not necessarily by executing a predetermined program on a computer. Alternatively, at least some of these processing functions may be achieved by hardware.

INDUSTRIAL APPLICABILITY

Hereinafter, the industrial applicability of the present invention is exemplified. However, such applicability is only an example, and does not limit the present invention. Use of the present invention can efficiently solve a sub-problem of a lattice problem that is a type of a combinatorial optimization problem. Accordingly, effects are exerted in two industrial fields, for example. These are the artificial intelligence field, and the post-quantum cryptography field.

For example, the application of the present invention can efficiently solve (at high speed) the sub-problem of the combinatorial optimization problem in the artificial intelligence field. For example, implementation of the present invention using a gate type quantum computer and a classical computer can achieve high-speed simulation of various events on industries, materials, medical care, pharmaceutics, energy, physics, chemistry, economy, social world or the like using artificial intelligence, thereby contributing to rapid improvement and development of each field.

Hereinafter, description is made more specifically. The closest vector problem, shortest vector problem, and LWE are each an NP-hard problem. It has been known that any NP (Non-deterministic Polynomial time complexity class) problem can efficiently be reduced to these problems. Solving the reduced problem can obtain a solution for the original NP problem. Consequently, the quantum algorithm proposed in the present invention is applicable to all the NP problems, for example. The NP problems include many important problems specifically including those on artificial intelligence. Accordingly, the industrial applicability is significantly wide. Typical application examples are listed.

1. Selection of optimal path during vehicle automatic drive:

Selection of optimal path during vehicle automatic drive is formulated as the NP-complete problem called the traveling salesman problem. This problem has been researched since a long time ago in the artificial intelligence field. The more the number of vertices is, the more difficultly the optimal solution is obtained by a classical computer. Accordingly, in recent years, application of a quantum computer (specifically, quantum annealing) to this problem has been actively researched.

2. Optimization of Large Scale Integrated Circuit:

A problem of optimizing a large scale integrated circuit is represented in logical formulae, which comes down to a constraint satisfaction problem. This problem is a typical problem in the artificial intelligence field, and has high usability. Accordingly, there is a long history of research by a classical algorithm. This problem is one of problems specifically regarded promising as application fields of quantum computers.

3. Optimization of Network Infrastructure:

Due to complexity explosion, it has been difficult to optimize urban functions, such as electricity, gas, waterworks systems, traffic and communication networks, and oil and gas pipelines, which have been increasing in size and complexity. It is expected to solve these problems through application of the quantum algorithm proposed in the present invention.

For example, a problem of selecting the optimal path during vehicle automatic drive comes down to a lattice problem by representing the combinations of paths in vectors. When the lengths of the paths have a certain length or less, the lattice problem is solved by encoding the vectors to have the certain distance or less from a lattice point, thereby allowing information about the paths to be obtained. For more detailed description on the method of formulating an NP-complete problem in a lattice problem, see the following Reference literature 17.

[Reference literature 17] Daniele Micciancio and Sha_ Goldwasser, Complexity of Lattice Problems: a cryptographic perspective, Kluwer Academic Publishers, The Kluwer International Series in Engineering and Computer Science, vol. 671 (2002).

For other NP-complete problems, see the following literature.

[Reference literature 18] Michael R. Garey and David S. Johnson, Computers and Intractability: A Guide to the Theory of NP-Completeness, W H Freeman & Co (1979).

Professionals predict that there is no method of efficiently solving exact solutions of all NP problems by a classical computer (P versus NP problem). To deal with an NP problem by a classical computer for the purpose of industrial application, selection is imposed as to whether to use an approximate computation result at the cost of the precision of the solution or to put a limitation to a sub-problem in order to obtain the exact solution. However, use of the quantum algorithm of the present invention can significantly improve the precision of a computation result, and alleviate the condition of limitation to the sub-problem. As a result, services having not been provided can be provided.

In the post-quantum cryptography field, there is a possibility that the security of the conventional lattice cryptography is damaged by the present invention. To compensate for vulnerability, measures of increasing the length of a key are required. However, change in the length of the key may degrade the cryptographic efficiency. Utilization of the present invention for evaluating the security of the lattice cryptography and for evaluating the cryptographic efficiency is expected to contribute to the development of the cryptographic scheme of solving these problems.

What is claimed is:

1. A computation apparatus, comprising
processing circuitry configured to implement an initial setter, a basis selector, a representative selector, a child node generator, a classical computer, a node selector, a controller, a first quantum state generator, a second quantum state generator, and a swap tester, wherein n, N, v(D) and D are positive integers; i=1, . . . , n; $i_m$ is an imaginary unit; $\eta^T$ is a transpose of $\eta$; $|\Lambda|$ is the number of elements of $\Lambda$; $\|\eta\|$ is a length of $\eta$; $\eta1 \subseteq \eta2$ represents that $\eta1$ is a subset of $\eta2$; $\eta1 \subset \eta2$ represents that $\eta1$ is a proper subset of $\eta2$; $<\tau, \chi>$ is an inner product of $\tau$ and $\chi$; $B=\{b_1, \ldots, b_n\}$ is a basis made up of linearly independent n-dimensional vectors $b_i$; each of the n-dimensional vectors $b_i$ has n integer elements; L(B) is a lattice $\{\Sigma_{i=1,\ldots,n} x_i b_i | x_i \in Z, b_i \in B\}$; $L(B^-)$ is a dual lattice $L(B^-)$ of modulo N and is defined for the basis B and the integer N; $x_i$ is an integer; $B^-$ is a dual basis of B of modulo N; $R \subseteq Z^n$ is a partial region belonging to an n-dimensional space made up of integer elements; and $t=(t_1, \ldots, t_n)^T$ is a target vector having n integer elements $t_i$, the initial setter is configured to receive a pair (B, t) as an input, and set a node $(B_0, t(0))=(B, t)$ made up of a pair of a basis $B_0$ and a target vector $t(0)$, the basis selector is configured to select a basis $B_D$ of a sub-lattice $L(B_D) \subset L(B_{D-1})$ of a lattice $L(B_{D-1})$, the representative selector is configured to assume $(c_{D,0}+L(B_D)) \cup (c_{D,1}+L(B_D)) \cup \ldots \cup (c_{D,v(D)-1}+L(B_D))=L(B_{D-1})$, select representatives $c_{D,0}, c_{D,1}, \ldots, c_{D,v(D)-1}$ satisfying a condition that $(c_{D,\kappa1}+L(B_D)) \cap (c_{D,\kappa2}+L(B_D))$ is empty, when $\kappa1 \neq \kappa2$ for arbitrary $\kappa1$ and $\kappa2$ that are equal to or more than 0 and equal to or less than v(D), where each of the representatives $c_{D,0}, c_{D,1}, \ldots, c_{D,v(D)-1}$ is an n-dimensional vector having integer elements, the child node generator is configured to select a node $(B_D, t(D-1)-c_{D,k'})$ for $k'=0,1, \ldots, v(D)-1$, as a child node of a node $(B_{D-1}, t(D-1))$, the classical computer is configured to use the basis $B_D$ and the integer N and obtain and output the dual basis $B_D^-$, the first quantum state generator is configured to generate a plurality of registers in a following quantum state $$|\varphi\rangle_{D,0} = \frac{1}{\sqrt{|(R \cap L(\overline{B}_D))|}} \sum_{x \in R \cap L(\overline{B}_D)} |x\rangle,$$

the second quantum state generator is configured to perform quantum manipulation for one or some of the registers in a quantum state $|\phi\rangle_{D,0}$ to cause a quantum state of the register(s) subjected to the quantum manipulation to transition to $$|\varphi\rangle_{t(D,k')} = \frac{1}{\sqrt{|(R \cap L(\overline{B}_D))|}} \sum_{x \in R \cap L(\overline{B}_D)} e^{2\pi i m \langle t(D-1)-C_{D,k'}, x \rangle/N}|x\rangle,$$

the swap tester is configured to execute a swap test for each pair of the register that stores the quantum state $|\phi\rangle_{D,0}$ and the register that stores a quantum state $|\phi\rangle_{t(D,k')}$ for k'=0, 1, . . . ,ν(D)−1, and decide whether a result of the swap test for the pair of the quantum state $|\phi\rangle_0$ and the quantum state $|\phi\rangle_{t(D,k')}$ is receipt or denied, the node selector is configured to use a result of the swap test, compute a probability $p_{D,k'}$ that the result of the swap test for the pair of the quantum state $|\phi\rangle_{D,0}$ and the quantum state $|\phi\rangle_{t(D,k')}$ is receipt, and select a node $(B_D, t(D-1)-c_{D,kmax})$ corresponding to a highest probability $p_{D,kmax}$ among the probabilities $p_{D,0}, \ldots, p_{D,\nu(D)-1}$, where kmax∈{0, 1, . . . , ν(D)−1}, and the controller is configured to obtain a shortest difference vector $t^{(BD, d)}$ between $t(D-1)-c_{D,kmax}$ and a lattice $L(B_D)$, to output the difference vector $t^{(BD, d)}$ as a difference vector $t^{(d)}$ and output a closest vector $t^{(BD, c)}=t-t^{(BD, d)} \in L(B_D)$ as a closest vector $t^{(c)}$ when a length of the difference vector $t^{(BD, d)}$ is smaller than a reference value, and to execute control of setting D+1 as a new D and further setting $t(D)=t(D-1)-c_{D,kmax}$ and of re-executing processes of the basis selector, the representative selector, the child node generator, the classical computer, the first quantum state generator, the second quantum state generator, the swap tester, the node selector, and the controller when the length of the difference vector $t^{(BD, d)}$ is equal to or more than the reference value.

2. A computation apparatus receiving a basis B as an input, and outputting a shortest vector to a lattice point closest to an origin in a lattice L(B), comprising processing circuitry configured to implement a basis generator, a setter, and a selector, wherein n is a positive integer, $B=\{b_1, \ldots, b_n\}$ is a basis made up of n linearly independent n-dimensional vectors $b_i$, each of the n-dimensional vectors $b_i$ has n integer elements, and L(B) is a lattice $\{\Sigma_{i=1, \ldots, n} x_i b_i | x_i \in Z, b_i \in B\}$, the basis generator is configured to set $B_i=\{b_1, \ldots, b_{i-1}, 2b_i, b_{i+1}, \ldots, b_n\}$ for all i=1, . . . ,n, the setter is configured to set, as $t_i^{(d)}$, the difference vector $t^{(d)}$ obtained by setting $B=B_i$ and $t=b_i$ and executing processes of the computation apparatus according to claim 1, and the selector is configured to output, as the shortest vector, a shortest one among $t_1^{(d)}, \ldots, t_n^{(d)}$ obtained by the setter.

3. A computation apparatus receiving n-dimensional vectors $a_j$ and g and an integer N as inputs, and outputting $(X_1, \ldots, X_m)^T$ satisfying $$\begin{pmatrix} a_{11} & \cdots & a_{1m} \\ a_{21} & \cdots & a_{2m} \\ a_{31} & \cdots & a_{3m} \\ \vdots & \ddots & \vdots \\ a_{n1} & \cdots & a_{nm} \end{pmatrix} \begin{pmatrix} X_1 \\ \vdots \\ X_{m'} \end{pmatrix} \begin{pmatrix} d_1 \\ d_2 \\ d_3 \\ \vdots \\ d_n \end{pmatrix} \mod N = \begin{pmatrix} g_1 \\ g_2 \\ g_3 \\ \vdots \\ g_n \end{pmatrix}$$

comprising processing circuitry configured to implement a first classical computer, a first quantum state generator, a second quantum state generator, a swap tester, a selector, and a second classical computer, wherein n, m and N are positive integers; i=n; j=m; $i_m$ is an imaginary unit; $\eta^T$ is a transpose of η; |Λ| is the number of elements of Λ; $\langle \tau, \chi \rangle$ is an inner product of τ and χ; η1 ⊆ η2 represents that η1 is a subset of η2; $B=\{b_1, \ldots, b_n\}$ is a basis made up of linearly independent n-dimensional vectors $b_i$; each of the n-dimensional vectors $b_i$ has n integer elements; L(B) is a lattice $\{\Sigma_{i=1, \ldots, n} x_i b_i | x_i \in Z, b_i \in B\}$; $L(B^-)$ is a dual lattice $L(B^-)$ of modulo N and is defined for the basis B and the integer N; $x_i$ is an integer; $B^-$ is a dual basis of B of modulo N; $R \subseteq Z^n$ is a partial region belonging to an n-dimensional space made up of integer elements; $a_j$ is an n-dimensional vector $a_j=(a_{ij}, \ldots, a_{nj})^T$ having n integer elements $a_{1j} \ldots a_{nj}$; g is an n-dimensional vector $g=(g_1, \ldots, g_n)^T$ having n elements $g_i, \ldots, g_n$; d is an n-dimensional vector $d=(d_1, \ldots, d_n)^T$ having n elements $d_1, \ldots, d_n$; and $\varepsilon_u$ is an n-dimensional unit vector $\varepsilon_u=(0, \ldots, 1, 0, \ldots, 0)^T$ where a u-th element is 1 and other elements are 0, each of $X_1, \ldots, X_m$ is obtained by a process corresponding to any of depths D=1, . . . , m, $X_j$ obtained by the process corresponding to the depth D is $X_{j(D)} \in \{X_1, \ldots, X_m\}$, a value of $X_{j(D)}$ obtained by the process corresponding to the depth D is $a_{j(D)}$, the n-dimensional vector $a_j$ corresponding to $X_j$ obtained by the process corresponding to the depth D is $a_{j(D)} \in \{a_1, \ldots, a_m\}$, $A_{D-1}=(a_{j(D)} a_{j(D+1)} \cdot \cdot \cdot a_{j(m)})$, $X'_{D-1}=(X_{j(D)}, X_{j(D+1)}, \ldots, X_{j(m)})^T$, and $$g'_{D-1} = g - \sum_{j'=1}^{D-1} \alpha_{j(j')} a_{j(j')}$$

the first classical computer is configured to obtain and output a dual basis $B_D^-$ of modulo N, of an LLL-reduced basis $B_D$ of a lattice defined by $\{a_{j(D+1)}^T a_{j(D+2)}^T \ldots a_{j(m)}^T N\varepsilon_1^T \ldots N\varepsilon_n^T\}$, in the process corresponding to the depth D, the first quantum state generator is configured to generate a plurality of registers in a quantum state $$|\varphi\rangle_{D,0} = \frac{1}{\sqrt{|(R \cap L(\overline{B}_D))|}} \sum_{x \in R \cap L(\overline{B}_D)} |x\rangle$$

in the process corresponding to the depth D, the second quantum state generator is configured to perform quantum manipulation for one or some of the registers in a quantum state $|\phi\rangle_{D,0}$ to cause a quantum state of the register(s) subjected to the quantum manipulation to transition to $$|\varphi\rangle_{t(D,j')} = \frac{1}{\sqrt{|(R \cap L(\overline{B}_D))|}} \sum_{x \in R \cap L(\overline{B}_D)} e^{2\pi i m \langle g_{D-1}^T - j' \cdot a_{j(D)}^T, x \rangle / N} |x\rangle$$

for j'=0, 1, 2, . . . , N−1, in the process corresponding to the depth D, the swap tester is configured to execute a swap test for each pair of the register that stores the quantum state $|\phi\rangle_{D,0}$ and the register that stores a quantum state $|\phi\rangle_{t(D,j')}$ for j'=0, 1, 2, . . . , N−1, and decide whether a result of the swap test for the pair of the quantum state $|\phi\rangle_{D,0}$ and the quantum state $|\phi\rangle_{t(D,j')}$ is receipt or denied, in the process corresponding to the depth D, the selector is configured to use a result of the swap test and compute a probability $p_{D,j'}$ that a result of the swap test for the pair of the quantum state $|\phi\rangle_{D,0}$ and the quantum state $|\phi\rangle_{t(D,j')}$ is receipt, output, as $a_{j(D)}$, jmax∈{0, 1, 2, . . . , N−1} corresponding to a highest probability $p_{D,jmax}$ among the probabilities $p_{D,0}$, $p_{D,1}$, . . . , $p_{D,N-1}$, and further output $g_D' = g_{D-1}' - a_{j(D)} \cdot a_{j(D)}$, in the process corresponding to the depth D, and the second classical computer is configured to perform control of outputting $(X_1, \ldots, X_m)^T$ obtained by arranging $\alpha_{j(1)}, \ldots, \alpha_{j(m)}$ when the selector outputs $a_{j(D)}$ for all D=1, . . . , m, and of re-executing processes of the first classical computer, the first quantum state generator, the second quantum state generator, the swap tester, the selector and the second classical computer when the selector does not output $a_{j(D)}$ for any D=1, . . . , m.

4. A decision apparatus, comprising processing circuitry configured to implement a first classical computer, a first quantum state generator, a second quantum state generator, a first swap tester, a third quantum state generator, a fourth quantum state generator, a second swap tester, and a second classical computer, wherein n and n' are positive integers; n'>n; i=1, . . . , n; i'=1, . . . , n'; $i_m$ is an imaginary unit; $\eta^T$ is a transpose of $\eta$; $|\Lambda|$ is the number of elements of $\Lambda$; $\|\eta\|$ is a length of $\eta$; $\langle \tau, \chi \rangle$ is an inner product of $\tau$ and $\chi$; $\eta 1 \subseteq \eta 2$ represents that $\eta 1$ is a subset of $\eta 2$; B={$b_1$, . . . , $b_n$} is a basis made up of linearly independent n-dimensional vectors $b_i$; each of the n-dimensional vectors $b_i$ has n integer elements; L(B) is a lattice {$\Sigma_{i=1, \ldots, n} x_i b_i | x_i \in Z, b_i \in B$}; $x_i$ is an integer; β is a basis matrix that has n rows and n columns and includes the n-dimensional vectors $b_1, \ldots, b_n$ of the basis B as elements; α is a matrix made up of integer elements having n rows; t1=$(t_{1,1}, \ldots, t_{1,n})^T$ is a target vector having n integer elements $t_{1,i}$; t2=$(t_{2,1}, \ldots, t_{2,n})^T$ is a target vector having n integer elements $t_{2,i}$; $t1^{(d)}$ is a difference vector $t1^{(d)} = t1 - t1^{(c)} = (t_{1,1}^{(d)}, \ldots, t_{1,n}^{(d)})$ between the target vector t1 and a closest vector $t1^{(c)} \in L(B)$ of the target vector t1; and $t2^{(d)}$ is a difference vector $t2^{(d)} = t2 - t2^{(c)} = (t_{2,1}^{(d)}, \ldots, t_{2,n}^{(d)})$ between the target vector t2 and a closest vector $t2^{(c)} \in L(B)$ of the target vector t2, and the first classical computer is configured to select the matrix a where an Hermite normal form of a transposed matrix $\beta'^T$ of a matrix $\beta' = (\alpha \beta)$ obtained by arranging the matrix α and the basis matrix β in a horizontal direction is a matrix having diagonal elements of 1, obtain a unimodular matrix $\beta'^{-1}$ satisfying $\beta'^{-1} \beta'^T = H'$ for an Hermite normal form matrix H', set a basis made up of row vectors $b_1', \ldots, b_{n'}'$ of the matrix $\beta' = (b_1^{-1}, \ldots, b_n^{-1})^T$ as B', set a basis made up of row vectors $b_1^{-1}, \ldots, b_{n'}^{-1}$ of the unimodular matrix $\beta'^{-1} = (b_1^{-1}, \ldots, b_n^{-1})^T$ as B'$^{-1}$, and obtain a target vector $t1' = (t_{1,1}', \ldots, t_{1,n'}')^T \varepsilon \text{span}(B')$ having n' integer elements $t'_{1,i'}$ belonging to a space span(B') spanned by the basis B' and a target vector $t2' = (t_{2,1}', \ldots, t_{2,n'}')^T \varepsilon \text{span}(B')$ having n' integer elements $t'_{2,i'}$, Proj (t1')=(0, t1) and Proj(t2')=(0, t2), Proj (µ) represents a projection onto an n-dimensional vector space where first n'-n elements of µ are 0, L(B'$^{-1}$) is the lattice $L(B^{-1}) = \{\Sigma_{i'=1, \ldots, n'} x_{i'} b^{-1}_{i'} | x_{i'} \in Z, b^{-1}_{i'} \in B^{-1}\}$; $x_{i'}$ is an integer, and $R \subseteq Z^{n'}$ is a partial region belonging to the n'-dimensional space made up of integer elements, the first quantum state generator is configured to generate a plurality of registers in a following quantum state $$|\varphi\rangle_0 = \frac{1}{\sqrt{|(R \cap L(\overline{B'}))|}} \sum_{x \in R \cap L(\overline{B'})} |x\rangle,$$

the second quantum state generator is configured to perform quantum manipulation for one or some of the registers in a quantum state $|\phi\rangle_0$ to cause a quantum state of the register(s) subjected to the quantum manipulation to transition to $$|\varphi\rangle_{t1'} = \frac{1}{\sqrt{|(R \cap L(\overline{B'}))|}} \sum_{x \in R \cap L(\overline{B'})} e^{2\pi i m \langle t1', x \rangle} |x\rangle,$$

the first swap tester is configured to execute a swap test for each pair of the register that stores the quantum state $|\phi\rangle_0$ and the register that stores a quantum state $|\phi\rangle_{t1'}$, and decide whether a result of the swap test for the pair of the quantum state $|\phi\rangle_0$ and the quantum state $|\phi\rangle_{t1'}$ is receipt or denied, the third quantum state generator is configured to generate a plurality of registers in a following quantum state $$|\varphi\rangle_0 = \frac{1}{\sqrt{|(R \cap L(\overline{B'}))|}} \sum_{x \in R \cap L(\overline{B'})} |x\rangle,$$

the fourth quantum state generator is configured to perform quantum manipulation for one or some of the registers in the quantum state $|\phi\rangle_0$ to cause a quantum state of the register(s) subjected to the quantum manipulation to transition to $$|\varphi\rangle_{t2'} = \frac{1}{\sqrt{|(R \cap L(\overline{B'}))|}} \sum_{x \in R \cap L(\overline{B'})} e^{2\pi i m \langle t2', x \rangle} |x\rangle,$$

the second swap tester is configured to execute a swap test for each pair of the register that stores the quantum state $|\phi\rangle_0$ and the register that stores a quantum state $|\phi\rangle_{t2'}$, and decide whether a result of the swap test for the pair of the quantum state $|\phi\rangle_0$ and the quantum state $|\phi\rangle_{t2'}$ is receipt or denied, and the second classical computer is configured to use the result of the swap test and compute a probability $p_1$ that the result of the swap test for the pair of the quantum state $|\phi\rangle_0$ and the quantum state $|\phi\rangle_{t1}$ is receipt and a probability $p_2$ that the result of the swap test for the pair of the quantum state $|\phi\rangle_0$ and the quantum state $|\phi\rangle_{t2}$ is receipt, and output information indicating that $\|t1^{(d)}\| \leq \|t2^{(d)}\|$ when $p_1 \geq p_2$ and output information indicating that $\|t1^{(d)}\| > \|t2^{(d)}\|$ when $p_1 < p_2$, or output information indicating that $\|t1^{(d)}\| < \|t2^{(d)}\|$ when $p_1 > p_2$ and output information indicating that $\|t1^{(d)}\| \geq \|t2^{(d)}\|$ when $p_1 \leq p_2$.

5. A computation apparatus, comprising processing circuitry configured to implement an initial setter, a basis selector, a representative selector, a child node generator, a classical computer, a node selector, a controller, a first quantum state generator, a second quantum state generator, and a swap tester, wherein n, n', N, $\nu(D)$ and D are positive integers; $n' > n$; $i=1, \ldots, n$; $i'=1, \ldots, n'$; $i_m$ is an imaginary unit; $\eta^T$ is a transpose of $\eta$; $|\Lambda|$ is the number of elements of $\Lambda$; $\|\eta\|$ is a length of $\eta$; $\eta1 \subseteq \eta2$ represents that $\eta1$ is a subset of $\eta2$, $\langle \tau, \chi \rangle$ is an inner product of $\tau$ and $\chi$; $\eta1 \subsetneq \eta2$ represents that $\eta1$ is a proper subset of $\eta2$; $B=\{b_1, \ldots, b_n\}$ is a basis made up of linearly independent n-dimensional vectors $b_i$; each of the n-dimensional vectors $b_i$ has n integer elements; $L(B)$ is a lattice $\{\Sigma_{i=1,\ldots,n} x_i b_i | x_i \in Z, b_i \in B\}$; $x_i$ is an integer; $R \subseteq Z^{n'}$ is a partial region belonging to an n'-dimensional space made up of integer elements; and $t=(t_1, \ldots, t_n)^T$ is a target vector having n integer elements $t_i$, the initial setter is configured to receive a pair $(B, t)$ as an input, and set a node $(B_0, t(0))=(B, t)$ made up of a pair of a basis $B_0$ and a target vector $t(0)$, the basis selector is configured to select a basis $B_D$ of a sub-lattice $L(B_D) \subset L(B_{D-1})$ of a lattice $L(B_{D-1})$, where $\beta_D$ is a basis matrix that has n rows and n columns and includes n-dimensional vectors $b_{D,1}, \ldots, b_{D,n}$ of the basis $B_D = \{b_{D,1}, \ldots, b_{D,n}\}$ as row vectors, and $\alpha_D$ is a matrix made up of integer elements having n rows, $$(c_{D,0}+L(B_D)) \cup (c_{D,1}+L(B_D)) \cup \ldots \cup (c_{D,\nu(D)-1}+L(B_D))=L(B_{D-1})$$

the representative selector is configured to select representatives $c_{D,0}, c_{D,1}, \ldots, c_{D,\nu(D)-1}$ satisfying a condition that $(c_{D,\kappa1}+L(B_D)) \cap (c_{D,\kappa2}+L(B_D))$ is empty when $\kappa1 \neq \kappa2$ for arbitrary $\kappa1$ and $\kappa2$ that are equal to 0 or more than 0 and equal to or less than $\nu(D)$, where each of the representatives $c_{D,0}, c_{D,1}, \ldots, c_{D,\nu(D)-1}$ is an n-dimensional vector having integer elements, the child node generator is configured to select a node $(B_D, t(D-1)-c_{D,k'})$ for $k'=0,1, \ldots, \nu(D)-1$, as a node $(B_{D-1}, t(D-1))$, the classical computer is configured to select the matrix $\alpha_D$ where an Hermite normal form of a transposed matrix $\beta_D'^T$ of a matrix $\beta_D'=(\alpha_D \ \beta_D)$ obtained by arranging the matrix $\alpha_D$ and the basis matrix $\beta_D$ in a horizontal direction is a matrix having diagonal elements of 1, obtain a unimodular matrix $\beta D^{-1}$ satisfying $\beta D^{-1} \beta_D'^T = H'$ for an Hermite normal form matrix $H'$, set a basis made up of row vectors $b_{D,1}', \ldots, b_{D,n}'$; of the matrix $\beta_D'=(b_{D,1}', \ldots, b_{D,n}')^T$ as $B_D'$, set a basis made up of row vectors $b_{D,1}^{-1}, \ldots, b_{D,n}^{-1}$ of the unimodular matrix $\beta D^{-1}=(b_{D,1}^{-1}, \ldots, b_{D,n}^{-1})^T$ as $B_D^{-1}$, and obtain a target vector $t(D)'=(t'_{D,1}, \ldots, t'_{D,n})^T \in \text{span}(B_D')$ having n' integer elements $t'_{D,i'}$ belonging to a space $\text{span}(B_D')$ spanned by the basis $B_D'$, $\text{Proj}(t'_{D-1,k'})=(0, t(D-1)-c_{D,k'})$, $\text{Proj}(\mu)$ represents a projection onto an n-dimensional vector space where first n'-n elements of $\mu$ are 0, $L(B^{-1})$ is the lattice $L(B^{-1})$ $\{\Sigma_{i=1,\ldots,n} x_i' b^{-1}_i | x_i \in Z, b^{-1}_i \in B^{-1}\}$, $x_i'$ is an integer, and $R \subseteq Z^{n'}$ is a partial region belonging to the n'-dimensional space made up of integer elements, the first quantum state generator is configured to generate a plurality of registers in a following quantum state $$|\varphi\rangle_{D,0} = \frac{1}{\sqrt{|(R \cap L(\overline{B}'_D))|}} \sum_{x \in R \cap L(\overline{B}'_D)} |x\rangle,$$

the second quantum state generator is configured to perform quantum manipulation for one or some of the registers in a quantum state $|\phi\rangle_{D,0}$ to cause a quantum state of the register(s) subjected to the quantum manipulation to transition to $$|\varphi\rangle_{t(D,k')} = \frac{1}{\sqrt{|(R \cap L(\overline{B}'_D))|}} \sum_{x \in R \cap L(\overline{B}'_D)} e^{2\pi i m \langle t'_{D-1,k'}, x \rangle} |x\rangle,$$

the swap tester is configured to execute a swap test for each pair of the register that stores the quantum state $|\phi\rangle_{D,0}$ and the register that stores a quantum state $|\phi\rangle_{t(D,k')}$ for $k'=0, 1, \ldots, \nu(D)-1$, and decide whether a result of the swap test for the pair of the quantum state $|\phi\rangle_0$ and the quantum state $|\phi\rangle_{t(D,k')}$ is receipt or denied, the node selector is configured to use a result of the swap test, compute a probability $P_{D,k'}$ that the result of the swap test for the pair of the quantum state $|\phi\rangle_{D,0}$ and the quantum state $|\phi\rangle_{t(D,k')}$ is receipt, and select a node $(B_D, t(D-1)-c_{D,kmax})$ corresponding to a highest probability $p_{D,kmax}$ among the probabilities $p_{D,0}, \ldots, p_{D,\nu(D)-1}$, where $kmax \in \{0, 1, \ldots, \nu(D)-1\}$, and the controller is configured to obtain a shortest difference vector $t^{(BD, d)}$ between $t(D-1)-c_{D,kmax}$ and a lattice $L(B_D)$, output the difference vector $t^{(BD, d)}$ as a difference vector $t^{(d)}$ and output a closest vector $t^{(BD, c)} = t-t^{(BD, d)} \in L(B_D)$ as a closest vector $t^{(c)}$ when a length of the difference vector $t^{(BD, d)}$ is smaller than a reference value, execute control of setting $D+1$ as a new $D$ and further setting $t(D)=t(D-1)-c_{D,kmax}$ and of re-executing processes of the basis selector, the representative selector, the child node generator, the classical computer, the first quantum state generator, the second quantum state generator, the swap tester, the node selector, and the controller, when the length of the difference vector $t^{(BD, d)}$ is equal to or more than the reference value.

6. A computation apparatus receiving a basis B as an input, and outputting a shortest vector to a lattice point closest to an origin in a lattice $L(B)$, comprising processing circuitry configured to implement a basis generator, a setter, and a selector, wherein n is a positive integer, $B=\{b_1, \ldots, b_n\}$ is a basis made up of n linearly independent n-dimensional vectors $b_i$, each of the n-dimensional vectors $b_i$ has n integer elements, and $L(B)$ is a lattice $\{\Sigma_{i=1,\ldots,n} x_i b_i | x_i \in Z, b_i \in B\}$, the basis generator is configured to set $B_i=\{b_1, \ldots, b_{i-1}, 2b_i, b_{i+1}, \ldots, b_n\}$ for all $i=1, \ldots, n$, the setter is configured to set, as $t_i^{(d)}$, the difference vector $t^{(d)}$ obtained by setting $B=B_i$ and $t=b_i$ and executing processes of the computation apparatus according to claim 5, and the selector is configured to output, as the shortest vector, a shortest one among $t_1^{(d)}, \ldots, t_n^{(d)}$ obtained by the setter.

7. A computation apparatus receiving n-dimensional vectors $a_j$ and g and an integer N as inputs, and outputting $(X_1, \ldots, X_m)^T$ satisfying $$\begin{pmatrix} a_{11} & \cdots & a_{1m} \\ a_{21} & \cdots & a_{2m} \\ a_{31} & \cdots & a_{3m} \\ \vdots & \ddots & \vdots \\ a_{n1} & \cdots & a_{nm} \end{pmatrix} \begin{pmatrix} X_1 \\ X_2 \\ \vdots \\ X_{m'} \end{pmatrix} \begin{pmatrix} d_1 \\ d_2 \\ d_3 \\ \vdots \\ d_n \end{pmatrix} \bmod N = \begin{pmatrix} g_1 \\ g_2 \\ g_3 \\ \vdots \\ g_n \end{pmatrix}$$

processing circuitry configured to implement a first classical computer, a first quantum state generator, a second quantum state generator, a swap tester, a selector, and a second classical computer, wherein n, n', m and N are positive integers; n'>n; i=1, ..., n; i'=1, ..., n'; j=1, ..., m; $i_m$ is an imaginary unit; $\eta^T$ is a transpose of $\eta$; |Λ| is the number of elements of Λ; <τ, χ> is an inner product of τ and χ; η1⊆η2 represents that η1 is a subset of η2; B= {$b_1, \ldots, b_n$} is a basis made up of linearly independent n-dimensional vectors $b_i$; each of the n-dimensional vectors $b_i$ has n integer elements; L(B) is a lattice {$\Sigma_{i=1,\ldots,n} x_i b_i | x_i \in Z, b_i \in B$}; $x_i$ is an integer; R⊆$Z^{n'}$ is a partial region belonging to an n'-dimensional space made up of integer elements; $a_j$ is an n-dimensional vector $a_j=(a_{1j}, \ldots, a_{nj})^T$ having n integer elements $a_{1j}, \ldots, a_{nj}$; g is an n-dimensional vector $g=(g_1, \ldots, g_n)^T$ having n elements $g_1, \ldots, g_n$; d is an n-dimensional vector $d=(d_1, \ldots, d_n)^T$ having n elements $d_1, \ldots, d_n$; and $\varepsilon_u$ is an n-dimensional unit vector $\varepsilon_u=(0, \ldots, 1, 0, \ldots, 0)^T$ where a u-th element is 1 and other elements are 0, each of $X_1, \ldots, X_m$ is obtained by a process corresponding to any D=1, ..., m, $X_j$ obtained by the process corresponding to the depth D is $X_{j(D)} \in \{X_1, \ldots, X_m\}$, a value of $X_{j(D)}$ obtained by the process corresponding to the depth D is $a_{j(D)}$, the n-dimensional vector $a_j$ corresponding to $X_j$ obtained by the process corresponding to the depth D is $a_{j(D)} \in (a_1, \ldots, a_m)$, $A_{D-1}=(a_{j(D)}\ a_{j(D+1)}\ \cdots\ a_{j(m)})$, $X'_{D-1}=(X_{j(D)}, X_{j(D+1)}, \ldots, X_{j(m)})^T$, and $g_{D-1}' = g - \Sigma_{j'=1}^{D-1} \alpha_{j(j')} a_{j(j')}$, the first classical computer is configured to obtain a basis matrix $\beta_D$ of an LLL-reduced basis $B_D$ of a lattice defined by $\{a_{j(D+1)}^T a_{j(D+2)}^T \ldots a_{j(m)}^T N\varepsilon_1^T \ldots N\varepsilon_n^T\}$, select the matrix $\alpha_D$ which has integer elements of n columns and in which an Hermite normal form of a transposed matrix $\beta_D'^T$ of a matrix $\beta_D'=(\alpha_D\ \beta_D)$ obtained by arranging the matrix $\alpha_D$ and the basis matrix $\beta_D$ in a horizontal direction is a matrix having diagonal elements of 1, obtain a unimodular matrix $\beta_D^{-1}$ satisfying $\beta_D^{-1}\beta_D'^T=H$ for an Hermite normal form matrix H', set a basis made up of row vectors $b_{D,1}', \ldots, b_{D,n'}'$ of the matrix $\beta_D'=(b_{D,1}', \ldots, b_{D,n'}')^T$ as $B_D'$, set a basis made up of row vectors $b_{D,1}^{-1}, \ldots, b_{D,n'}^{-1}$ of the unimodular matrix $\beta_D^{-1}=(b_{D,1}^{-1}, \ldots, b_{D,n'}^{-1})^T$ as $B_D^{-1}$, and obtain a target vector $t(D)'=(t'_{D,1}, \ldots, t'_{D,n'})^T \in span(B_D')$ having n' integer elements $t'_{D,i'}$ belonging to a space span($B_D'$) spanned by the basis $B_D'$, in the process corresponding to the depth D, Proj($t'_{D-1,j'}$)=$(0, g_{D-1}'^T - j' \cdot a_{j(D)}^T)$, Proj($\mu$) represents a projection onto an n'-dimensional vector space where first n'-n elements of $\mu$ are 0, L($B^{-1}$) is the lattice L($B^{-1}$)= {$\Sigma_{i'=1,\ldots,n'} x_i b^{-1}_{i'} | x_i \in Z, b^{-1}_{i'} \in B^{-1}$}, $x_i'$ is an integer, and R⊆$Z^{n'}$ is a partial region belonging to the n'-dimensional space made up of integer elements, the first quantum state generator is configured to, in the process corresponding to the depth D, generate a plurality of registers in a quantum state $$|\varphi\rangle_{D,0} = \frac{1}{\sqrt{|(R \cap L(\overline{B}_D'))|}} \sum_{x \in R \cap L(B_D')} |x\rangle,$$

the second quantum state generator is configured to perform quantum manipulation for one or some of the registers in a quantum state $|\phi\rangle_{D,0}$ to cause a quantum state of the register(s) subjected to the quantum manipulation to transition to $$|\varphi\rangle_{t(D,j')} = \frac{1}{\sqrt{|(R \cap L(\overline{B}_D'))|}} \sum_{x \in R \cap L(B_D')} e^{2\pi i m \langle t'_{D-1,j'}, x\rangle} |x\rangle$$

for j'=0, 1, 2, ..., N−1, in the process corresponding to the depth D, the swap tester is configured to execute a swap test for each pair of the register that stores the quantum state $|\phi\rangle_{D,0}$ and the register that stores a quantum state $|\phi\rangle_{t(D,j')}$ for j'=0, 1, 2, ..., N−1, and decide whether a result of the swap test for the pair of the quantum state $|\phi\rangle_{D,0}$ and the quantum state $|\phi\rangle_{t(D,j')}$ is receipt or denied, in the process corresponding to the depth D, the selector is configured to use a result of the swap test and compute a probability $p_{D,j'}$ that a result of the swap test for the pair of the quantum state $|\phi\rangle_{D,0}$ and the quantum state $|\phi\rangle_{t(D,j')}$ is receipt, output, as $a_{j(D)}$, jmax∈{0, 1, 2, ..., N−1} corresponding to a highest probability $p_{D,jmax}$ among the probabilities $p_{D,0}, p_{D,1}, \ldots, P_{D,N-1}$, and further output $g_D' = g_{D-1}' - a_{j(D)} \cdot a_{j(D)}$, in the process corresponding to the depth D, and the second classical computer is configured to perform control of outputting $(X_1, \ldots, X_m)^T$ obtained by arranging $\alpha_{j(1)}, \ldots, \alpha_{j(m)}$ when the selector outputs $a_{j(D)}$ for all D=1, ..., m, and of re-executing processes of the first classical computer, the first quantum state generator, the second quantum state generator, the swap tester, the selector and the second classical computer when the selector does not output $a_{j(D)}$ for any D=1, ..., m.

8. A learning system comprising a learning apparatus performing feed-forward neural network supervised learning, and the computation apparatus according to claim 3 or 7, wherein the learning apparatus includes processing circuitry configured to implement an initial setter, an LWE problem processor, and an activation function arithmetic unit, n, m, s" and $d_i$ are positive integers; i=1, 2, 3, ..., n; D" is an integer of 2 or more; a"$_{i,1}, \ldots,$ a"$_{i,m}$ and g"$_i$ are real numbers; and Ψ is an activation function, the learning apparatus receives, as inputs, a matrix $$A_t = \begin{pmatrix} a''_{1,1} & a''_{1,2} & \cdots & a''_{1,m} \\ a''_{2,1} & a''_{2,2} & \cdots & a''_{2,m} \\ a''_{3,1} & a''_{3,2} & \cdots & a''_{3,m} \\ \vdots & \vdots & \ddots & \vdots \\ a''_{n,1} & a''_{n,2} & \cdots & a''_{n,m} \end{pmatrix}$$

which has m-dimensional datasets $\{a''_{i,1}, \ldots, a''_{i,m}\}$ that are training data, a vector $$G'' = \begin{pmatrix} g''_1 \\ g''_2 \\ \vdots \\ g''_n \end{pmatrix}$$

having class labels $g''_i$ for the respective datasets $\{a''_{i,1}, \ldots, a''_{i,m}\}$, and a depth $D''$ of the feed-forward neural network, the initial setter uses a matrix $A_t$ to set $$\begin{pmatrix} a''^{(1)}_{1,1} & a''^{(1)}_{1,2} & \cdots & a''^{(1)}_{1,m} \\ a''^{(1)}_{2,1} & a''^{(1)}_{2,2} & \cdots & a''^{(1)}_{2,m} \\ a''^{(1)}_{3,1} & a''^{(1)}_{3,2} & \cdots & a''^{(1)}_{3,m} \\ \vdots & \vdots & \ddots & \vdots \\ a''^{(1)}_{n,1} & a''^{(1)}_{n,2} & \cdots & a''^{(1)}_{n,m} \end{pmatrix} = A_t,$$

in an order of $L''=1, 2, \ldots, D''-2$, (a) the LWE problem processor transmits a first LWE problem $$\begin{pmatrix} s'' & a''^{(L'')}_{1,1} & \cdots & a''^{(L'')}_{1,m} \\ s'' & a''^{(L'')}_{2,1} & \cdots & a''^{(L'')}_{2,m} \\ s'' & a''^{(L'')}_{3,1} & \cdots & a''^{(L'')}_{3,m} \\ \vdots & \vdots & \ddots & \vdots \\ s'' & a''^{(L'')}_{n,1} & \cdots & a''^{(L'')}_{n,m} \end{pmatrix} \begin{pmatrix} X_0 \\ X_1 \\ \vdots \\ X_m \end{pmatrix} + \begin{pmatrix} d_1 \\ d_2 \\ d_3 \\ \vdots \\ d_n \end{pmatrix} \mod N = \begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix}$$

to the computation apparatus,
(b) the computation apparatus generates and outputs candidate values of a solution $X=(X_0, X_1, \ldots, X_m)^T$ of the first LWE problem,
(c) the LWE problem processor selects the candidate values of m sets of solutions X of the first LWE problem corresponding to difference vectors $d=(d_1, \ldots, d_n)^T$ having a first to an m-th length $\|d\|$ in an ascending order, and sets the candidate value of the $\kappa''(1\leq\kappa''\leq m)$-th solution X as $(W_{0,\kappa''}^{(L'')}, W_{1,\kappa''}^{(L'')}, \ldots, W_{m,\kappa''}^{(L'')})^T$, and set $$W^{(L'')} = \begin{pmatrix} W^{(L'')}_{0,1} & W^{(L'')}_{0,2} & \cdots & W^{(L'')}_{0,m} \\ W^{(L'')}_{1,1} & W^{(L'')}_{1,2} & \cdots & W^{(L'')}_{1,m} \\ \vdots & \vdots & \ddots & \vdots \\ W^{(L'')}_{m,1} & W^{(L'')}_{m,2} & \cdots & W^{(L'')}_{m,m} \end{pmatrix}$$

(d) the activation function arithmetic unit sets $a''^{(L''+1)}_{j,\kappa''}$ $(1\leq j, \kappa''\leq m)$ satisfying $$\begin{pmatrix} a''^{(L''+1)}_{1,1} & a''^{(L''+1)}_{1,2} & \cdots & a''^{(L''+1)}_{1,m} \\ a''^{(L''+1)}_{2,1} & a''^{(L''+1)}_{2,2} & \cdots & a''^{(L''+1)}_{2,m} \\ a''^{(L''+1)}_{3,1} & a''^{(L''+1)}_{3,2} & \cdots & a''^{(L''+1)}_{3,m} \\ \vdots & \vdots & \ddots & \vdots \\ a''^{(L''+1)}_{n,1} & a''^{(L''+1)}_{n,2} & \cdots & a''^{(L''+1)}_{n,m} \end{pmatrix} = \Psi\left(\begin{pmatrix} 1 & a''^{(L'')}_{1,1} & \cdots & a''^{(L'')}_{1,m} \\ 1 & a''^{(L'')}_{2,1} & \cdots & a''^{(L'')}_{2,m} \\ 1 & a''^{(L'')}_{3,1} & \cdots & a''^{(L'')}_{3,m} \\ \vdots & \vdots & \ddots & \vdots \\ 1 & a''^{(L'')}_{n,1} & \cdots & a''^{(L'')}_{n,m} \end{pmatrix} W^{(L'')}\right)$$

after processes of above (a), (b), (c) and (d) are performed in the order of $L''=1, 2, \ldots, D''-2$, the LWE problem processor transmits a second LWE problem $$\begin{pmatrix} s'' & s''a''^{(D''-1)}_{1,1} & \cdots & s''a''^{(D''-1)}_{1,m} \\ s'' & s''a''^{(D''-1)}_{2,1} & \cdots & s''a''^{(D''-1)}_{2,m} \\ s'' & s''a''^{(D''-1)}_{3,1} & \cdots & s''a''^{(D''-1)}_{3,m} \\ \vdots & \vdots & \ddots & \vdots \\ s'' & s''a''^{(D''-1)}_{n,1} & \cdots & s''a''^{(D''-1)}_{n,m} \end{pmatrix} \begin{pmatrix} X_0 \\ X_1 \\ \vdots \\ X_m \end{pmatrix} + \begin{pmatrix} d_1 \\ d_2 \\ d_3 \\ \vdots \\ d_n \end{pmatrix} \mod N = \begin{pmatrix} s''\Psi^{-1}(g''_1) \\ s''\Psi^{-1}(g''_2) \\ s''\Psi^{-1}(g''_3) \\ \vdots \\ s''\Psi^{-1}(g''_n) \end{pmatrix}$$

to the computation apparatus,
the computation apparatus generates and outputs a solution $X=(X_0, X_1, \ldots, X_m)^T$ of the second LWE problem,
the LWE problem processor sets the solution $X=(X_0, X_1, \ldots, X_m)^T$ of the second LWE problem to $(W_{0,1}^{(D''-1)}, W_{1,1}^{(D''-1)}, \ldots, W_{m,1}^{(D''-1)})^T$ and sets $$W^{(D''-1)} = \begin{pmatrix} W^{(D''-1)}_{0,1} \\ W^{(D''-1)}_{1,1} \\ \vdots \\ W^{(D''-1)}_{m,1} \end{pmatrix}$$

and $W^{(1)}, \ldots, W^{(D''-1)}$ is output as weights of the neural network.

* * * * *